(12) United States Patent
Bito et al.

(10) Patent No.: US 10,705,317 B2
(45) Date of Patent: Jul. 7, 2020

(54) ZOOMING IMAGING OPTICAL SYSTEM

(71) Applicant: Panasonic Intellectual Property Management Co., Ltd., Osaka (JP)

(72) Inventors: Takakazu Bito, Osaka (JP); Ryosuke Sato, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 186 days.

(21) Appl. No.: 16/050,543

(22) Filed: Jul. 31, 2018

(65) Prior Publication Data

US 2019/0041607 A1 Feb. 7, 2019

(30) Foreign Application Priority Data

Aug. 4, 2017 (JP) .................. 2017-151403

(51) Int. Cl.
*G02B 15/14* (2006.01)
*G02B 9/62* (2006.01)
(Continued)

(52) U.S. Cl.
CPC ............. *G02B 9/62* (2013.01); *G02B 7/04* (2013.01); *G02B 15/173* (2013.01); *G02B 27/0037* (2013.01); *G02B 27/646* (2013.01); *H04N 5/23264* (2013.01); *H04N 5/23296* (2013.01); *G02B 13/009* (2013.01); *G02B 13/0045* (2013.01); *G02B 15/14* (2013.01)

(58) Field of Classification Search
CPC .. G02B 13/0045; G02B 9/62; G02B 27/0037; G02B 15/173; G02B 27/646; G02B 13/009; G02B 15/14; G02B 7/04; H04N 5/23296

USPC ................. 359/683–686, 713, 740, 757, 758
See application file for complete search history.

(56) References Cited

U.S. PATENT DOCUMENTS

2012/0050603 A1   3/2012  Imaoka et al.
2014/0211029 A1*  7/2014  Okumura ............. G02B 15/173
                                             359/557
(Continued)

FOREIGN PATENT DOCUMENTS

JP   2012-47814    3/2012
JP   2013-235218   11/2013
(Continued)

*Primary Examiner* — Evelyn A Lester
(74) *Attorney, Agent, or Firm* — Wenderoth, Lind & Ponack, L.L.P.

(57) ABSTRACT

A zooming imaging optical system includes, in order from an object side to an image side, at least: a first lens group having positive refractive power; a second lens group having negative refractive power; a third lens group having positive refractive power; a fourth lens group having positive refractive power; a fifth lens group having negative refractive power; and a sixth lens group. During zooming, the distance between adjacent lens groups changes. During focusing from an object at infinity to a close object, the fifth lens group moves along an optical axis toward an imaging surface side. The second lens group includes, in order from the object side to the image side, at least: a 2a-th lens group; and a 2b-th lens group having negative refractive power. Image stabilization is performed by displacing the 2b-th lens group perpendicularly to the optical axis. The optical system satisfies a predetermined conditional expression.

6 Claims, 30 Drawing Sheets

(51) Int. Cl.
*G02B 7/04* (2006.01)
*H04N 5/232* (2006.01)
*G02B 27/00* (2006.01)
*G02B 15/173* (2006.01)
*G02B 27/64* (2006.01)
*G02B 13/00* (2006.01)

(56) References Cited

U.S. PATENT DOCUMENTS

2015/0130985 A1* 5/2015 Kawamura .......... H04N 5/2254
                                                             359/557
2016/0209632 A1* 7/2016 Imaoka ................ G02B 15/177
2017/0261728 A1* 9/2017 Shibata ................ G02B 15/173

FOREIGN PATENT DOCUMENTS

| JP | 2014-145960 | 8/2014 |
| JP | 2015-138178 | 7/2015 |
| JP | 2015-191008 | 11/2015 |
| JP | 2016-80825 | 5/2016 |

* cited by examiner

ZOOMING IMAGING OPTICAL SYSTEM

CROSS REFERENCE TO RELATED APPLICATION

The present application is based on and claims priority of Japanese Patent Application No. 2017-151403 filed on Aug. 4, 2017. The entire disclosure of the above-identified application, including the specification, drawings and claims is incorporated herein by reference in its entirety.

FIELD

The present disclosure relates to a zooming imaging optical system which has an image stabilization function and is used in an imaging device such as a digital camera and video camera.

BACKGROUND

Conventional zooming imaging optical systems having a half angle of view at the telephoto extremity of less than or equal to 5 degrees are disclosed in Patent Literature (PTL) 1 to 3.

CITATION LIST

Patent Literature

[PTL 1] Japanese Unexamined Patent Application Publication No. 2013-235218
[PTL 2] Japanese Unexamined Patent Application Publication No. 2015-191008
[PTL 3] Japanese Unexamined Patent Application Publication No. 2016-080825

SUMMARY

Technical Problem

In recent years, zooming imaging optical systems to be used in imaging devices such as digital cameras are required to have high optical performance throughout the entire zoom range, and to be small and light. Furthermore, due to the fact that the amount of blur increases ahead of and behind the focused object distance allows for a wider range of image expressions making use of blurring, and the fact that the shortening of exposure time facilitates suppression of camera shake and subject shake, etc., there is a demand for zooming imaging optical systems to have a bright F number and a large aperture.

Furthermore, in zooming imaging optical systems having a narrow angle of view at the telephoto extremity, blurring of captured images due to the effects of camera shake tends to occur, and thus there is a demand for an image stabilization function that compensates for blurring of a captured image by displacing part of the lens groups (i.e., the image stabilization lens group) of the optical system perpendicularly with respect to the optical axis. In addition, in the case where a zooming imaging optical system has an image stabilization function, the image stabilization lens group is required to have a small diameter and light weight in order to avoid enlargement of the actuator for driving the image stabilization lens group.

Meanwhile, in recent years, video capturing using digital still cameras is becoming popular. In video capturing, a widely used method determines the movement direction of the focusing lens group by causing the focusing lens group to wobble continuously (wobbling) along the optical axis and detecting the change in contrast in order to keep the subject focused. In the case of driving the focusing lens group for wobbling, if the focusing lens group is heavy, the actuator for driving the focusing lens group increases in size, and reducing the size and weight of the taking lens becomes difficult. Furthermore, if a heavy focusing lens group is forcibly driven to perform wobbling without increasing the size of the actuator, noise generated from the actuator increases and is recorded as sound in the video capturing, and thus becomes a problem. Therefore, there is a demand to reduce the weight of the focusing lens group in zooming imaging optical systems to be applied to video capturing.

The optical system disclosed in PTL 1 has a large aperture with the F number from wide angle extremity to telephoto extremity being approximately 2.8, and also achieves a reduction in weight of the focusing lens group, but does not have an image stabilization function.

The optical system disclosed in PTL 2 has an image stabilization function but is dark, with the F number being approximately 4.5 at the wide angle extremity and approximately 5.6 at the telephoto extremity. In addition, it has the problem that weight reduction of the focusing lens group is insufficient.

The optical system disclosed in PTL 3 has an image stabilization function but has the problem of being dark, with the F number being approximately 5.0 at the wide angle extremity and approximately 6.3 at the telephoto extremity.

The present disclosure provides a zooming imaging optical system which has a narrow half angle of view at the telephoto extremity of less than or equal to approximately 5 degrees, has a bright F number of approximately 2.8 to 4.0, has a high optical performance throughout the entire zoom range, has an image stabilization function, and reduces the weight of the image stabilization lens group and focusing lens group.

Solution to Problem

In order to solve the above-described problems, a zooming imaging optical system according to an aspect of the present disclosure includes, in order from an object side to an image side, at least: a first lens group having positive refractive power; a second lens group having negative refractive power; a third lens group having positive refractive power; a fourth lens group having positive refractive power; a fifth lens group having negative refractive power; and a sixth lens group, wherein, during zooming, a distance between adjacent lens groups changes, during focusing from an object at infinity to a close object, the fifth lens group moves along an optical axis toward an imaging surface side, the second lens group includes, in order from the object side to the image side, at least: a 2a-th lens group; and a 2b-th lens group having negative refractive power, image stabilization is performed by displacing the 2b-th lens group perpendicularly with respect to the optical axis, and the following conditional expression is satisfied:

$$0.52 < f1/ft < 1.00 \qquad (1)$$

where:
f1 denotes a focal length of the first lens group; and
ft denotes a focal length of an entirety of the zooming imaging optical system during infinity focusing at a telephoto extremity.

Furthermore, in a zooming imaging optical system according to another aspect of the present disclosure, during zooming, the second lens group is fixed relative to an imaging surface, and the following conditional expressions are satisfied:

$$0.50 < hFno2bT/hFno2aT < 0.85 \quad (2)$$

$$0.80 < f2b/f2 < 2.50 \quad (3)$$

where:

hFno2bT denotes a ray height of an F number light flux at a lens surface closest to the object side in the 2b-th lens group during infinity focusing at the telephoto extremity;

hFno2aT denotes a ray height of an F number light flux at a lens surface closest to the object side in the 2a-th lens group during the infinity focusing at the telephoto extremity;

f2b denotes a focal length of the 2b-th lens group; and f2 denotes a focal length of the second lens group.

Furthermore, in a zooming imaging optical system according to another aspect of the present disclosure, the 2b-th lens group includes one positive lens and two negative lenses, and the following conditional expressions are satisfied:

$$sg2bp^2/((nd2bp-1) \times (vd2bn-vd2bp)) < 0.44 \quad (4)$$

$$sg2bn^2/((nd2bn-1) \times (vd2bn-vd2bp)) < 0.70 \quad (5)$$

where:

sg2bp denotes a specific gravity of the one positive lens included in the 2b-th lens group;

sg2bn denotes an average of specific gravities of the two negative lenses included in the 2b-th lens group;

nd2bp denotes a refractive index relative to a d line of the one positive lens included in the 2b-th lens group;

nd2bn denotes an average of refractive indices relative to the d line of the two negative lenses included in the 2b-th lens group;

vd2bp denotes an Abbe number relative to the d line of the one positive lens included in the 2b-th lens group; and vd2bn denotes an average of Abbe numbers relative to the d line of the two negative lenses included in the 2b-th lens group.

Furthermore, in a zooming imaging optical system according to another aspect of the present disclosure, the second lens group includes, in order from the object side to the image side: a 2a-th lens group; a 2b-th lens group having negative refractive power; and a 2c-th lens group, the image stabilization is performed by displacing the 2b-th lens group perpendicularly with respect to the optical axis, and the following conditional expression is satisfied:

$$1.40 < |(1-\beta 2bT) \times \beta b2bT| < 2.90 \quad (6)$$

where:

β2bT denotes a lateral magnification of the 2b-th lens group during the infinity focusing at the telephoto extremity; and βb2bT denotes a lateral magnification of a lens system located further on the image side than the 2b-th lens group during the infinity focusing at the telephoto extremity.

Furthermore, in a zooming imaging optical system according to another aspect of the present disclosure, the third lens group includes a three-element cemented lens including, in order from the object side to the image side, a positive lens, a negative lens, and a positive lens.

Furthermore, in a zooming imaging optical system according to another aspect of the present disclosure, the fifth lens group includes one negative lens.

Advantageous Effects

According to the present disclosure, it is possible to provide a zooming imaging optical system which has a narrow half angle of view at the telephoto extremity of less than or equal to approximately 5 degrees, has a bright F number of approximately 2.8 to 4.0, has a high optical performance throughout the entire zoom range, has an image stabilization function, and reduces the weight of the image stabilization lens group and focusing lens group.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Figure 1:
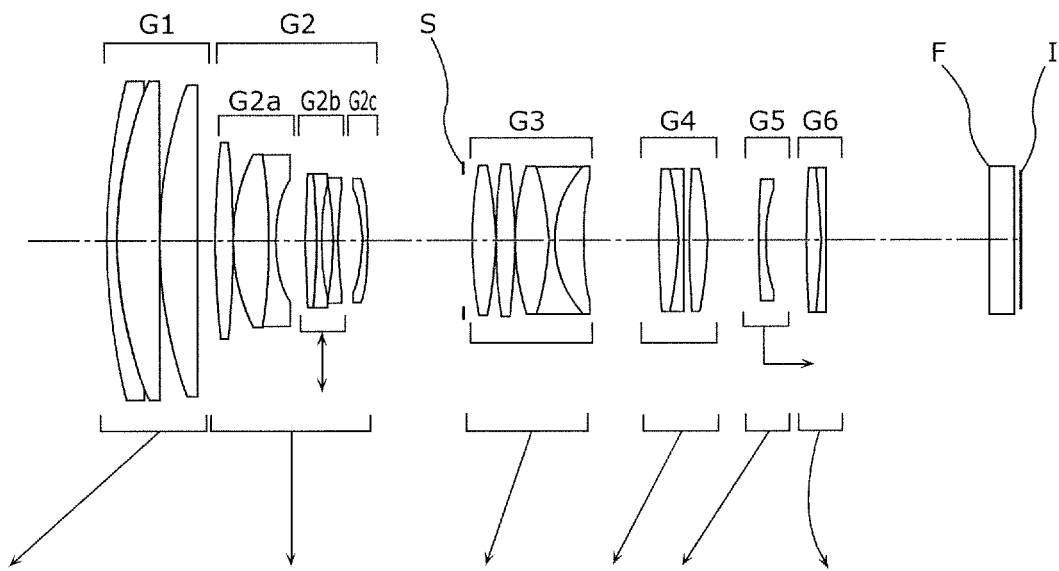
FIG. 1 illustrates the lens configuration of a zooming imaging optical system according to Implementation Example 1 of the present disclosure.
Figure 2:
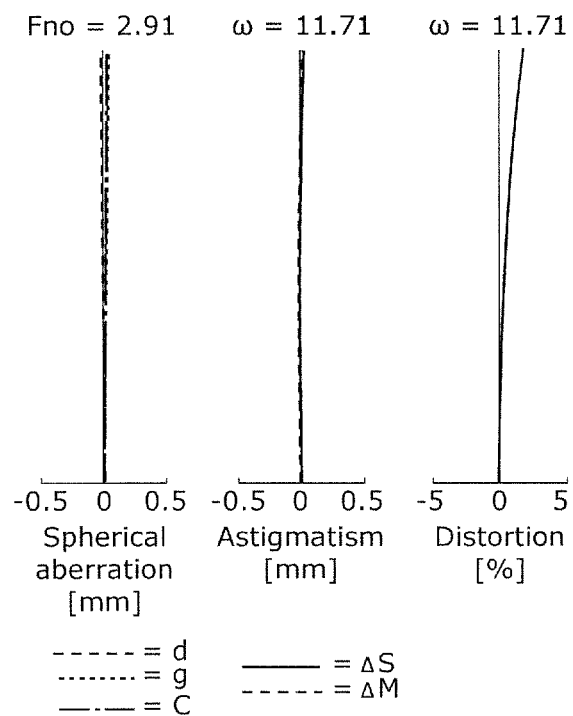
FIG. 2 illustrates longitudinal aberration during infinity focusing at the wide angle extremity of the zooming imaging optical system according to Implementation Example 1.
Figure 3:
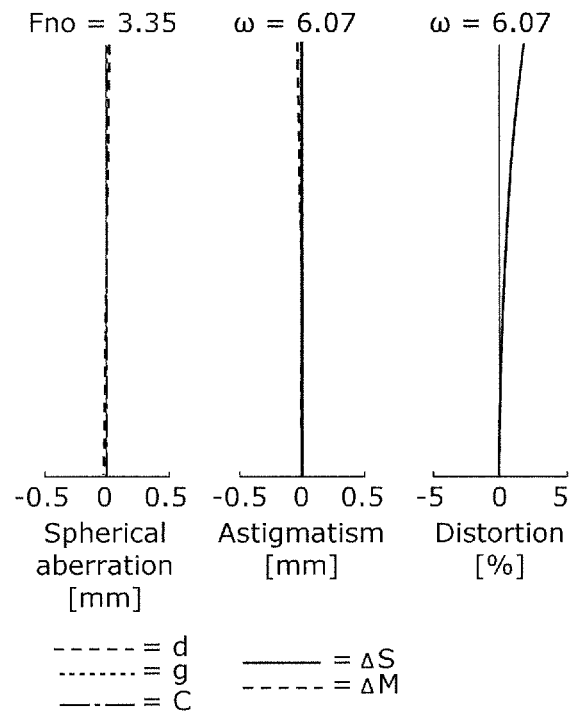
FIG. 3 illustrates longitudinal aberration during infinity focusing at the intermediate focal length of the zooming imaging optical system according to Implementation Example 1.
Figure 4:
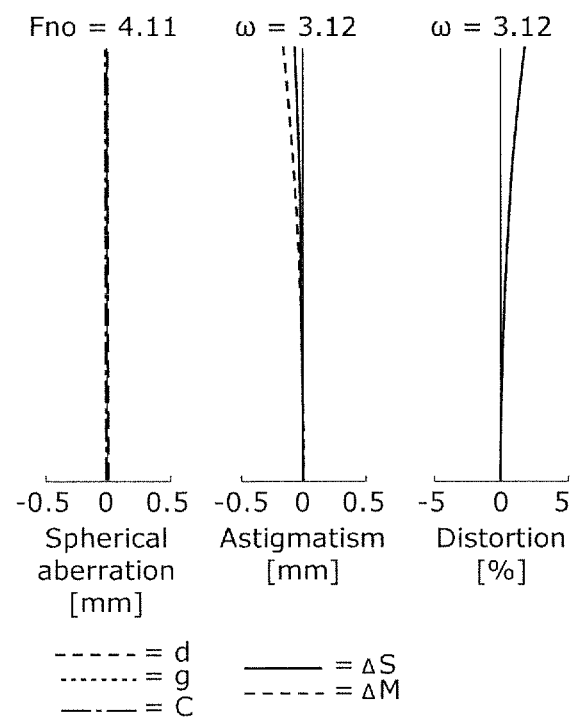
FIG. 4 illustrates longitudinal aberration during infinity focusing at the telephoto extremity of the zooming imaging optical system according to Implementation Example 1.
Figure 5:
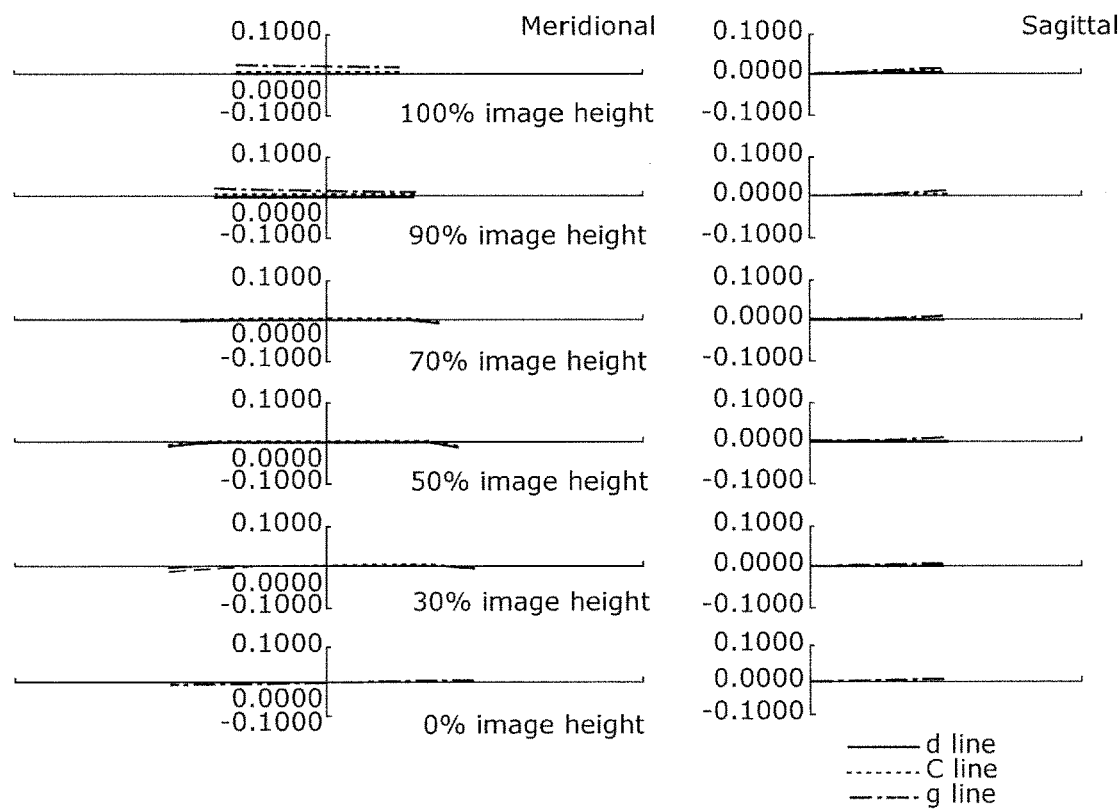
FIG. 5 illustrates lateral aberration during infinity focusing at the wide angle extremity of the zooming imaging optical system according to Implementation Example 1.
Figure 6:
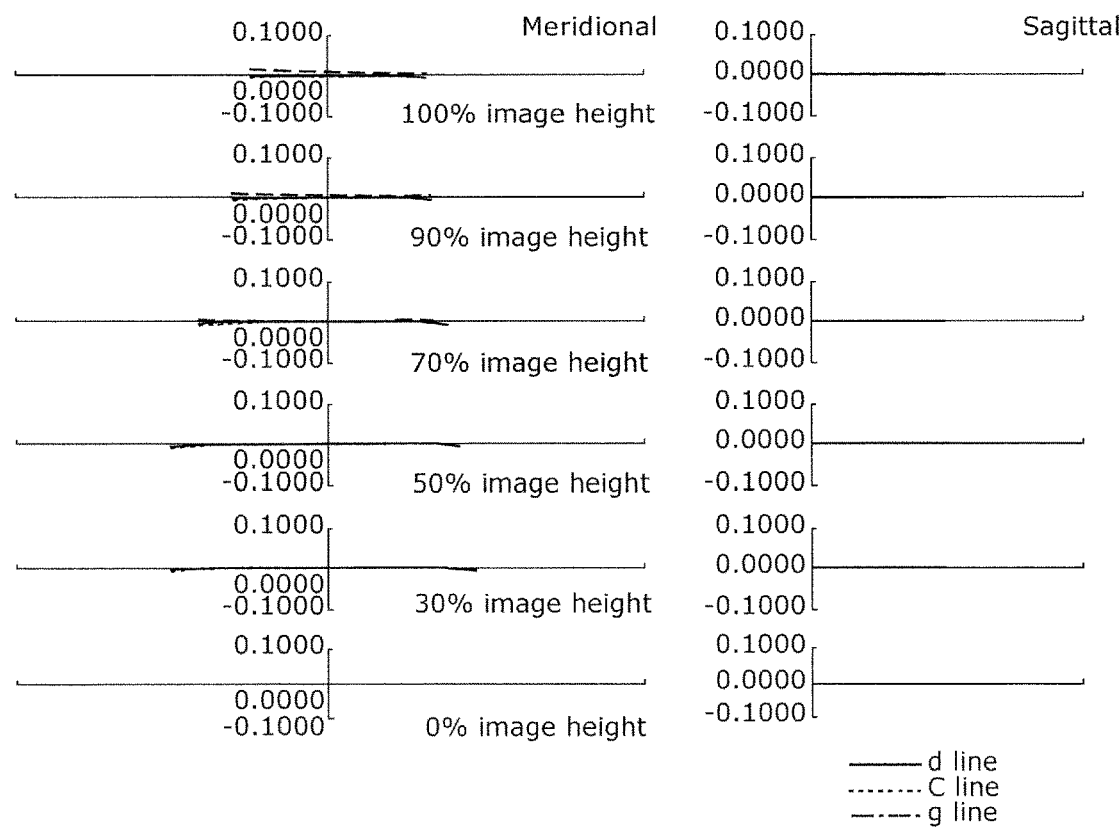
FIG. 6 illustrates lateral aberration during infinity focusing at the intermediate focal length of the zooming imaging optical system according to Implementation Example 1.
Figure 7:
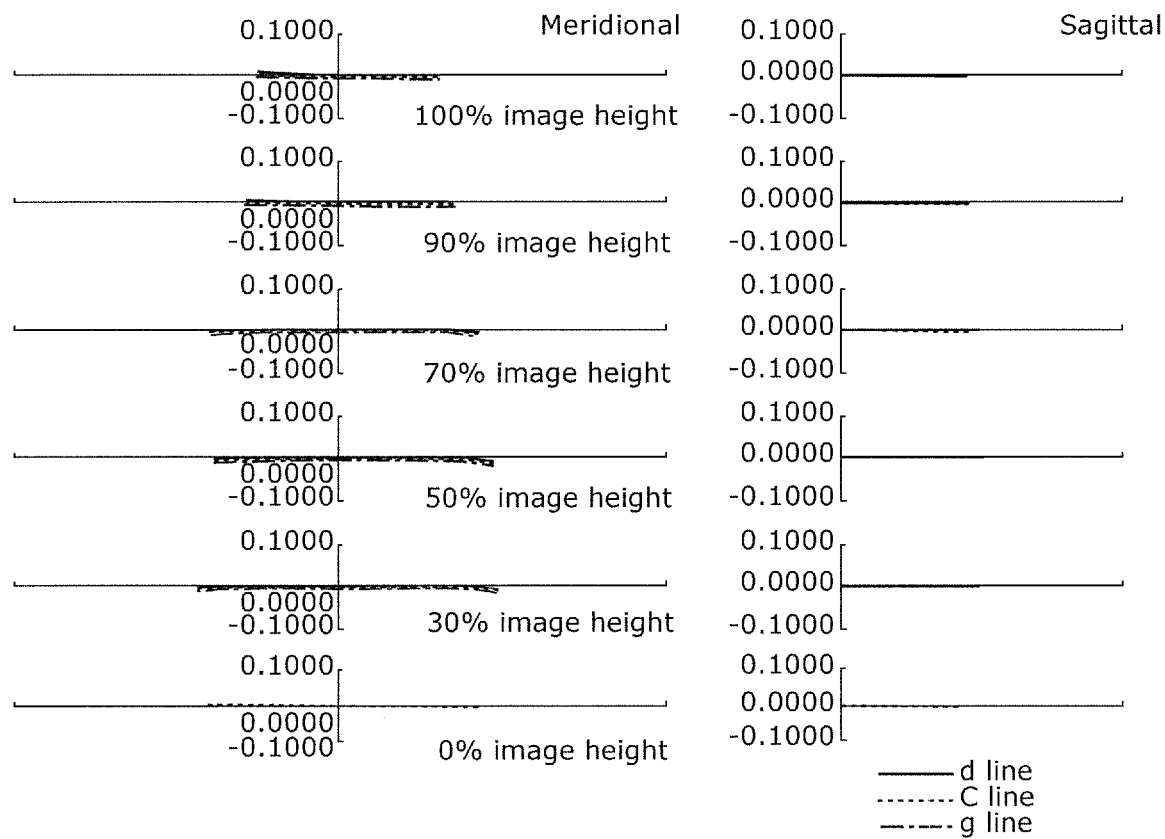
FIG. 7 illustrates lateral aberration during infinity focusing at the telephoto extremity of the zooming imaging optical system according to Implementation Example 1.
Figure 8:
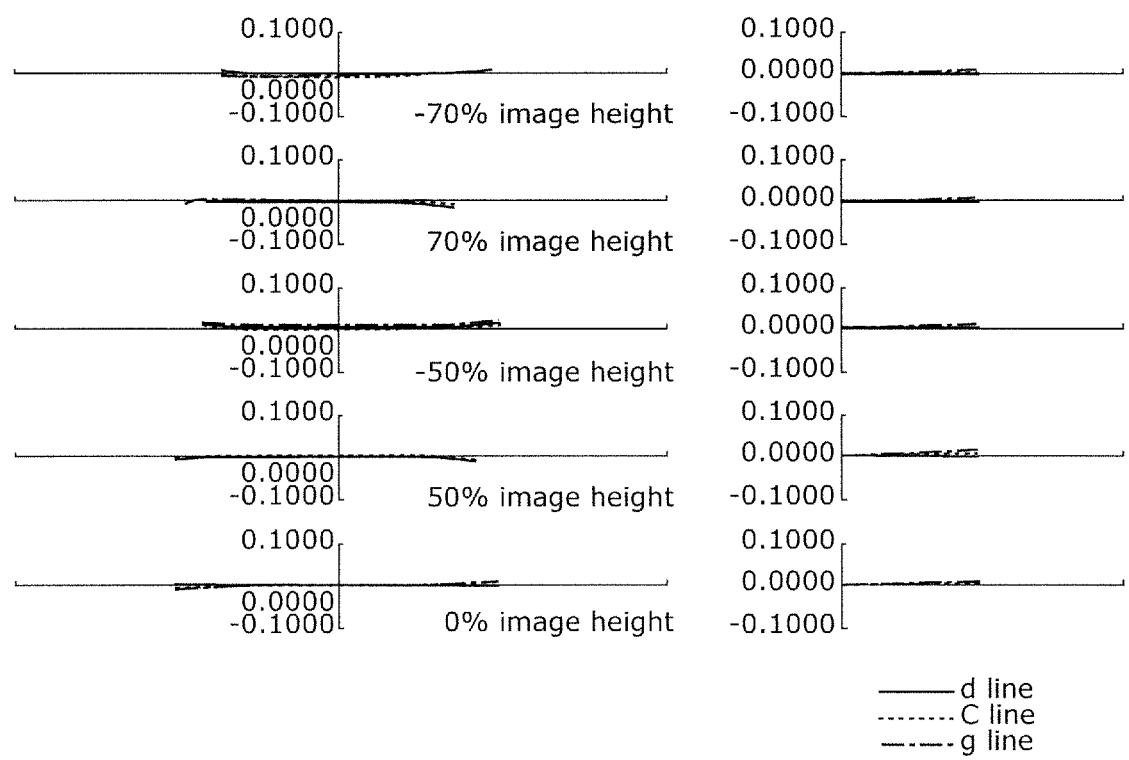
FIG. 8 illustrates lateral aberration during image stabilization with respect to a 0.4-degree vibration angle during infinity focusing at the wide angle extremity of the zooming imaging optical system according to Implementation Example 1.
Figure 9:
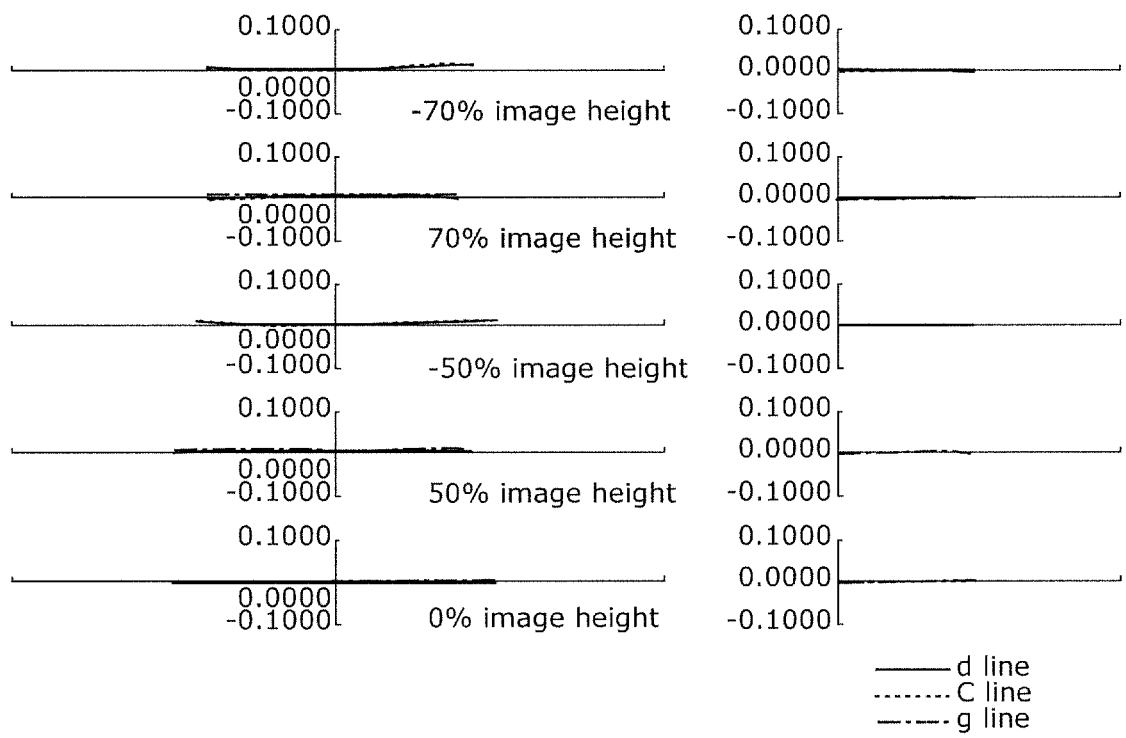
FIG. 9 illustrates lateral aberration during image stabilization with respect to a 0.4-degree vibration angle during infinity focusing at the intermediate focal length of the zooming imaging optical system according to Implementation Example 1.
Figure 10:
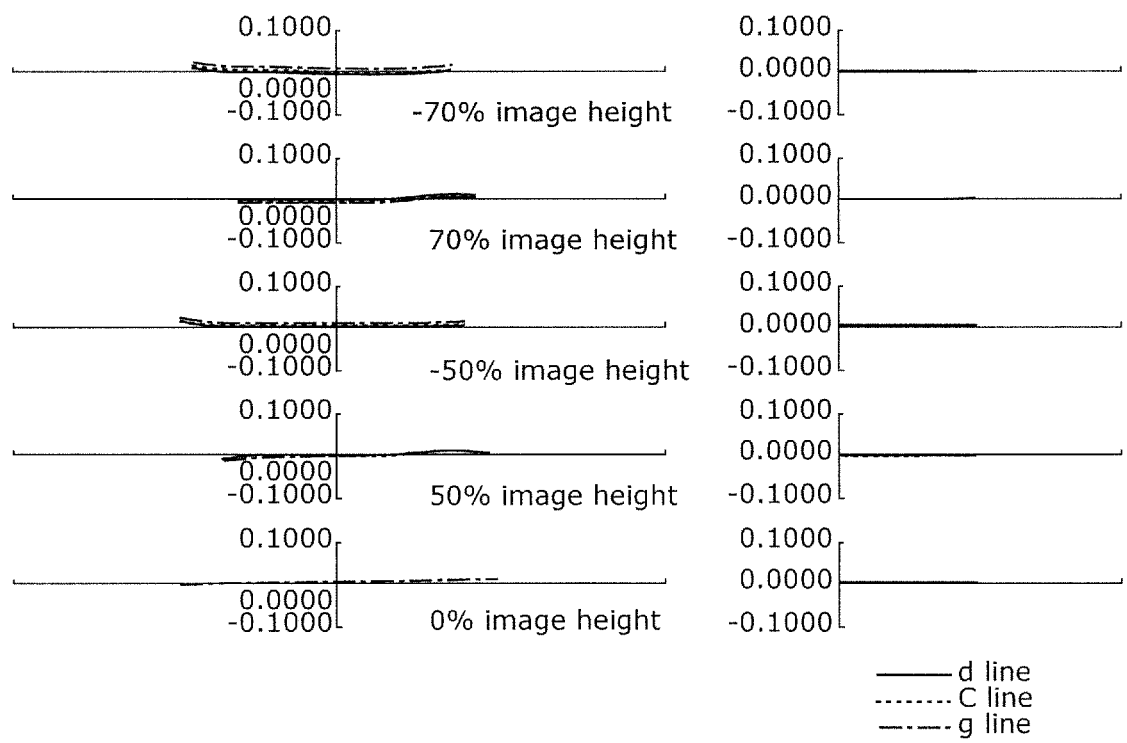
FIG. 10 illustrates lateral aberration during image stabilization with respect to a 0.4-degree vibration angle during infinity focusing at the telephoto extremity of the zooming imaging optical system according to Implementation Example 1.

As illustrated in the lens configuration diagrams of the respective implementation examples in FIG. 1, FIG. 11, FIG. 21, FIG. 31, FIG. 41, and FIG. 51, a zooming imaging optical system according to the present disclosure includes, in order from the object side to the image side, at least a first lens group having positive refractive power, a second lens group having negative refractive power, a third lens group having positive refractive power, a fourth lens group having positive refractive power, a fifth lens group having negative refractive power, and a sixth lens group. During zooming, the distance between adjacent lens groups changes. During focusing from an object at infinity to a close object, the fifth lens group moves along the optical axis to the imaging surface side. The second lens group includes, in order from the object side to the image side, at least a 2a-th lens group, and a 2b-th lens group having negative refractive power. Image stabilization is performed by displacing the 2b-th lens group perpendicularly with respect to the optical axis.

The primary zooming effect of the zooming imaging optical system is obtained by increasing the distance between the first lens group having positive refractive power and the second lens group having negative refractive power, when zooming from wide angle extremity to telephoto extremity.

Furthermore, since the convergence of light rays by the first lens group having positive refractive power causes the ray height of the light rays incident on the second lens group to become low, it is preferable that the image stabilization lens group be disposed in the second lens group in order to reduce the weight of the image stabilization lens group.

In addition, by dividing the second lens group into, in order from the object side to the image side, at least the 2a-th lens group and the 2b-th lens group which has negative refractive power, and setting the 2b-th lens group which further lowers the ray height of incident light rays the image stabilization lens group, further weight reduction of the image stabilization lens group becomes possible.

Furthermore, in the zooming imaging optical system according to the present disclosure, the 2b-th lens group, which is the image stabilization lens group, has negative refractive power. In the case where the 2b-th lens group has positive refractive power, it is necessary to intensify the positive refractive power of the 2b-th lens group in order to ensure the image stabilization effect produced by causing the 2b-th lens group to be eccentric. In this case, since the second lens group as a whole has negative refractive power, it is necessary to intensify the negative refractive power of part or all of the lens groups included in the second lens group other than the 2b-th lens group. By doing so, aberrations occurring in the second lens group increase, and it becomes difficult to beneficially correct the aberrations. Furthermore, increasing the number of lenses included in the second lens group in order to beneficially correct the aberrations leads to increases in the size and weight of the lens system, and is therefore undesirable.

The third lens group and the fourth lens group which have positive refractive power move toward the object side when zooming from wide angle extremity to telephoto extremity, to thereby bear the load of imaging surface compensation action and bear part of the zooming effect.

The third lens group having positive refractive power converges and emits the light flux diffused by the second lens group having negative refractive power, as a nearly afocal light flux, and the fourth lens group having positive refractive power further converges the light flux emitted from the third lens group.

Since the light flux in the section of the third lens group and the fourth lens group is nearly afocal, there is hardly any change in the passage of axial light flux and fluctuation of spherical aberration is small even when the distance between the third lens group and the fourth lens group is changed. However, since the passage of off-axial light flux changes, spherical aberration fluctuates. By taking advantage of this property and appropriately setting the distance between the third lens group and the fourth lens group, astigmatism can be beneficially corrected throughout the entire zoom range.

Since the light flux converged by the fourth lens group, which has positive refractive power and is disposed on the object side of the fifth lens group, is incident on the fifth lens group having negative refractive power, the weight of the focusing lens group can be reduced by setting the fifth lens group as the focusing lens group.

Since the sixth lens group is disposed in midstream of the light flux converging toward the imaging surface, changing the distance between the fifth lens group and the sixth lens group makes it is possible to change the ray height of the incident F number light rays and cause the spherical aberration and axial chromatic aberration to change. By taking advantage of this property and appropriately setting the distance between the fifth lens group and the sixth lens group, spherical aberration and axial chromatic aberration can be beneficially corrected throughout the entire zoom range.

Furthermore, the zooming imaging optical system according to the present disclosure satisfies the conditional expression indicated below.

$$0.52 < f1/ft < 1.00 \quad (1)$$

where:
f1 denotes the focal length of the first lens group; and
ft denotes the focal length of the entire optical system during infinity focusing at the telephoto extremity Conditional expression (1) stipulates a preferred range for the ratio between the focal length of the first lens group and the focal length of the entire optical system during infinity focusing at the wide angle extremity.

When the positive refractive power of the first lens group weakens so as to exceed the upper limit of conditional expression the amount of movement of the first lens group required for zooming increases, and thus reducing the size and weight of the taking lens becomes difficult.

On the other hand, when the positive refractive power of the first lens group intensifies so as to exceed the lower limit of conditional expression (1), the curvature of the positive lenses in the first lens group increases, various types of aberrations such as spherical aberration, coma aberration, and astigmatism occurring inside the first lens group become big, and thus beneficially correcting the various aberrations throughout the entire zooming range becomes difficult. Furthermore, in the case of increasing the refractive index instead of increasing the curvature of the positive lenses in the first lens group, correcting axial chromatic aberration and chromatic aberration of magnification at the telephoto extremity becomes more difficult.

It should be noted that, with regard to conditional equation (1), it is preferable to limit the lower limit to 0.53 or the upper limit to 0.90 to thereby further ensure the above-described effect.

In addition, in the zooming imaging optical system according to the present disclosure, the second lens group is preferably fixed relative to the imaging surface during zooming.

Since the second lens group includes the image stabilization lens group, moving of the second lens group during zooming requires the second lens group to move together with the image stabilization mechanism including the actuator, etc., for driving the image stabilization lens group, and thus the mechanism for moving the second lens group increases in size and becomes complicated, and reducing the size and weight of the taking lens becomes difficult.

Furthermore, the zooming imaging optical system according to the present disclosure preferably satisfies the conditional expressions indicated below.

$$0.50 < hFno2bT/hFno2aT < 0.85 \quad (2)$$

$$0.80 < f2b/f2 < 2.50 \quad (3)$$

where:
hFno2bT denotes the ray height of an F number light flux at the lens surface closest to the object side in the 2b-th lens group during infinity focusing at the telephoto extremity;
hFno2aT denotes the ray height of an F number light flux at the lens surface closest to the object side in the 2a-th lens group during infinity focusing at the telephoto extremity;
f2b denotes the focal length of the 2b-th lens group; and
f2 denotes the focal length of the second lens group Conditional expression (2) stipulates a preferable range for the ratio between the ray height of an F number light flux at the lens surface closest to the object side in the 2b-th lens group and the ray height of an F number light flux at the lens surface closest to the object side in the 2a-th lens group, during infinity focusing at the telephoto extremity.

When the ray height of the F number light flux at the lens surface closest to the object side in the 2b-th lens group during infinity focusing at the telephoto extremity increases so as to exceed the upper limit of conditional expression (2), the outer diameter and the weight of the image stabilization lens group increase. Then, when the outer diameter and the weight of the image stabilization lens group increase, the image stabilization mechanism including the actuator, etc., for driving the image stabilization lens group increases in size, and reducing the size and weight of the taking lens becomes difficult.

On the other hand, when the ray height of the F number light flux at the lens surface closest to the object side in the 2b-th lens group during infinity focusing at the telephoto extremity decreases so as to exceed the lower limit of conditional expression (2), either the distance from the lens surface closest to the object side in the 2a-th lens group to the lens surface closest to the object side in the 2b-th lens group becomes long or the positive refractive power of the first lens group intensifies and the F number light flux is more drastically converged. When the distance from the lens surface closest to the object side in the 2a-th lens group to the lens surface closest to the object side in the 2b-th lens group becomes long, the total length of the second lens group becomes long, and thus reducing the size and weight of the taking lens becomes difficult. Furthermore, when the positive refractive power of the first lens group intensifies and the F number light flux is more drastically converged, it becomes difficult to beneficially correct the various aberrations occurring inside the first lens group in the same manner as when the lower limit of conditional expression (1) is exceeded.

It should be noted that, with regard to conditional equation (2), it is preferable to limit the lower limit to 0.55 or the upper limit to 0.80 to thereby further ensure the above-described effect.

Conditional expression (3) stipulates a preferred range for the ratio between the focal distance of the 2b-th lens group and the focal distance of the second lens group.

When the negative refractive power of the 2b-th lens group becomes overly weak so as to exceed the upper limit of conditional expression (3), the absolute value of the image stabilization coefficient of the 2b-th lens group, which is the image stabilization lens group, becomes small. As such, the amount of movement of the 2b-th lens group perpendicularly with respect to the optical axis during image stabilization becomes big and the outer diameter of the taking lens increases, thereby making size and weight reduction difficult.

On the other hand, when the negative refractive power of the 2b-th lens group becomes overly strong so as to exceed the lower limit of conditional expression (3), various types of aberrations such as spherical aberration, coma aberration, and astigmatism occurring inside the 2b-th lens group become big, and thus reducing fluctuation of coma aberration and astigmatism caused by eccentricity during image stabilization becomes difficult.

It should be noted that, with regard to conditional equation (3), it is preferable to limit the lower limit to 1.00 or the upper limit to 2.20 to thereby further ensure the above-described effect.

In addition, in the zooming imaging optical system according to the present disclosure, the 2b-th lens group preferably includes one positive lens and two negative lenses.

Although the 2b-th lens group has a negative refractive power, achromatizing inside the 2b-th lens group is preferable in order to reduce the chromatic aberration of magnification caused by eccentricity during image stabilization, and, for this reason, it is preferable that at least one positive lens is included.

Furthermore, since the degree of freedom for reducing the fluctuation of coma aberration and astigmatism caused by eccentricity during image stabilization is insufficient when the 2b-th lens group, which is the image stabilization lens group, includes only one positive lens and one negative lens, the 2b-th lens group more preferably includes three or more lenses.

In view of this, since the 2b-th lens group has negative refractive power, it is preferable to divide the burden of negative refractive power between a plurality of lenses by including one or more positive lenses and two or more negative lenses. On the other hand, when the number of lenses included in the 2b-th lens group, which is the image stabilization lens group, is increased to four or more lenses, aberration fluctuation reduction is facilitated but reducing the weight of the image stabilization lens group becomes difficult. Therefore, in order to enable both reduction of aberration fluctuation during image stabilization and reduction of weight of the image stabilization lens group, the 2b-th lens group preferably includes one positive lens and two negative lenses.

Furthermore, the zooming imaging optical system according to the present disclosure preferably satisfies the conditional expressions indicated below.

$$sg2bp^2/((nd2bp-1)\times(vd2bn-vd2bp))<0.44 \quad (4)$$

$$sg2bn^2/((nd2bn-1)\times(vd2bn-vd2bp))<0.70 \quad (5)$$

where:

sg2bp denotes the specific gravity of positive lens included in the 2b-th lens group;

sg2bn denotes the average of the specific gravities of the negative lenses included in the 2b-th lens group;

nd2bp denotes the refractive index relative to the d line of the positive lens included in the 2b-th lens group;

nd2bn denotes the average of the refractive indices relative to the d line of the negative lenses included in the 2b-th lens group;

vd2bp denotes the Abbe number relative to the d line of the positive lens included in the 2b-th lens group; and vd2bn denotes the average of the Abbe numbers relative to the d line of the negative lenses included in the 2b-th lens group Conditional expressions (4) and (5) relate to the material of the lenses included in the 2b-th lens group.

For lenses, if the shape is the same, the smaller the specific gravity of the material, the lesser the weight. Furthermore, for lenses, the greater the refractive index of the material, the smaller the curvature for obtaining the same refractive power and the lesser the weight.

Furthermore, when the difference between the Abbe numbers of the positive lens and negative lenses in the 2b-th lens group is big, achromatizing becomes possible even if the refractive power of each of the positive lens and the negative lens is weak, and the weight of the lenses included in the 2b-th lens group becomes less.

Conditional expression (4) stipulates the preferred material property for reducing the weight of the positive lens included in 2b-th lens group and reducing the weight of the image stabilization lens group.

When the weight of the positive lens included in the 2b-th lens group increases so as to exceed the upper limit of conditional expression (4), the weight of the image stabilization lens group increases, and reducing the size and weight of the taking lens becomes difficult due to the increase in the size of the actuator, etc., that drives the image stabilization lens group.

It should be noted that, with regard to conditional equation (4), it is preferable to limit the upper limit to 0.42 to thereby further ensure the above-described effect.

Furthermore, with regard to conditional equation (4), it is more preferable to limit the upper limit to 0.39 to thereby further ensure the above-described effect.

Conditional expression (5) stipulates the preferred material property for reducing the weight of the negative lens included in 2b-th lens group and reducing the weight of the image stabilization lens group.

When the weight of the negative lens included in the 2b-th lens group increases so as to exceed the upper limit of conditional expression (5), the weight of the image stabilization lens group increases, and reducing the size and weight of the taking lens becomes difficult due to the increase in the size of the actuator, etc., that drives the image stabilization lens group.

It should be noted that, with regard to conditional equation (5), it is preferable to limit the upper limit to 0.60 to thereby further ensure the above-described effect.

Furthermore, with regard to conditional equation (5), it is more preferable to limit the upper limit to 0.56 to thereby further ensure the above-described effect.

In addition, in the zooming imaging optical system according to the present disclosure, the second lens group preferably includes, in order from the object size to the image side, the 2a-th lens group, the 2b-th lens group having negative refractive power, and a 2c-th lens group, and image stabilization is preferably performed by displacing the 2b-th lens group perpendicularly with respect to the optical axis.

When the amount of movement of the image stabilization lens group perpendicular to the optical axis during image stabilization is big, this leads to an increase in the outer diameter of the taking lens, and thus reducing the size and weight of the taking lens becomes difficult. Therefore, it is preferable that the absolute value of the image stabilization coefficient (the ratio of the amount of movement of the image to the amount of movement of the image stabilization lens group perpendicular to the optical axis) of the image stabilization lens group be big.

Furthermore, there are also instances where, during movement perpendicular to the optical axis, the image stabilization lens group moves minutely in the optical axis direction due to mechanical rattling, etc., and this may cause defocusing thereby causing deterioration of the captured image or focus fluctuation during video capturing. In order to reduce defocusing due to minute movement of the image stabilization lens group in the optical axis direction, the focus sensitivity (ratio of amount of movement of image to amount of movement of the image stabilization lens group in the optical axis direction) of the image stabilization lens group is preferably low.

Here, with regard to the image stabilization lens group, image stabilization coefficient KOS and focus sensitivity K are expressed using (Reference equation a) and (Reference equation b) below.

$$KOS = (1-\beta) \times \beta b \quad \text{(Reference equation a)}$$

$$K = (1-\beta^2) \times \beta b2 \quad \text{(Reference equation b)}$$

where:

KOS denotes the image stabilization coefficient of the image stabilization lens group;

K denotes the focus sensitivity of the image stabilization lens group;

β denotes the lateral magnification of the image stabilization lens group; and

βb denotes the lateral magnification of the lens system located further on the image side than the image stabilization lens group As in (Reference equation a) and (Reference equation b), the image stabilization coefficient and the focus sensitivity of the image stabilization lens group both depend on the lateral magnification of the image stabilization lens group and the lateral magnification of the lens system located further on the image side than the image stabilization lens group. Therefore, when attempting to reduce focus sensitivity while maintaining the image stabilization coefficient of the image stabilization lens group, it is necessary to change both the lateral magnification of the image stabilization lens group and the lateral magnification of the lens system located further on the image side than the image stabilization lens group.

In the zooming imaging optical system according to the present disclosure, when the 2c-th lens group is not disposed on the image side of the 2b-th lens group which is the image stabilization lens group, it is necessary to change the lateral magnification of the lens system from the third lens group onward, which is the lens system located further on the image side than the image stabilization lens group, in order to control the image stabilization coefficient and the focus sensitivity of the 2b-th lens group. Specifically, in this case, it is necessary to change the reflective power arrangement of the entire zooming imaging optical system, and controlling both the image stabilization coefficient and the focus sensitivity of the image stabilization lens group while suppressing the degradation of imaging performance becomes difficult.

In response to this, by disposing the 2c-th lens group on the image side of the 2b-th lens group which is the image stabilization lens group, changing the refractive power arrangement inside the second lens group makes it possible to control the image stabilization coefficient and the focus sensitivity of the 2b-th lens group, and increase the absolute value of the image stabilization coefficient and reduce the focus sensitivity while suppressing the deterioration of imaging performance.

Furthermore, the zooming imaging optical system according to the present disclosure preferably satisfies the conditional expressions indicated below.

$$1.40 < |(1-\beta 2bT) \times \beta b2bT| < 2.90 \quad (6)$$

where:

β2bT denotes the lateral magnification of the 2b-th lens group during infinity focusing at the telephoto extremity; and βb2bT denotes the lateral magnification of the lens system located further on the image side than the 2b-th lens group during infinity focusing at the telephoto extremity Conditional expression (6) stipulates a preferred range for the absolute value of the image stabilization coefficient of the 2b-th lens group during infinity focusing at the telephoto extremity.

When the absolute value of the image stabilization coefficient of the 2b-th lens group increases so as to exceed the upper limit of conditional expression (6), the negative refractive power of the 2b-th lens group becomes too strong, and thus it becomes difficult to reduce the fluctuation of coma aberration and astigmatism caused by eccentricity during image stabilization in the same manner as when the lower limit of conditional expression (3) is exceeded.

On the other hand, when the absolute value of the image stabilization coefficient of the 2b-th lens group becomes too small so as to exceed the lower limit of conditional expression (6), the amount of movement of the image stabilization lens group perpendicular to the optical axis during image stabilization increases, the outer diameter of the taking lens increases, and thus reducing size and weight of the taking lens becomes difficult.

It should be noted that, with regard to conditional equation (6), it is preferable to limit the lower limit to 1.60 or the upper limit to 2.80 to thereby further ensure the above-described effect.

In addition, in the zooming imaging optical system according to the present disclosure, the third lens group preferably includes a three-element cemented lens including, in order from the object side to the image side, a positive lens, a negative lens, and a positive lens.

The brighter the F number of an optical system, the more beneficial correction of various aberrations, particularly, spherical aberration, coma aberration, and axial chromatic aberration, is required. In the zooming imaging optical system according to the present disclosure, by adapting a configuration in which the third lens group includes a three-element cemented lens including, in order from the object side to the image side, a positive lens, a negative, and a negative lens, it becomes possible to have a plurality of cemented surfaces having large curvatures in the third lens group in which the diameter of axial light flux becomes big. Accordingly, spherical aberration, coma aberration, and axial chromatic aberration can be beneficially corrected. In general, in lens surfaces in which the correction effect for aberrations such as spherical aberration and coma aberration is great, deterioration of optical performance due to manufacturing errors such as the air space between lens surfaces and eccentricity between lenses may become big. However, by cementing these lens surfaces, and thereby eliminating the air space between lenses and reducing eccentricity between lenses, the deterioration of optical performance due to manufacturing errors can be reduced.

In addition, in the zooming imaging optical system according to the present disclosure, the fifth lens group preferably includes one negative lens.

By configuring the fifth lens group, which is a focusing lens group, from a single negative lens, it is possible to reduce the weight of the focusing lens group, and a zooming imaging optical system that is also suitable for the wobbling driving of the focusing lens group during video capturing can be provided.

It is preferable that the zooming imaging optical system according to the present disclosure further has the configuration below.

By introducing an aspheric surface in the third lens group or the fourth lens group, it is possible to further beneficially correct spherical aberration, coma aberration, etc. Furthermore, by introducing an aspheric surface in the fifth lens group, it is possible to further beneficially correct the fluctuation of spherical aberration during focusing.

Furthermore, the 2a-th lens group preferably includes, in order from the object side to the image side, one or two positive lenses and one negative lens. According to this configuration, it becomes easy to lower the ray height of light rays incident on the 2b-th lens group, and it is possible to further reduce the weight of the image stabilization lens group.

Furthermore, the fourth lens group preferably includes at least one negative lens. According to this configuration, it is possible to reduce the amount of various aberrations, such as spherical aberration, coma aberration, and axial chromatic aberration, occurring in the fourth lens group.

Next, the lens configurations in respective implementation examples of the zooming imaging optical system according to the present disclosure will be described. In the subsequent descriptions, the lens configurations are described from in order from the object side to the image side. Ln is a reference sign indicating the lens corresponding to a lens number n obtained when the lens is counted in order from the object side. In the case of a cemented lens, a reference sign indicates each lens included in the cemented lens.

Implementation Example 1

FIG. 1 illustrates the lens configuration of a zooming imaging optical system according to Implementation Example 1 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, and sixth lens group G6 having positive refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, and sixth lens group G6 moves. Furthermore, during focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and positive meniscus lens L3 whose convex surface is on the object side.

Second lens group G2 includes, in order from the object side, 2a-th lens group G2a having negative refractive power, 2b-th lens group G2b having negative refractive power, and 2c-th lens group G1c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G1c includes negative meniscus lens L10 whose convex surface is on the object side.

An aperture diaphragm is provided on the object side of third lens group G3 and moves integrally with third lens group G3 during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and negative meniscus lens L17 whose convex surface is on the image side, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including biconvex lens L20 and plano-convex lens L21 whose flat surface is on the image side.

Implementation Example 2

Figure 11:
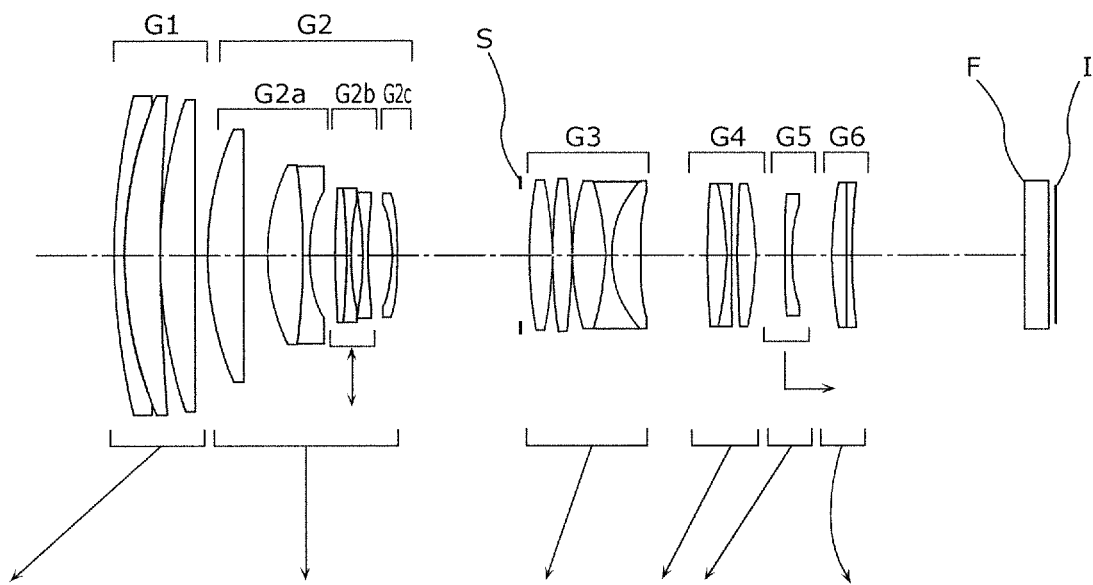
FIG. 11 illustrates the lens configuration of a zooming imaging optical system according to Implementation Example 2 of the present disclosure.
Figure 12:
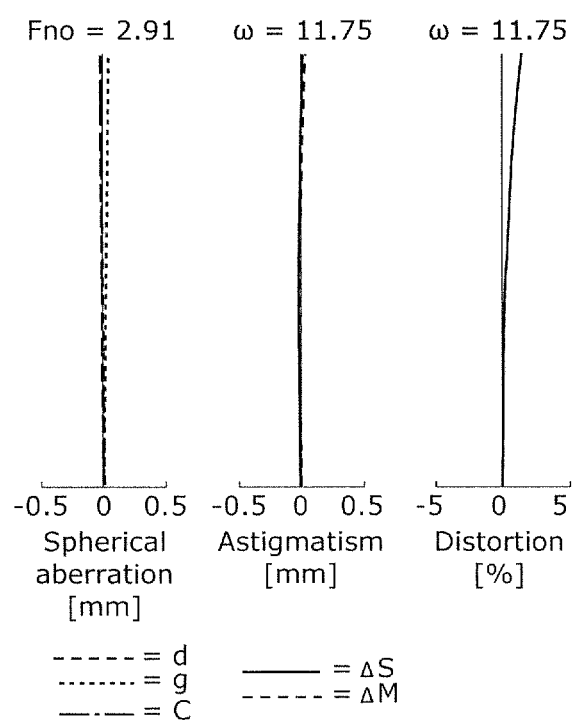
FIG. 12 illustrates longitudinal aberration during infinity focusing at the wide angle extremity of the zooming imaging optical system according to Implementation Example 2.
Figure 13:
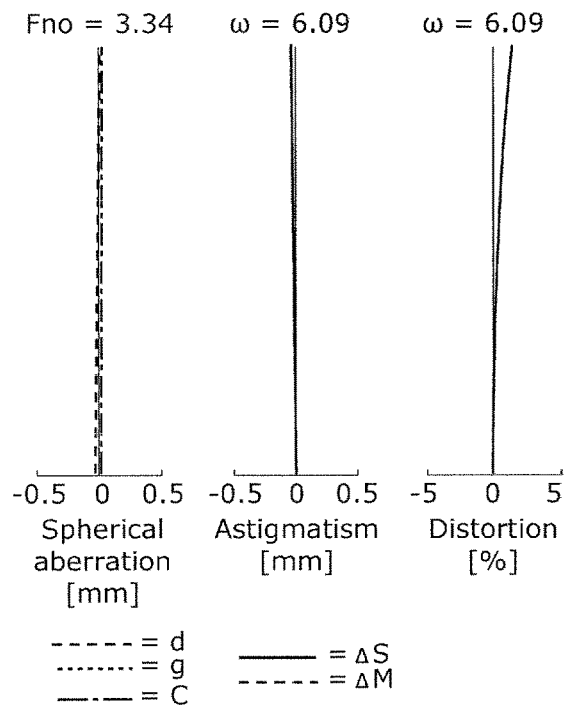
FIG. 13 illustrates longitudinal aberration during infinity focusing at the intermediate focal length of the zooming imaging optical system according to Implementation Example 2.
Figure 14:
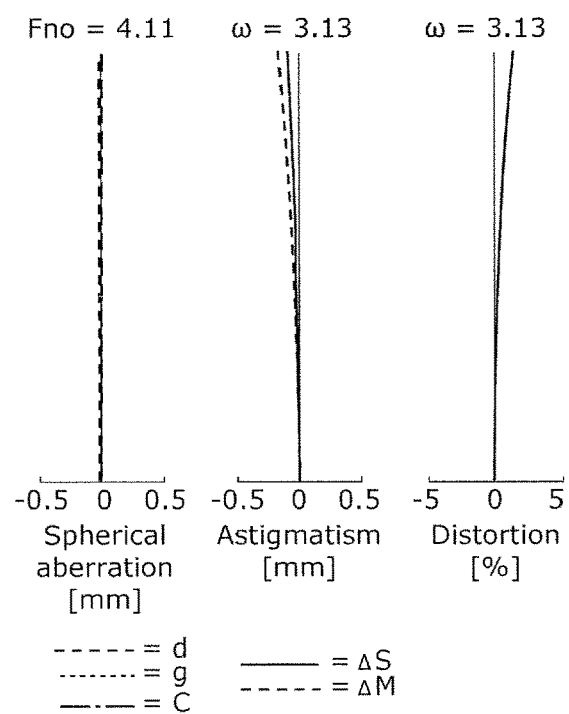
FIG. 14 illustrates longitudinal aberration during infinity focusing at the telephoto extremity of the zooming imaging optical system according to Implementation Example 2.
Figure 15:
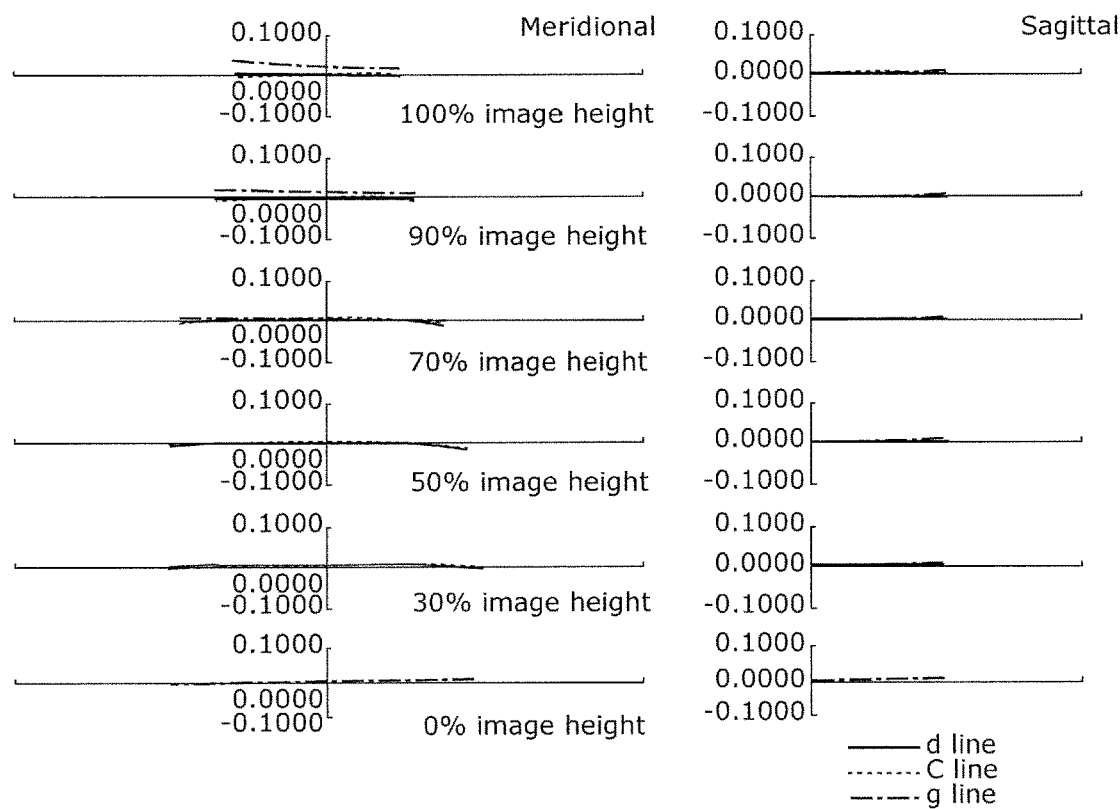
FIG. 15 illustrates lateral aberration during infinity focusing at the wide angle extremity of the zooming imaging optical system according to Implementation Example 2.
Figure 16:
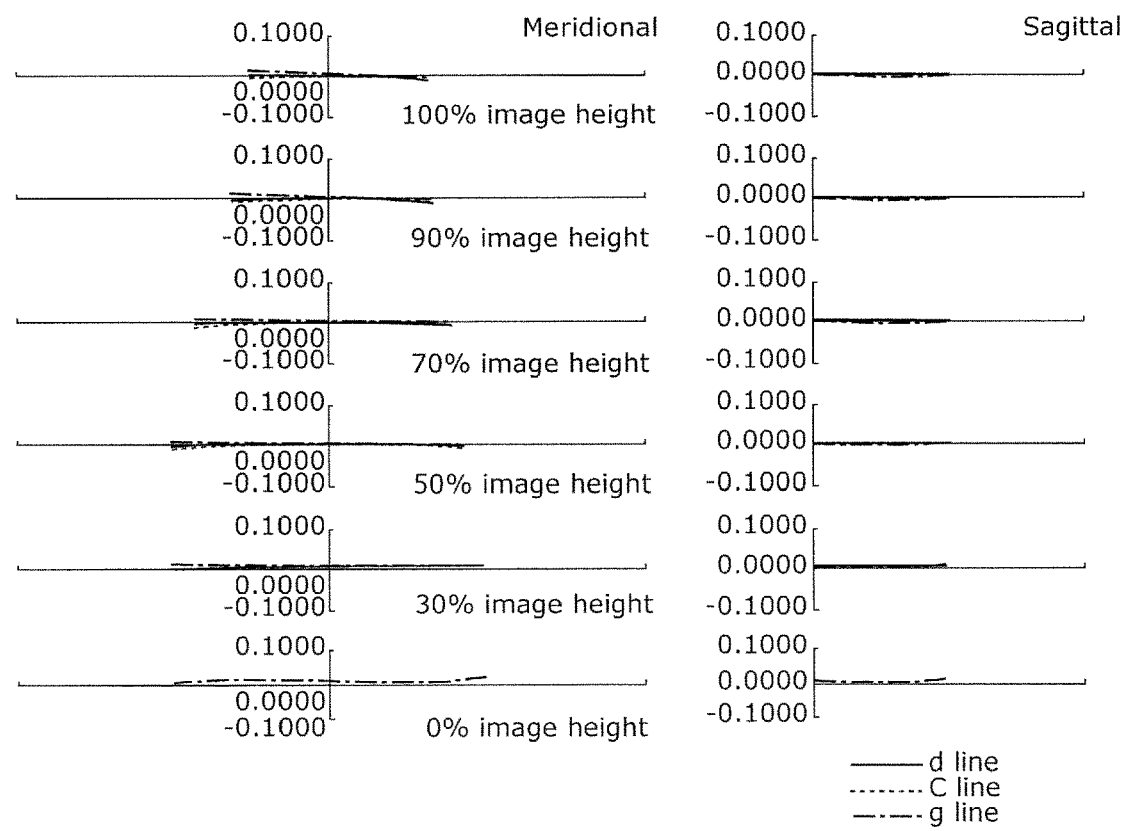
FIG. 16 illustrates lateral aberration during infinity focusing at the intermediate focal length of the zooming imaging optical system according to Implementation Example 2.
Figure 17:
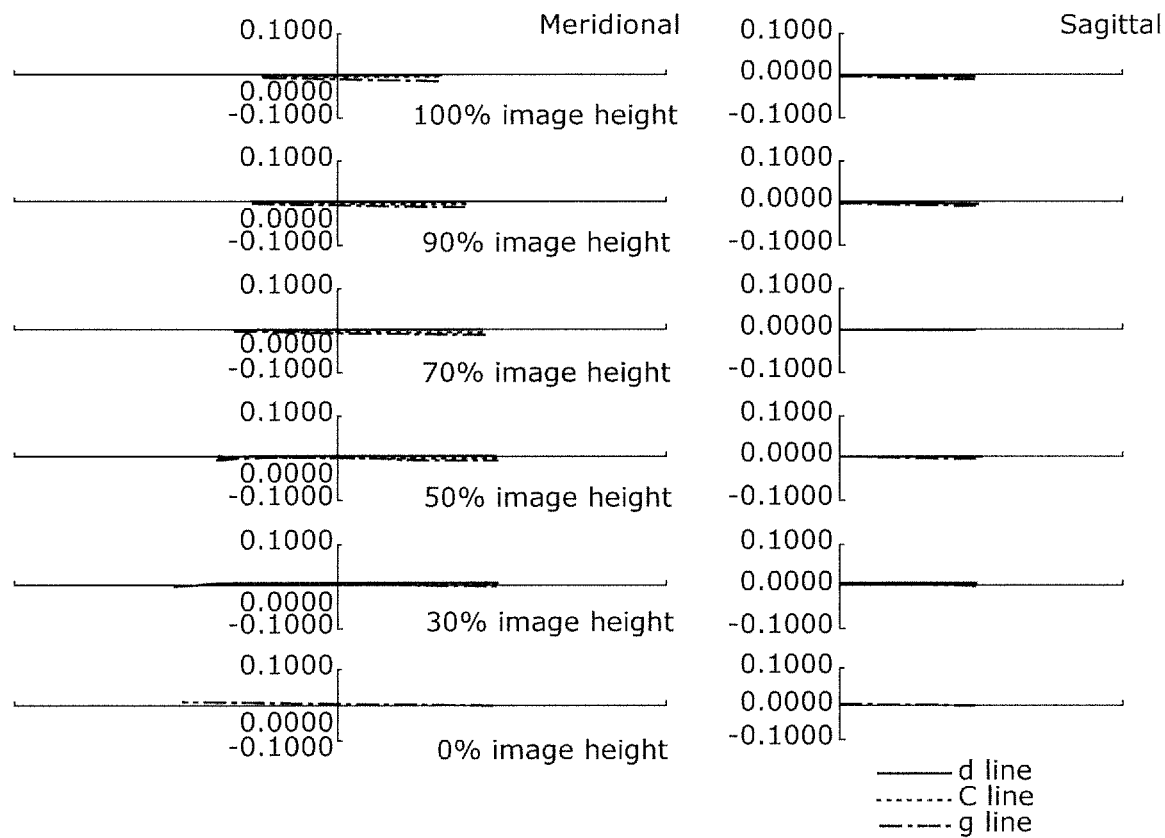
FIG. 17 illustrates lateral aberration during infinity focusing at the telephoto extremity of the zooming imaging optical system according to Implementation Example 2.
Figure 18:
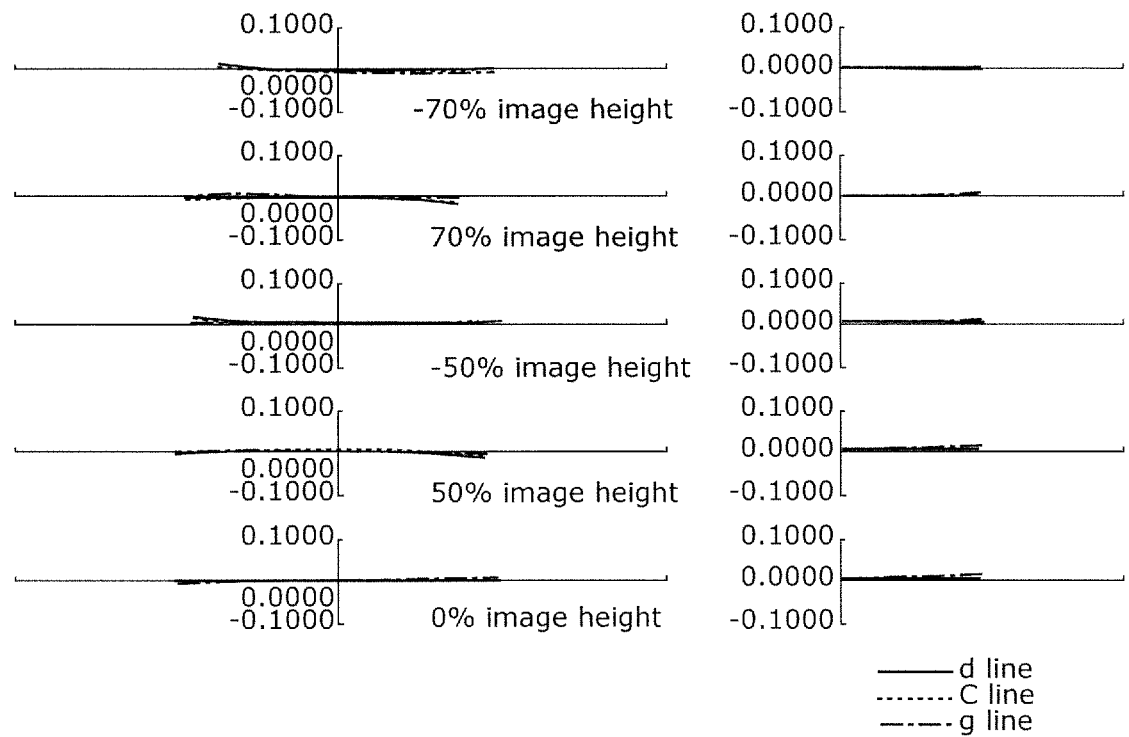
FIG. 18 illustrates lateral aberration during image stabilization with respect to a 0.4-degree vibration angle during infinity focusing at the wide angle extremity of the zooming imaging optical system according to Implementation Example 2.
Figure 19:
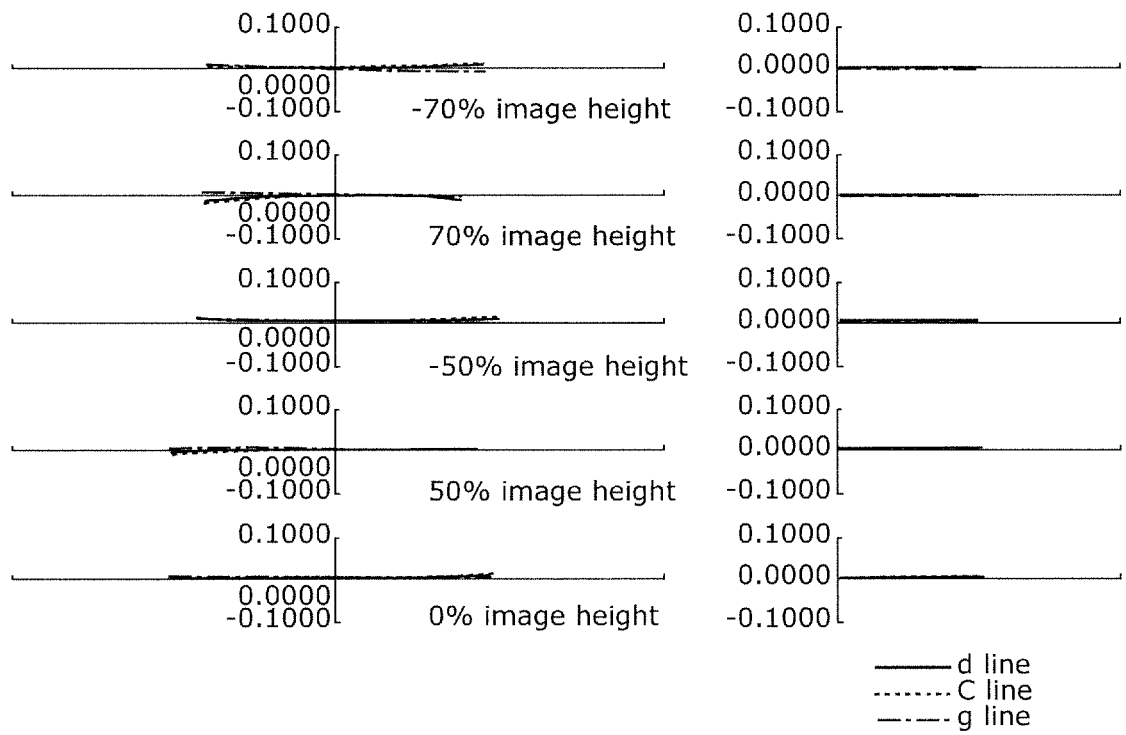
FIG. 19 illustrates lateral aberration during image stabilization with respect to a 0.4-degree vibration angle during infinity focusing at the intermediate focal length of the zooming imaging optical system according to Implementation Example 2.
Figure 20:
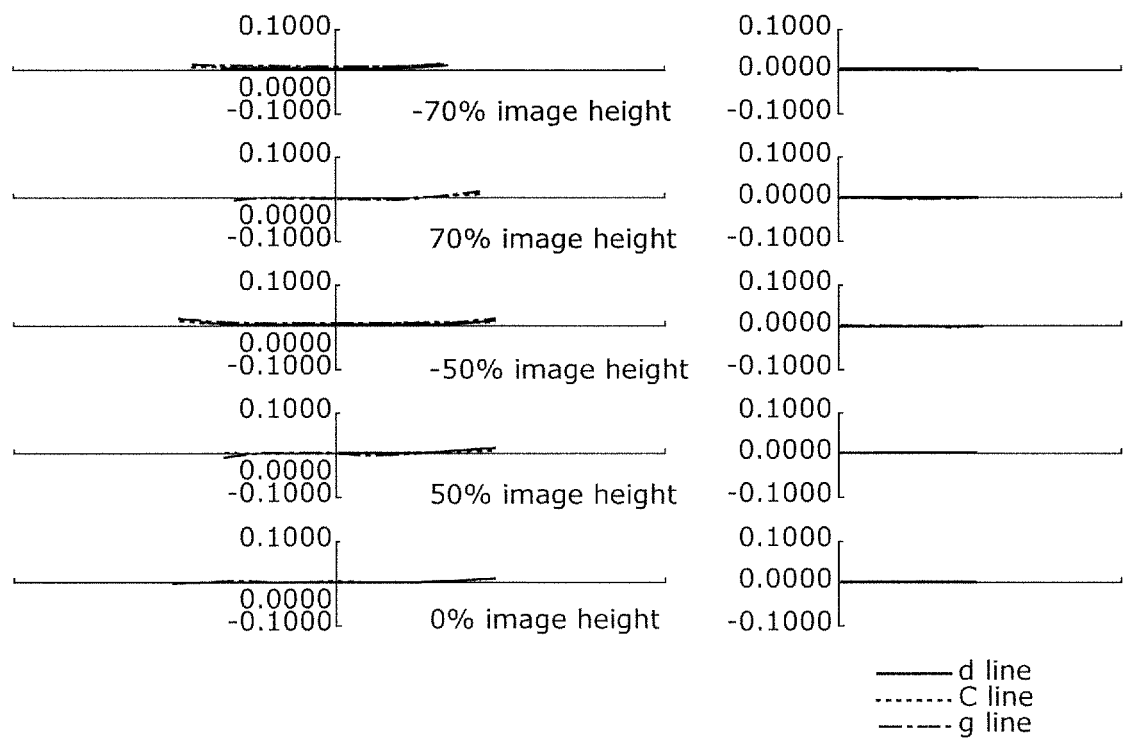
FIG. 20 illustrates lateral aberration during image stabilization with respect to a 0.4-degree vibration angle during infinity focusing at the telephoto extremity of the zooming imaging optical system according to Implementation Example 2.

FIG. 11 illustrates the lens configuration of a zooming imaging optical system according to Implementation Example 2 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, and sixth lens group G6 having positive refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, and sixth lens group G6 moves. Furthermore, when focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and biconvex lens L3 whose flat surface is on the image side.

Second lens group G2 includes, in order from the object side, 2a-th lens group G2a having negative refractive power, 2b-th lens group G2b having negative refractive power, and 2c-th lens group G2c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G2c includes negative meniscus lens L10 whose convex surface is on the object side.

An aperture diaphragm is provided on the object side of third lens group G3 and moves integrally with third lens group G3 during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and plano-convex lens L17 whose flat surface is on the image side, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including positive meniscus lens L20 whose convex surface is on the object side and negative meniscus lens L21 whose convex surface is on the object side.

Implementation Example 3

Figure 21:
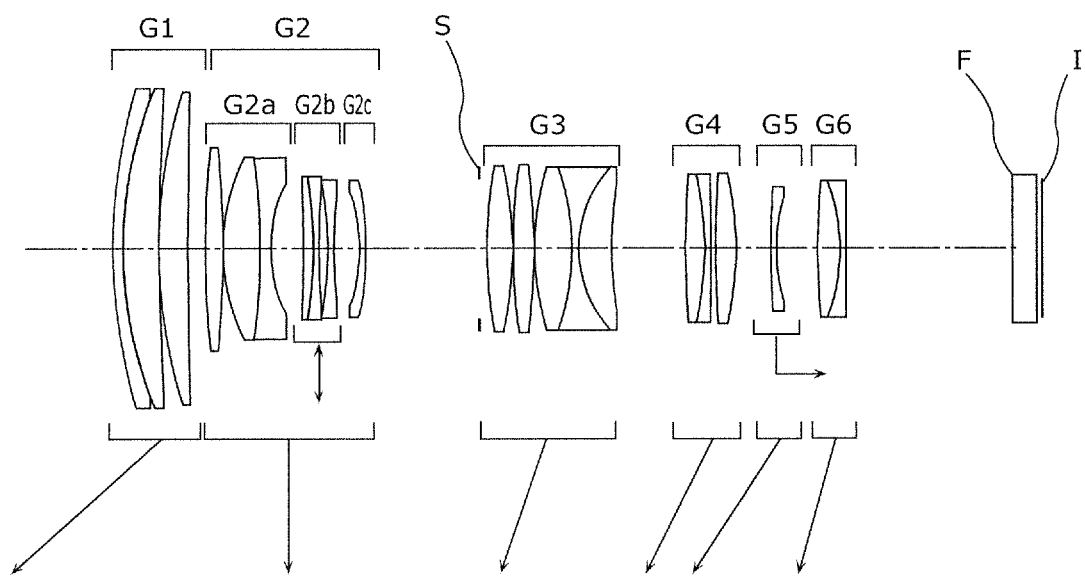
FIG. 21 illustrates the lens configuration of a zooming imaging optical system according to Implementation Example 3 of the present disclosure.
Figure 22:
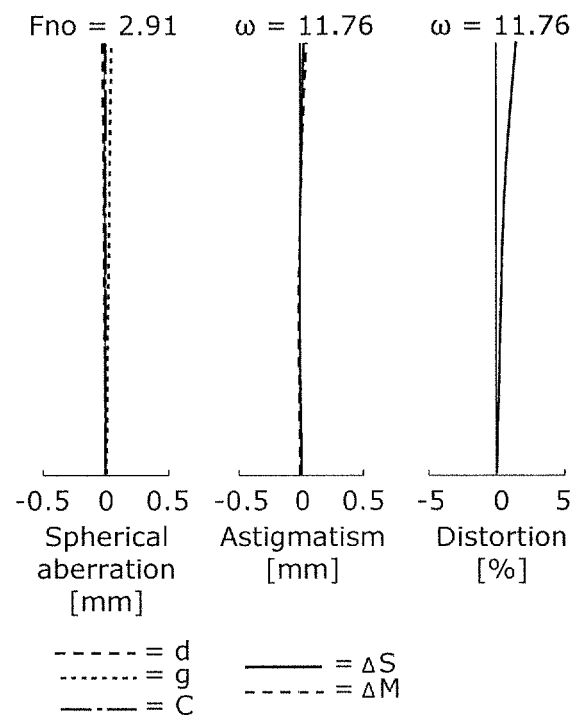
FIG. 22 illustrates longitudinal aberration during infinity focusing at the wide angle extremity of the zooming imaging optical system according to Implementation Example 3.
Figure 23:
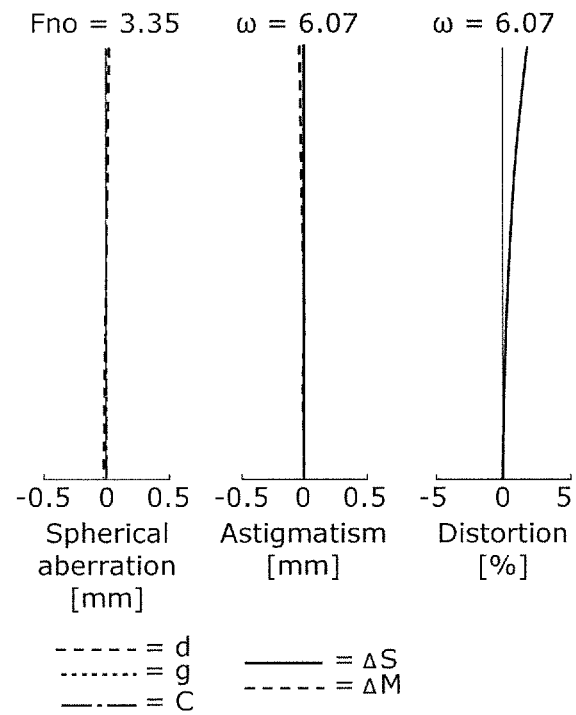
FIG. 23 illustrates longitudinal aberration during infinity focusing at the intermediate focal length of the zooming imaging optical system according to Implementation Example 3.
Figure 24:
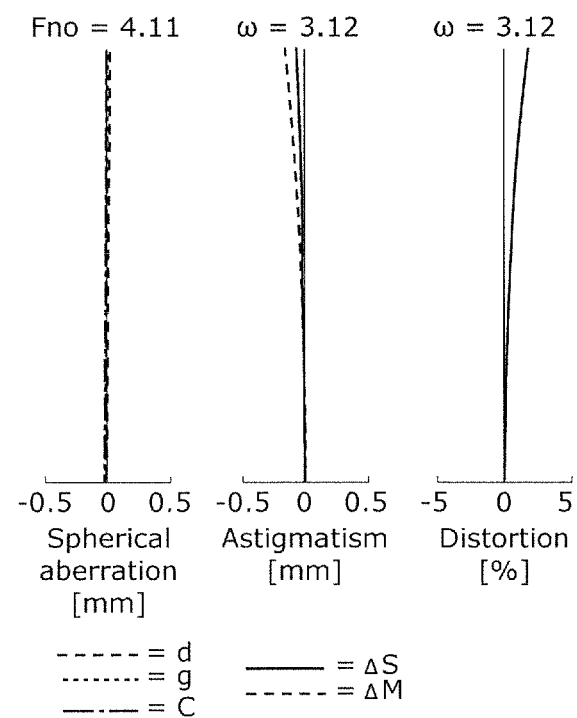
FIG. 24 illustrates longitudinal aberration during infinity focusing at the telephoto extremity of the zooming imaging optical system according to Implementation Example 3.
Figure 25:
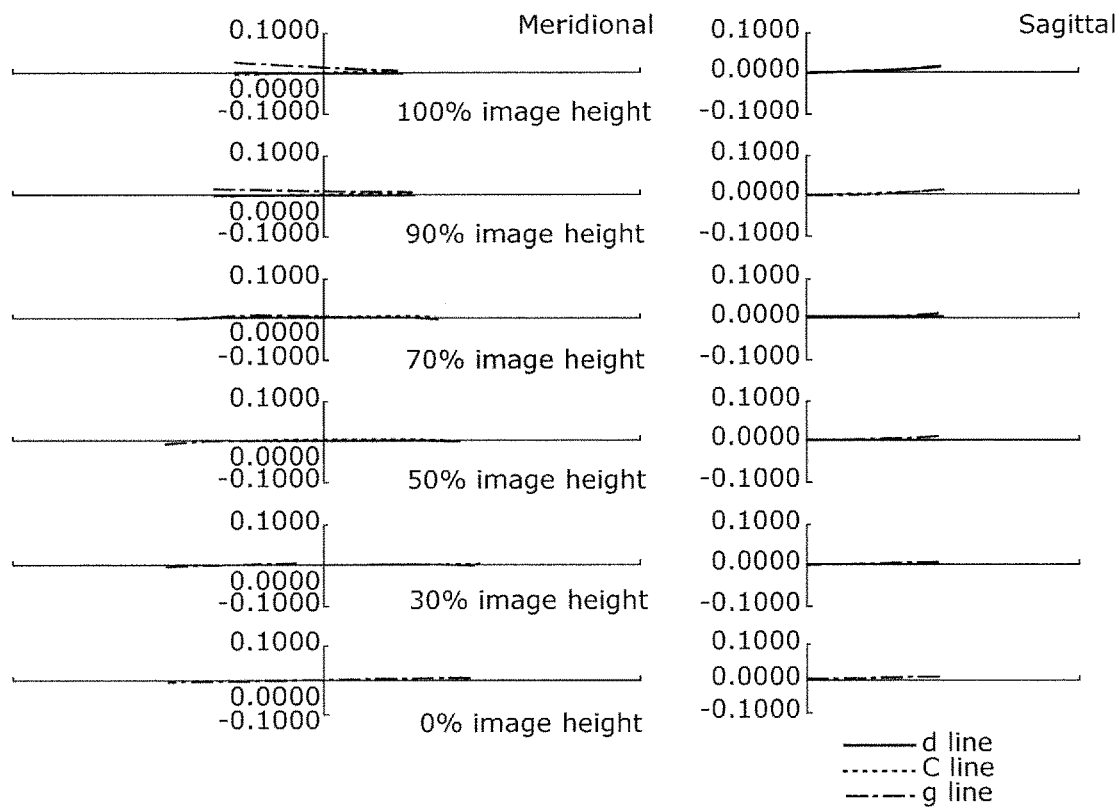
FIG. 25 illustrates lateral aberration during infinity focusing at the wide angle extremity of the zooming imaging optical system according to Implementation Example 3.
Figure 26:
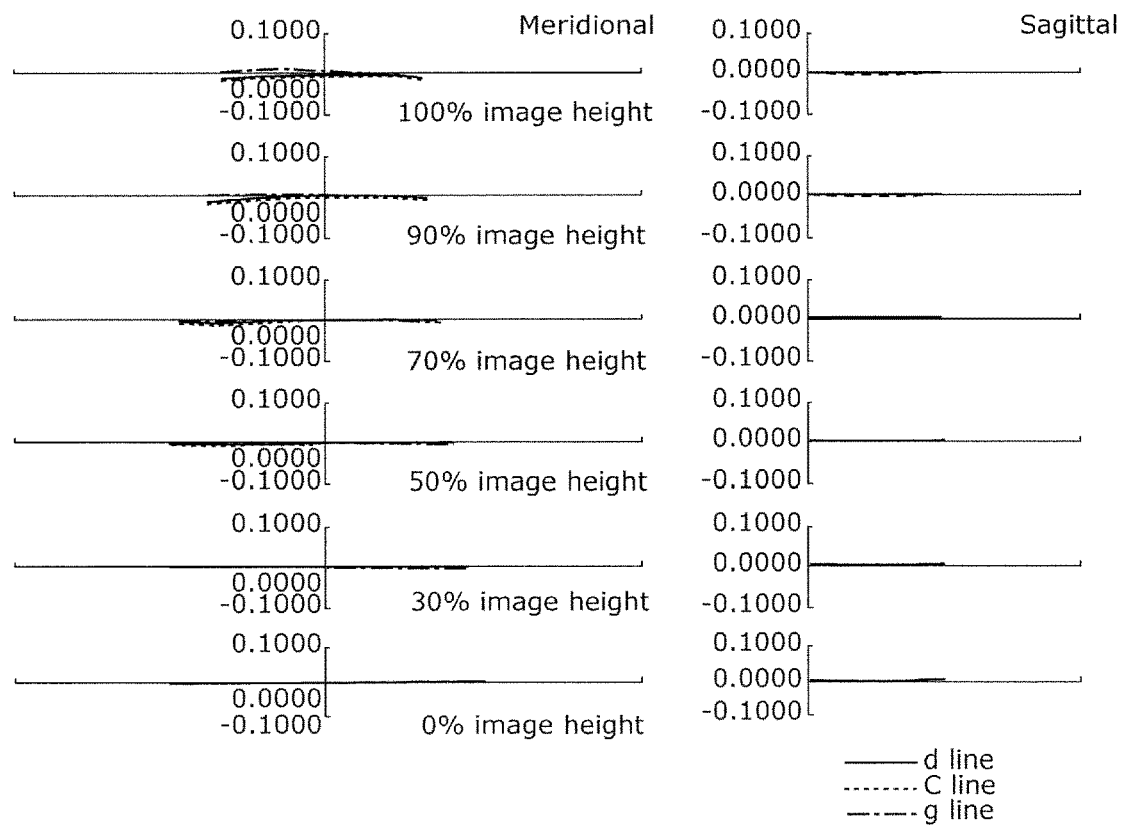
FIG. 26 illustrates lateral aberration during infinity focusing at the intermediate focal length of the zooming imaging optical system according to Implementation Example 3.
Figure 27:
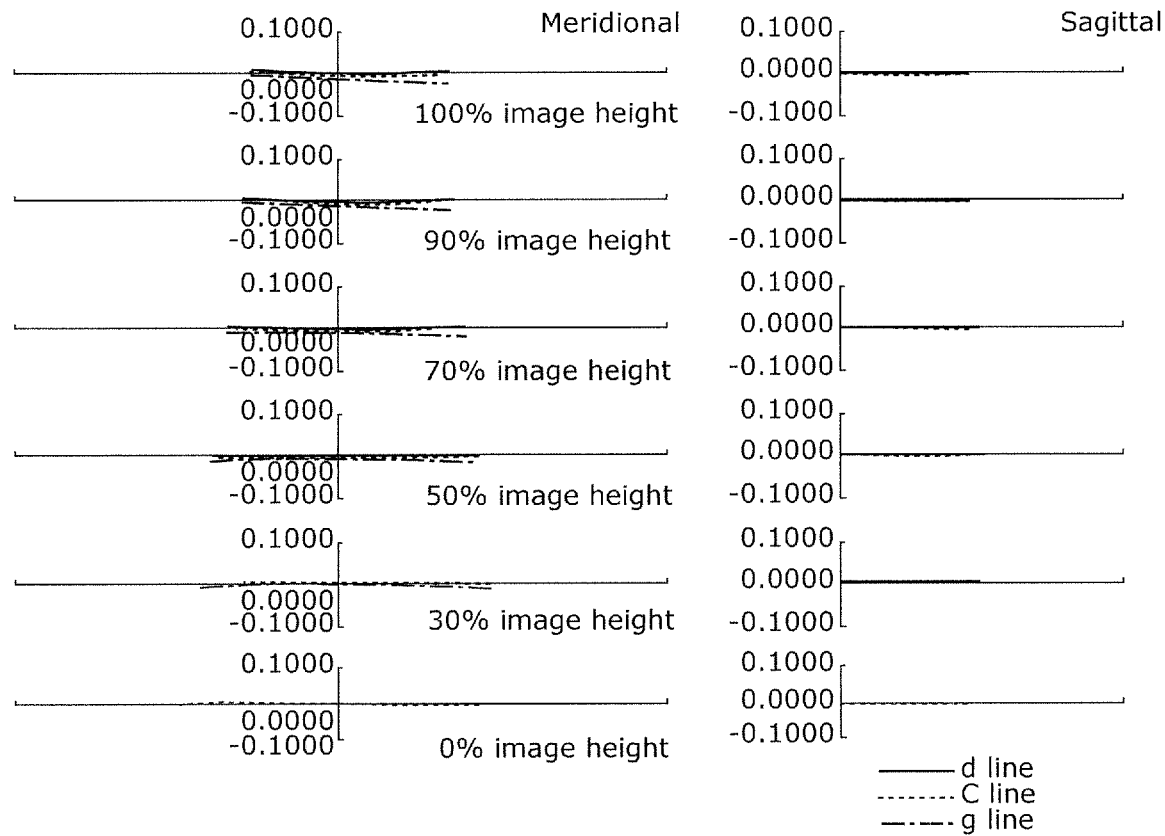
FIG. 27 illustrates lateral aberration during infinity focusing at the telephoto extremity of the zooming imaging optical system according to Implementation Example 3.
Figure 28:
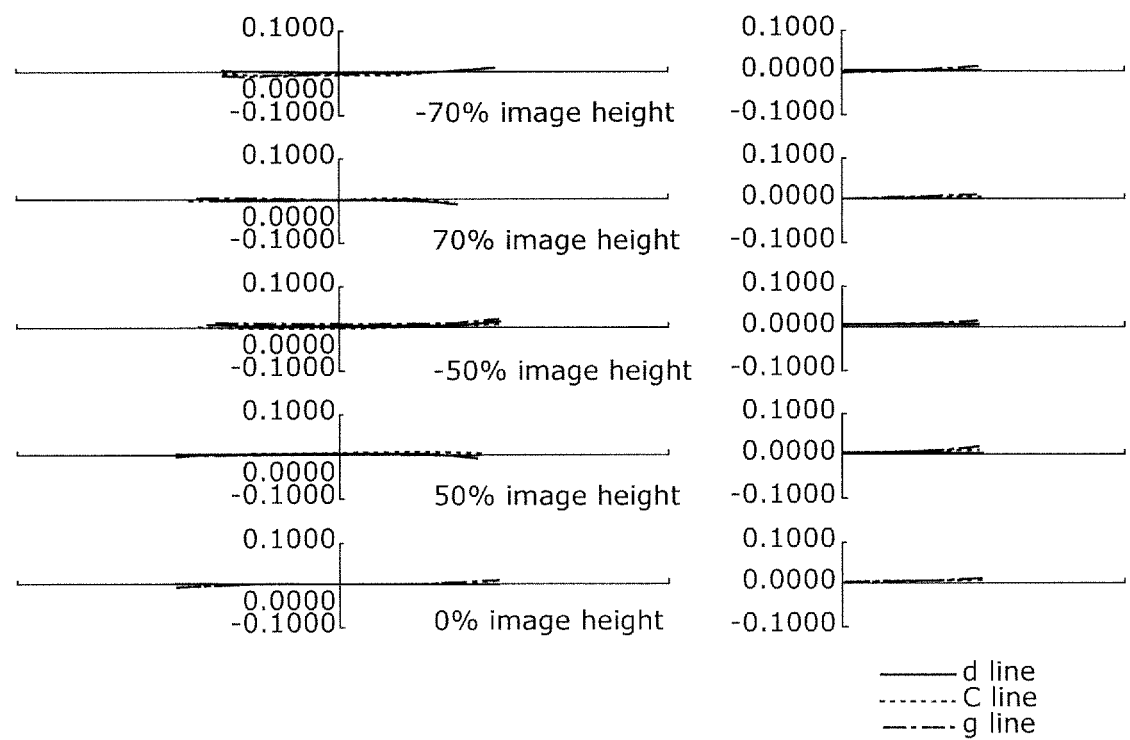
FIG. 28 illustrates lateral aberration during image stabilization with respect to a 0.4-degree vibration angle during infinity focusing at the wide angle extremity of the zooming imaging optical system according to Implementation Example 3.
Figure 29:
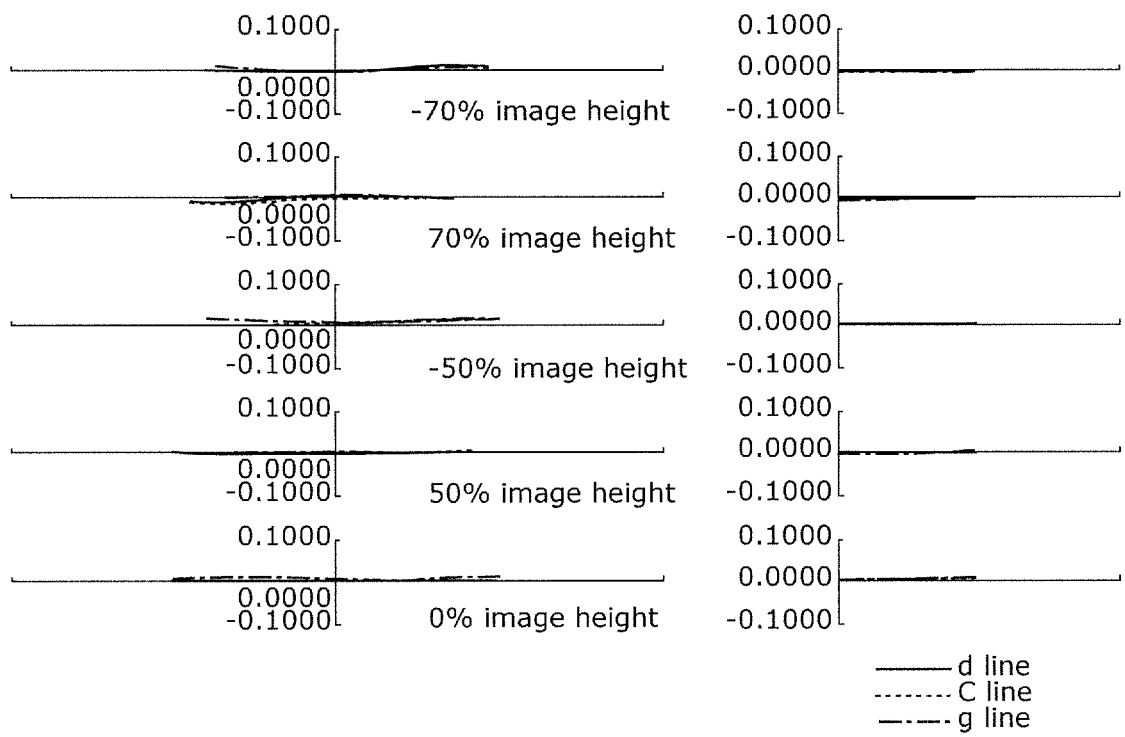
FIG. 29 illustrates lateral aberration during image stabilization with respect to a 0.4-degree vibration angle during infinity focusing at the intermediate focal length of the zooming imaging optical system according to Implementation Example 3.
Figure 30:
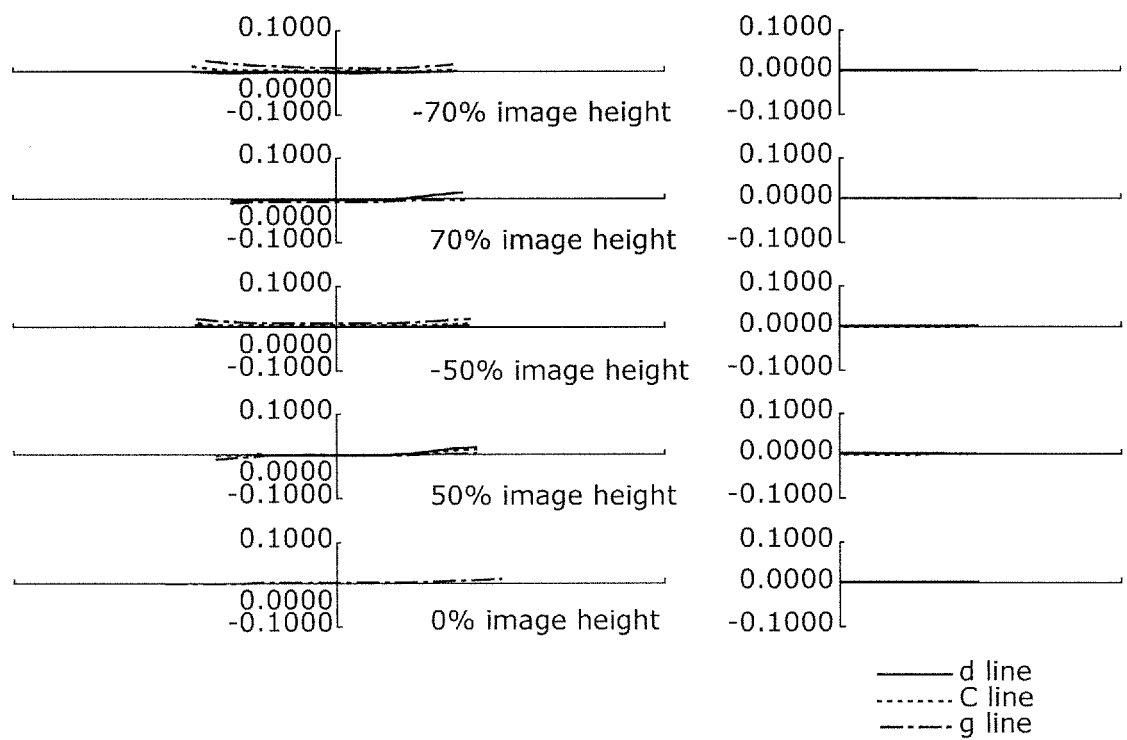
FIG. 30 illustrates lateral aberration during image stabilization with respect to a 0.4-degree vibration angle during infinity focusing at the telephoto extremity of the zooming imaging optical system according to Implementation Example 3.

FIG. 21 illustrates the lens configuration of a zooming imaging optical system according to Implementation Example 3 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, and sixth lens group G6 having negative refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, and sixth lens group G6 moves to the object side. Furthermore, when focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and positive meniscus lens L3 whose convex surface is on the object side.

Second lens group G2 includes, in order from the object side, 2a-th lens group G2a having negative refractive power, 2b-th lens group G2b having negative refractive power, and 2c-th lens group G1c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G1c includes negative meniscus lens L10 whose convex surface is on the object side.

An aperture diaphragm is provided on the object side of third lens group G3 and moves integrally with third lens group G3 during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and negative meniscus lens L17 whose convex surface is on the image side, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including biconvex lens L20 and plano-convex lens L21 whose flat surface is on the image side.

Implementation Example 4

Figure 31:
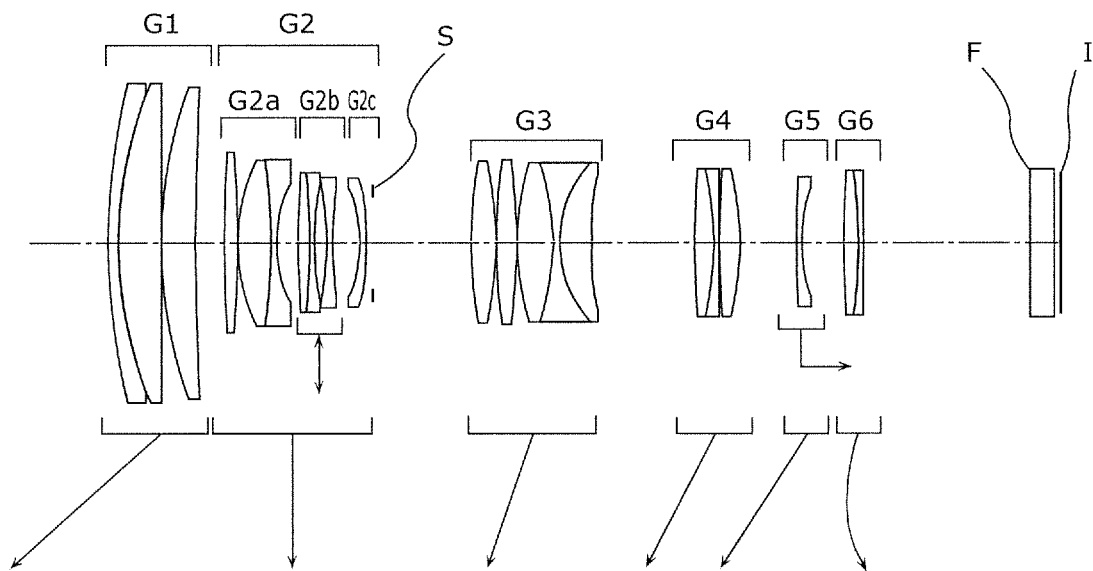
FIG. 31 illustrates the lens configuration of a zooming imaging optical system according to Implementation Example 4 of the present disclosure.
Figure 32:
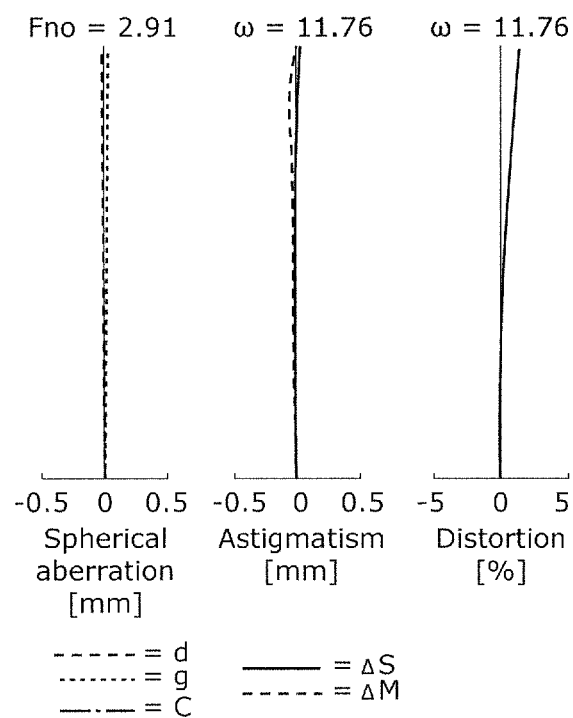
FIG. 32 illustrates longitudinal aberration during infinity focusing at the wide angle extremity of the zooming imaging optical system according to Implementation Example 4.
Figure 33:
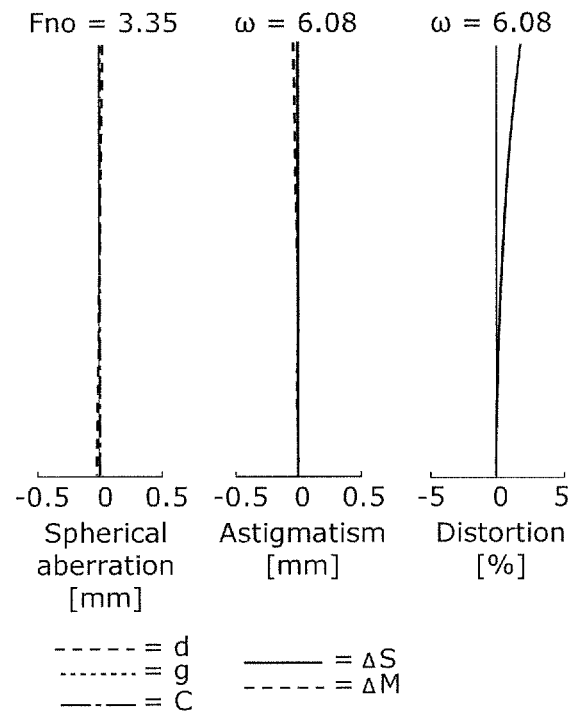
FIG. 33 illustrates longitudinal aberration during infinity focusing at the intermediate focal length of the zooming imaging optical system according to Implementation Example 4.
Figure 34:
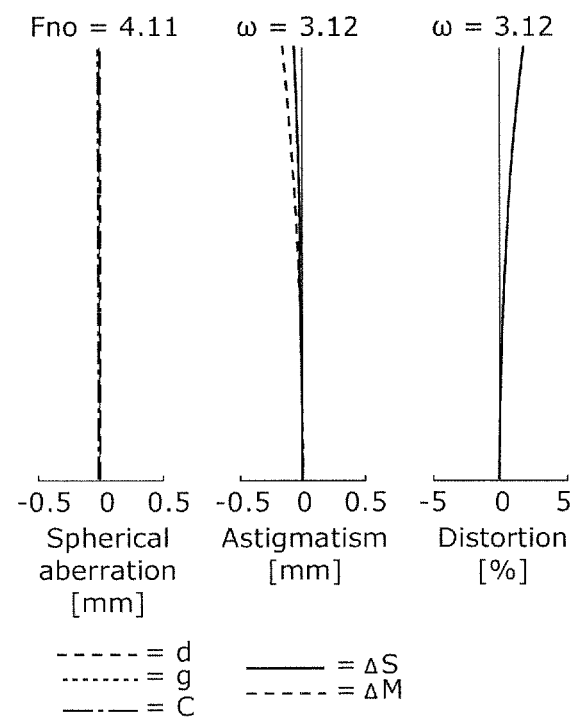
FIG. 34 illustrates longitudinal aberration during infinity focusing at the telephoto extremity of the zooming imaging optical system according to Implementation Example 4.
Figure 35:
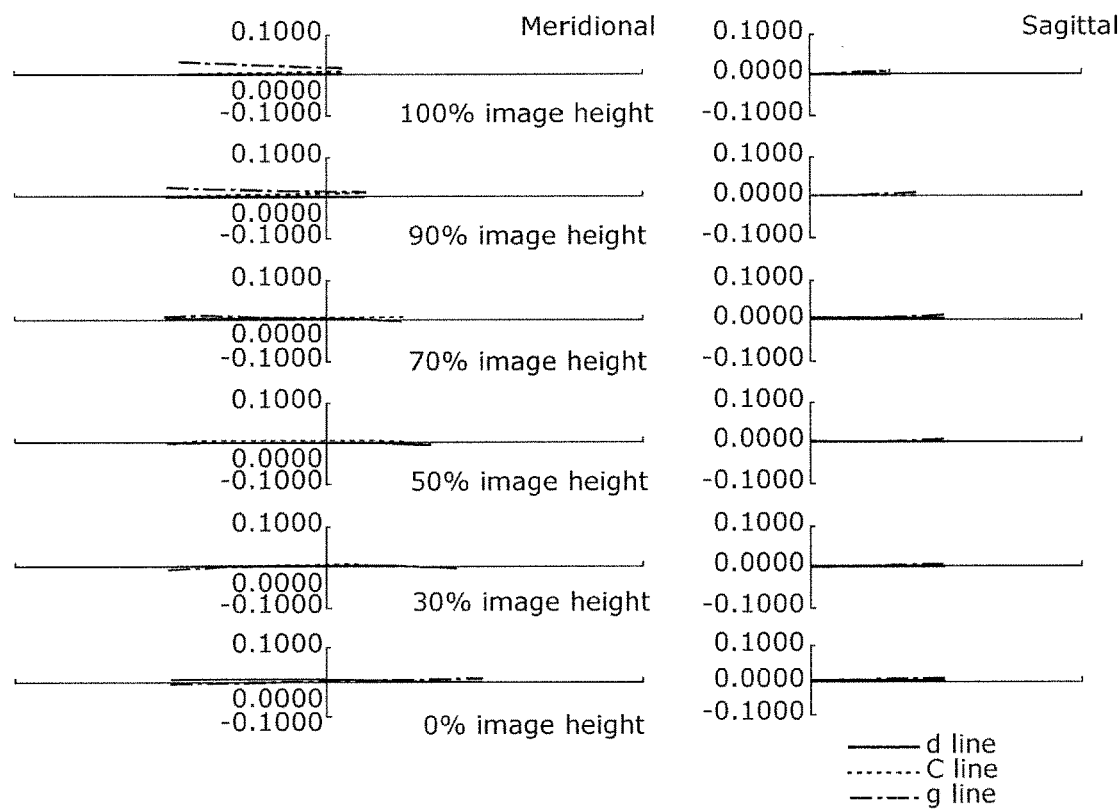
FIG. 35 illustrates lateral aberration during infinity focusing at the wide angle extremity of the zooming imaging optical system according to Implementation Example 4.
Figure 36:
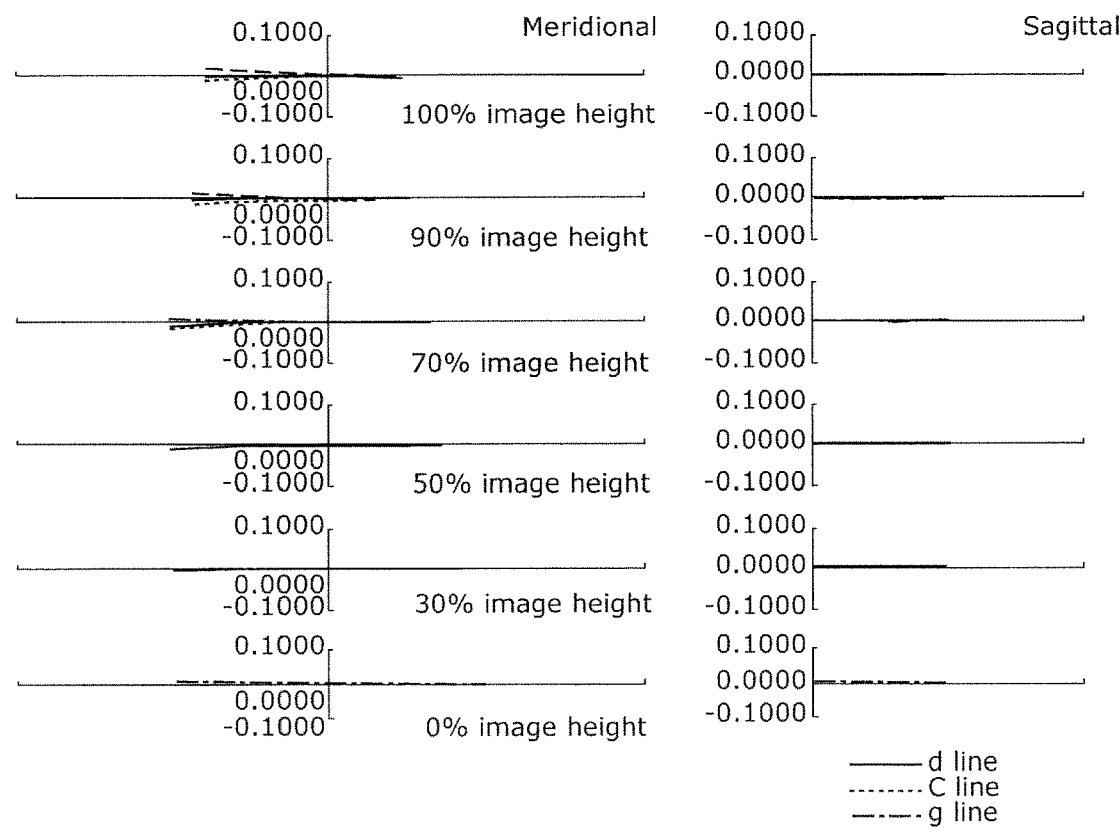
FIG. 36 illustrates lateral aberration during infinity focusing at the intermediate focal length of the zooming imaging optical system according to Implementation Example 4.
Figure 37:
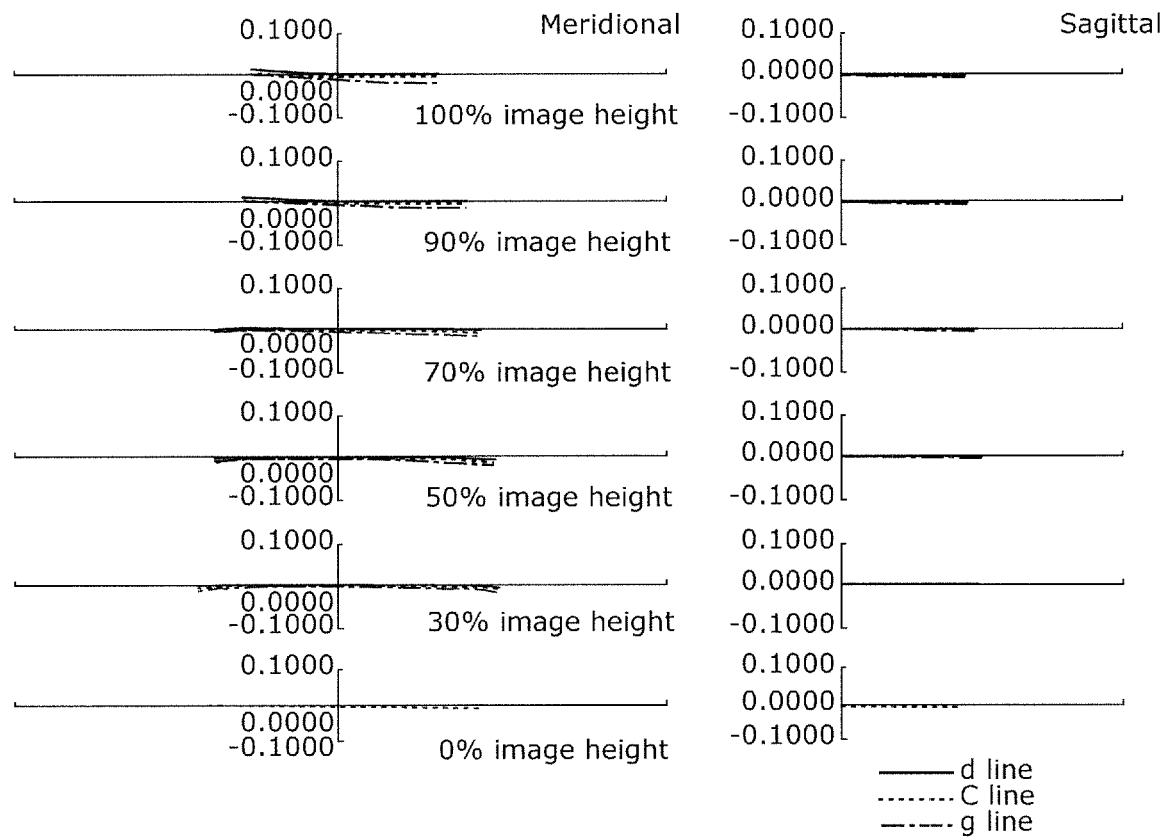
FIG. 37 illustrates lateral aberration during infinity focusing at the telephoto extremity of the zooming imaging optical system according to Implementation Example 4.
Figure 38:
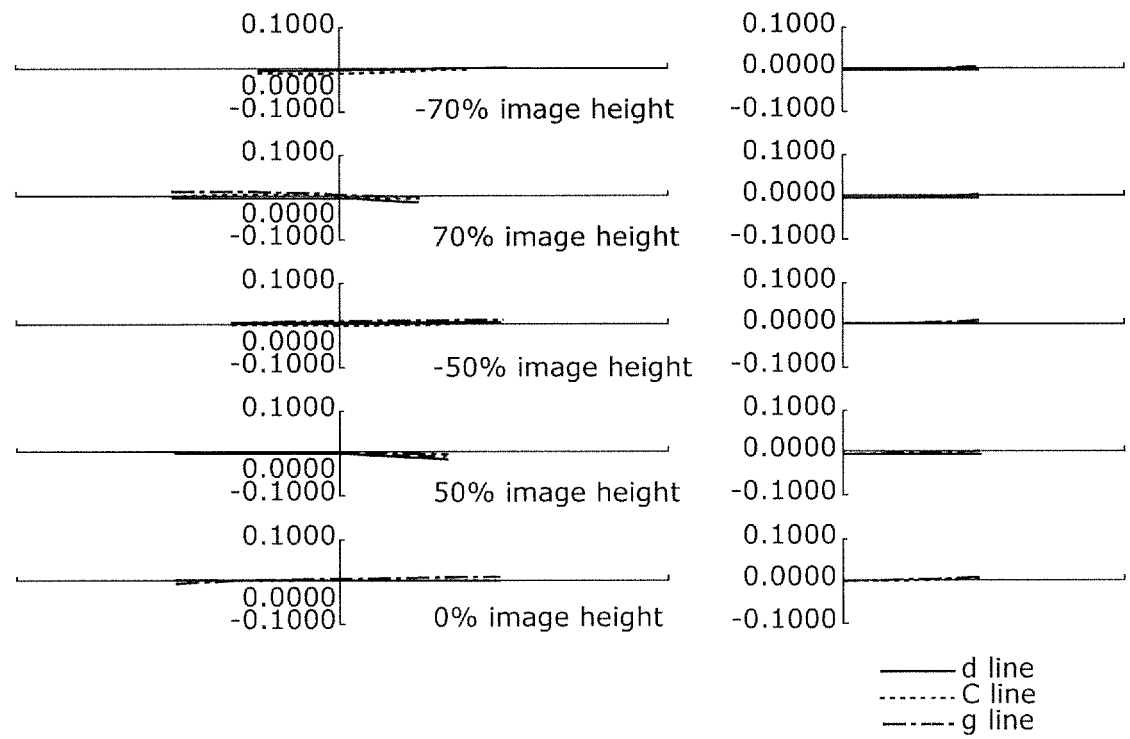
FIG. 38 illustrates lateral aberration during image stabilization with respect to a 0.4-degree vibration angle during infinity focusing at the wide angle extremity of the zooming imaging optical system according to Implementation Example 4.
Figure 39:
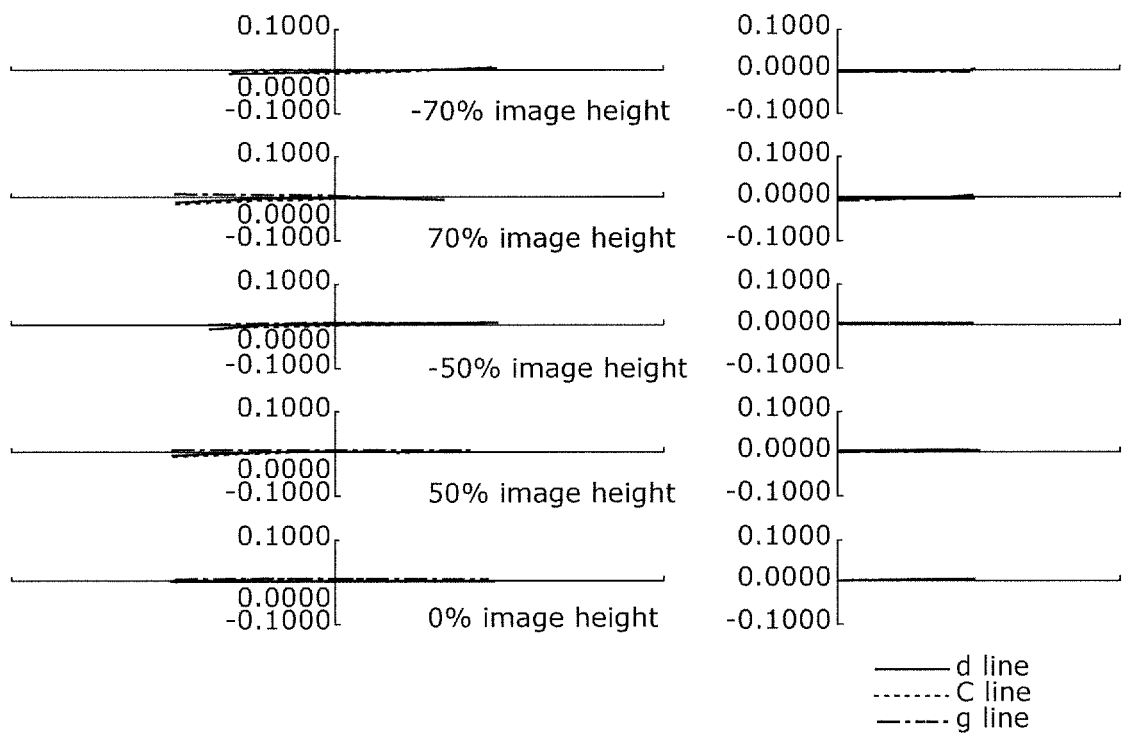
FIG. 39 illustrates lateral aberration during image stabilization with respect to a 0.4-degree vibration angle during infinity focusing at the intermediate focal length of the zooming imaging optical system according to Implementation Example 4.
Figure 40:
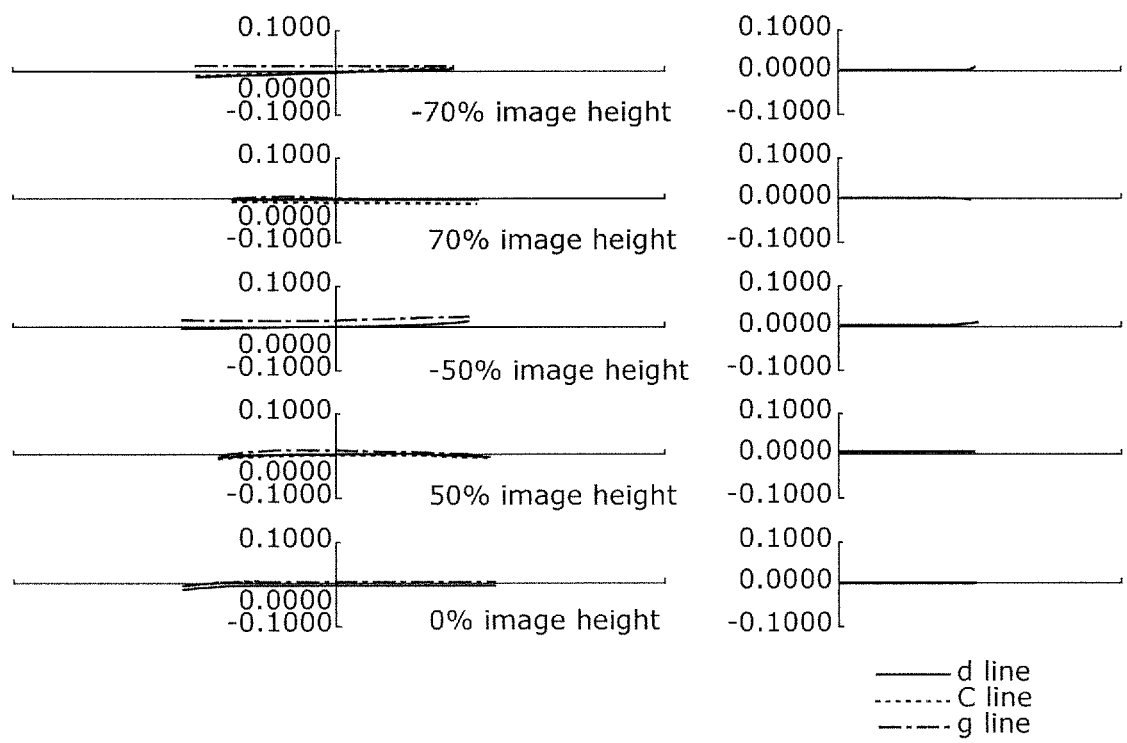
FIG. 40 illustrates lateral aberration during image stabilization with respect to a 0.4-degree vibration angle during infinity focusing at the telephoto extremity of the zooming imaging optical system according to Implementation Example 4.

FIG. 31 illustrates the lens configuration of a zooming imaging optical system according to Implementation Example 4 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, and sixth lens group G6 having positive refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, and sixth lens group G6 moves. Furthermore, when focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and positive meniscus lens L3 whose convex surface is on the object side.

Second lens group G2 includes, in order from the object side, 2a-th lens group G2a having negative refractive power, 2b-th lens group G2b having negative refractive power, and 2c-th lens group G2c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G2c includes negative meniscus lens L10 whose convex surface is on the object side.

An aperture diaphragm is provided on the image side of second lens group G2 and is fixed to the imaging surface during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and biconcave lens L17, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including biconvex lens L20 and plano-convex lens L21 whose flat surface is on the image side.

Implementation Example 5

Figure 41:
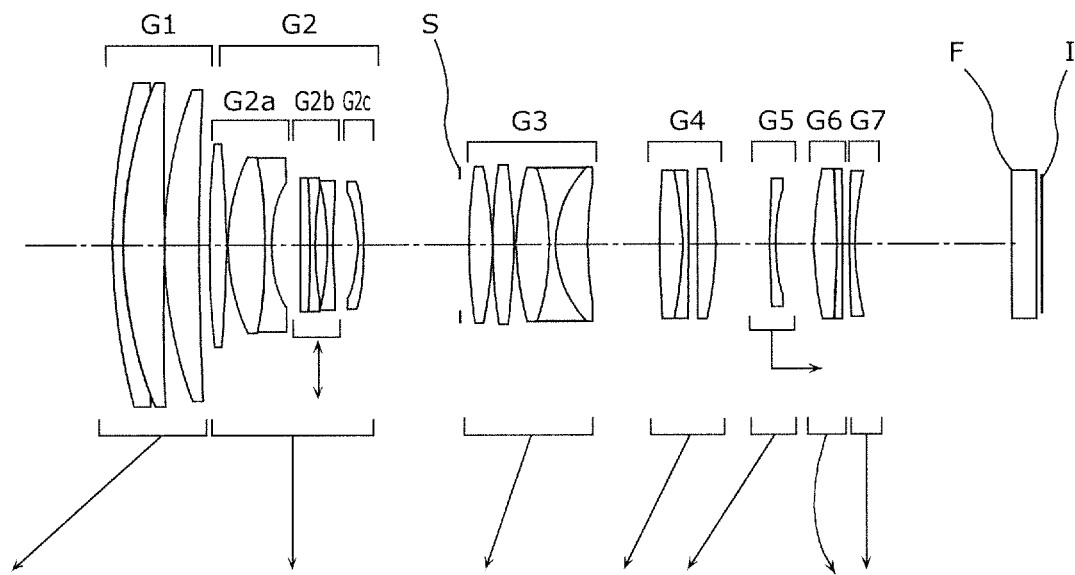
FIG. 41 illustrates the lens configuration of a zooming imaging optical system according to Implementation Example 5 of the present disclosure.
Figure 42:
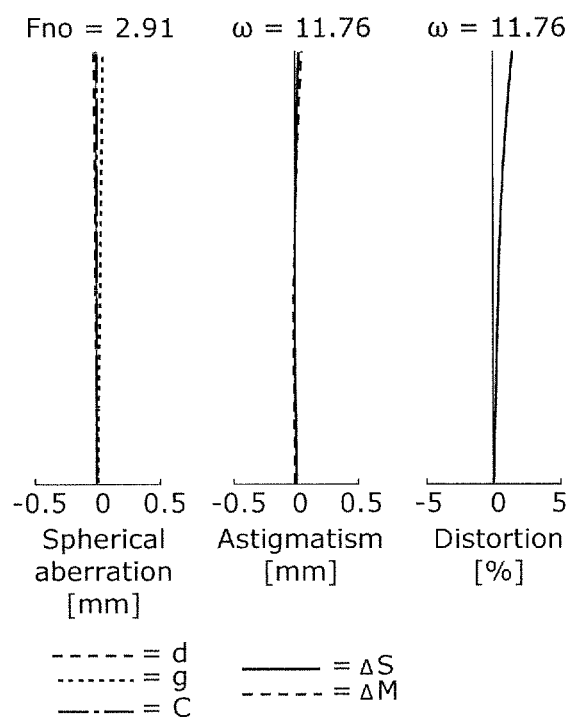
FIG. 42 illustrates longitudinal aberration during infinity focusing at the wide angle extremity of the zooming imaging optical system according to Implementation Example 5.
Figure 43:
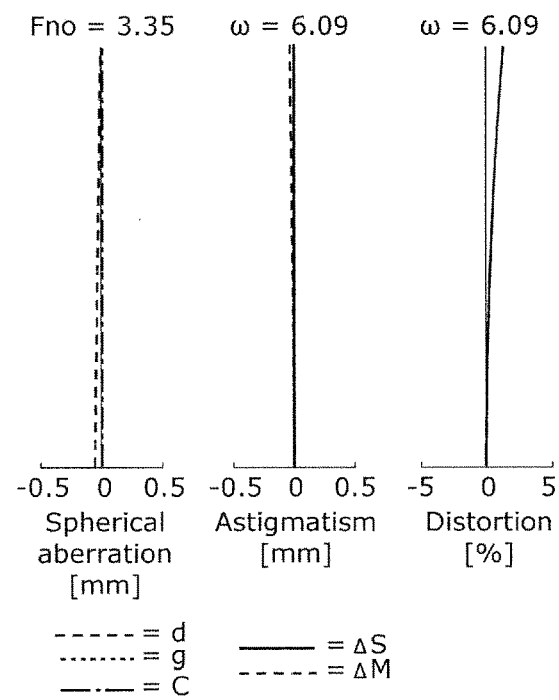
FIG. 43 illustrates longitudinal aberration during infinity focusing at the intermediate focal length of the zooming imaging optical system according to Implementation Example 5.
Figure 44:
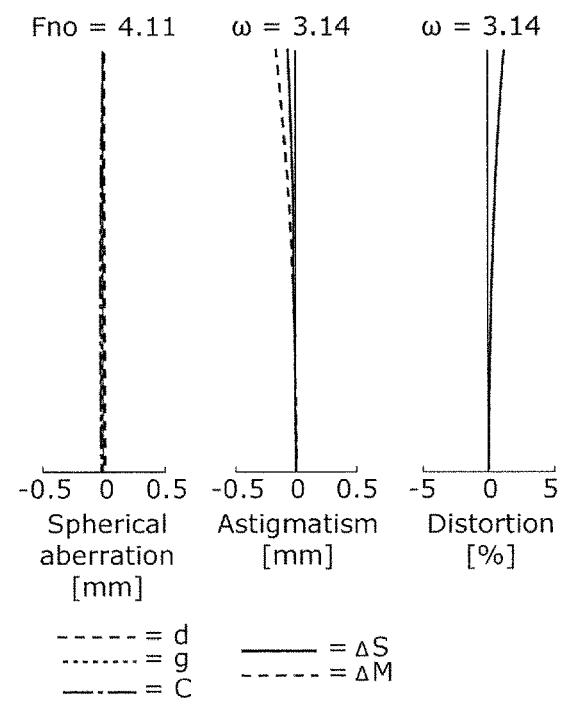
FIG. 44 illustrates longitudinal aberration during infinity focusing at the telephoto extremity of the zooming imaging optical system according to Implementation Example 5.
Figure 45:
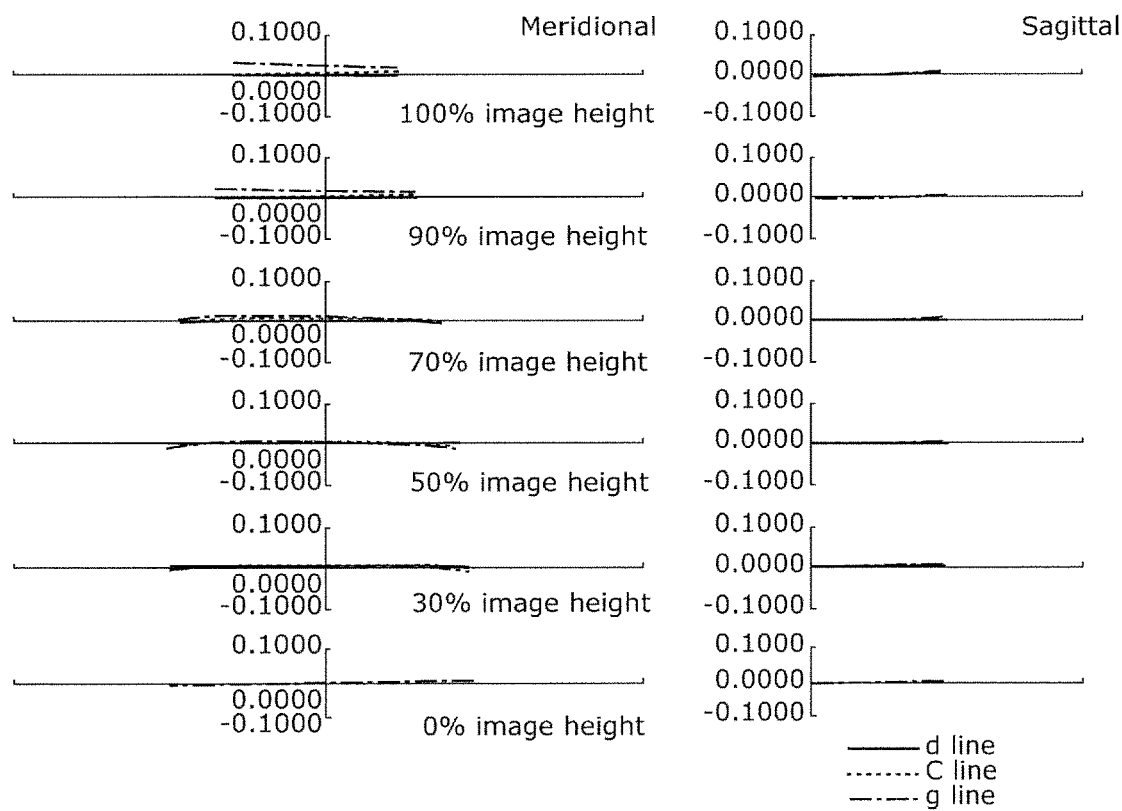
FIG. 45 illustrates lateral aberration during infinity focusing at the wide angle extremity of the zooming imaging optical system according to Implementation Example 5.
Figure 46:
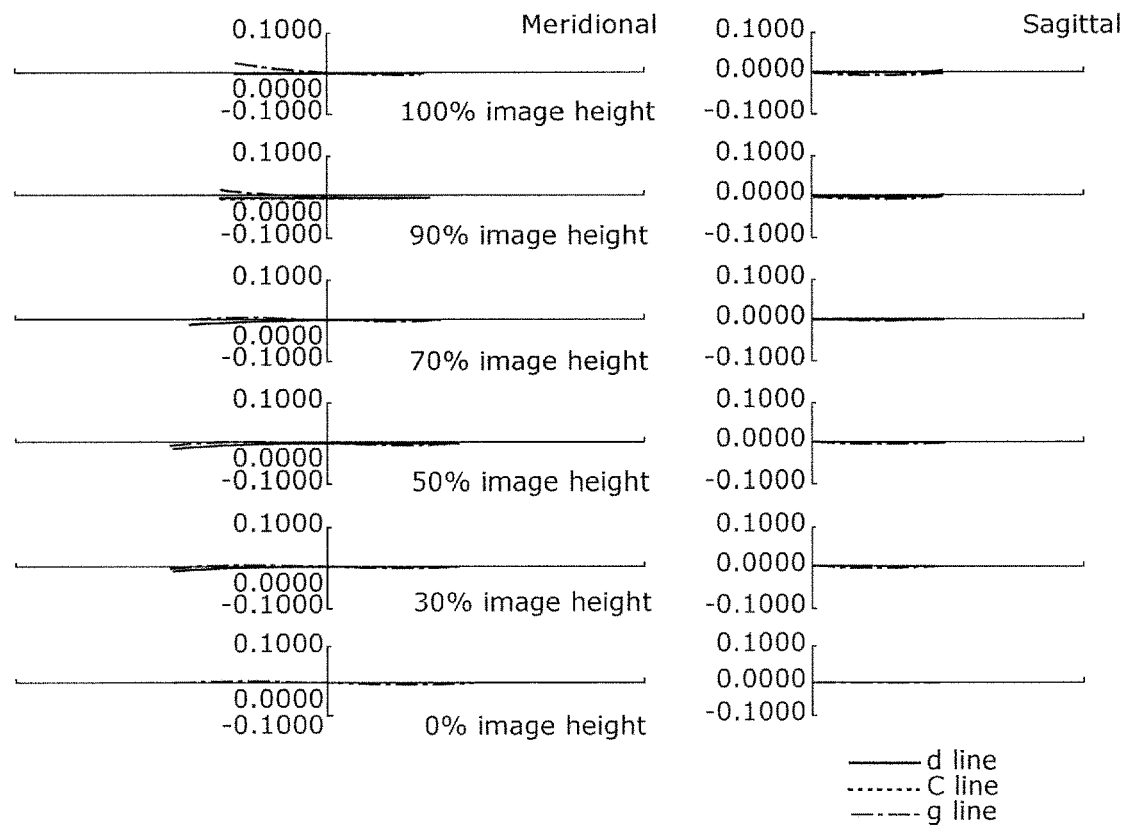
FIG. 46 illustrates lateral aberration during infinity focusing at the intermediate focal length of the zooming imaging optical system according to Implementation Example 5.
Figure 47:
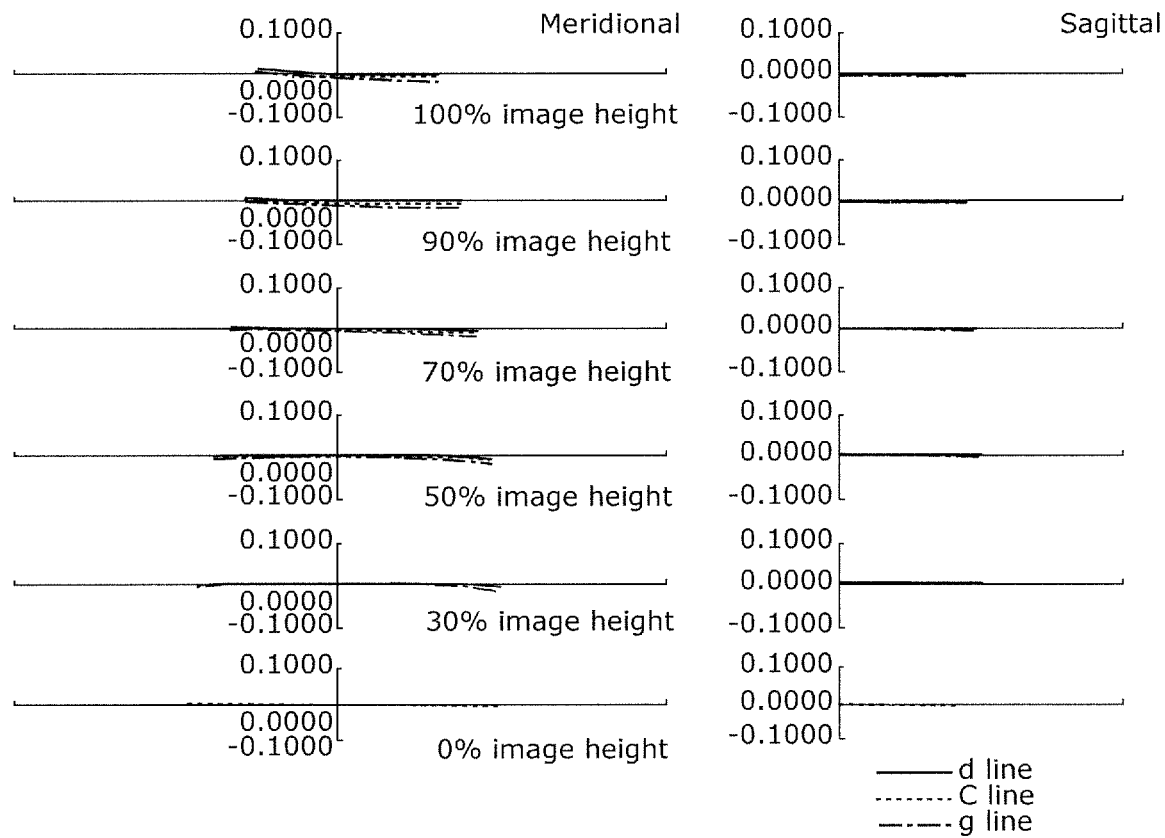
FIG. 47 illustrates lateral aberration during infinity focusing at the telephoto extremity of the zooming imaging optical system according to Implementation Example 5.
Figure 48:
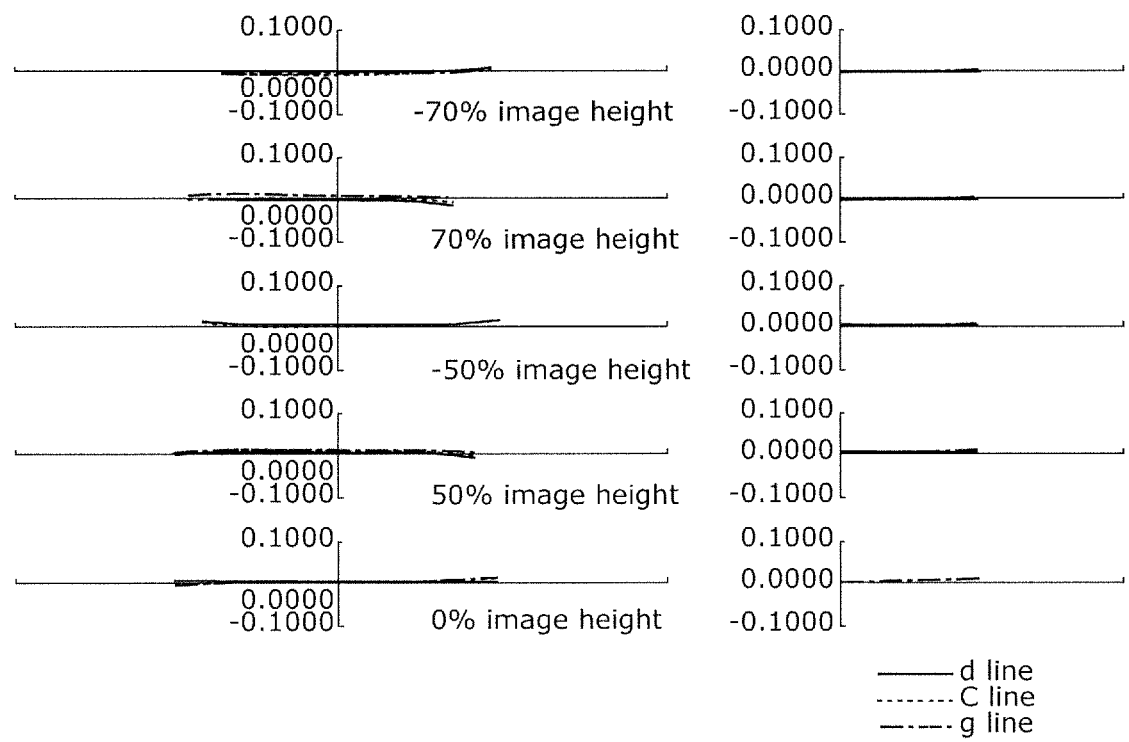
FIG. 48 illustrates lateral aberration during image stabilization with respect to a 0.4-degree vibration angle during infinity focusing at the wide angle extremity of the zooming imaging optical system according to Implementation Example 5.
Figure 49:
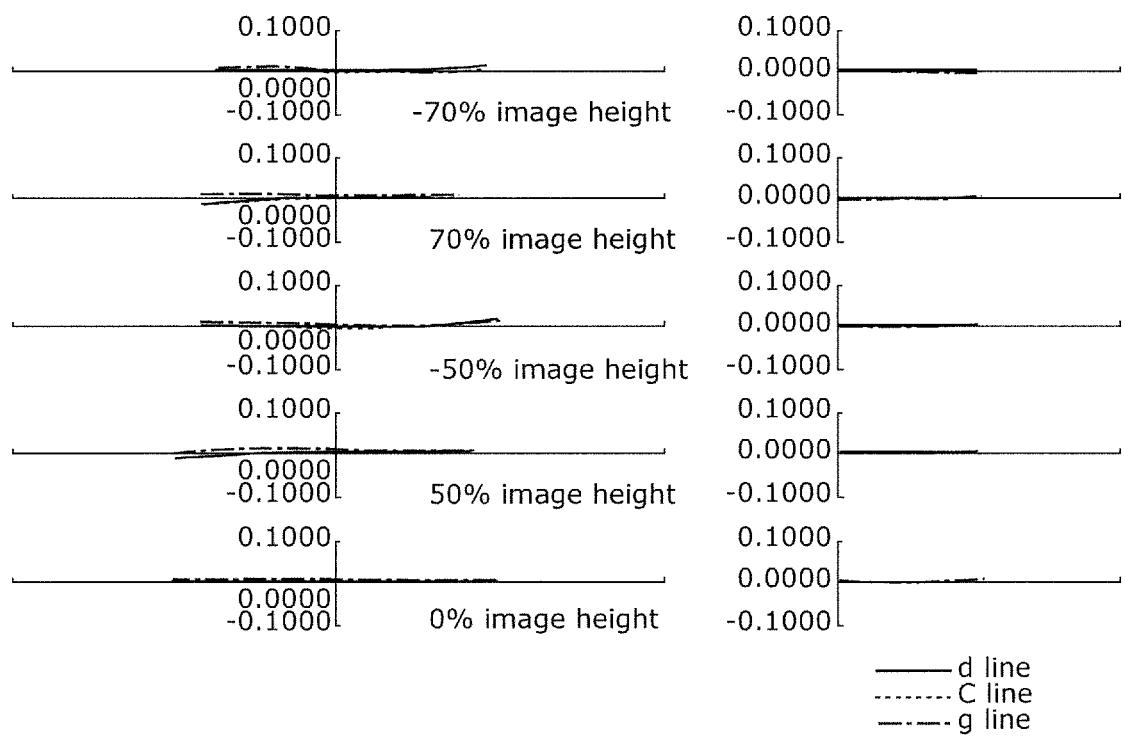
FIG. 49 illustrates lateral aberration during image stabilization with respect to a 0.4-degree vibration angle during infinity focusing at the intermediate focal length of the zooming imaging optical system according to Implementation Example 5.
Figure 50:
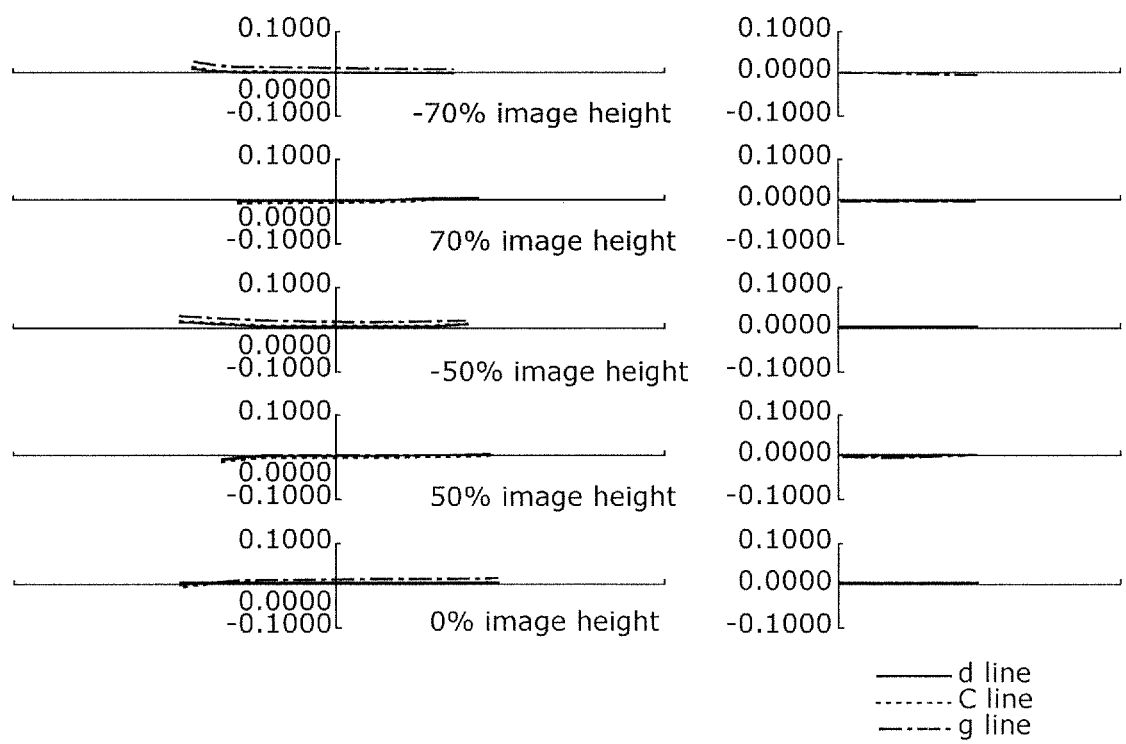
FIG. 50 illustrates lateral aberration during image stabilization with respect to a 0.4-degree vibration angle during infinity focusing at the telephoto extremity of the zooming imaging optical system according to Implementation Example 5.

FIG. 41 illustrates the lens configuration of a zooming imaging optical system according to Implementation Example 5 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, sixth lens group G6 having positive refractive power, and seventh lens group G7 having negative refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, sixth lens group G6 moves, and seventh lens group G7 is fixed. Furthermore, when focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and positive meniscus lens L3 whose convex surface is on the object side.

Second lens group G2 includes, in order from the object side, 2a-th lens group G2a having negative refractive power, 2b-th lens group G2b having negative refractive power, and 2c-th lens group G2c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G2c includes negative meniscus lens L10 whose convex surface is on the object side.

An aperture diaphragm is provided on the object side of third lens group G3 and moves integrally with third lens group G3 during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and negative meniscus lens L17 whose convex surface is on the image side, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including biconvex lens L20 and biconcave lens L21.

Seventh lens group G7 includes negative meniscus lens L22 whose convex surface is on the object side.

Implementation Example 6

Figure 51:
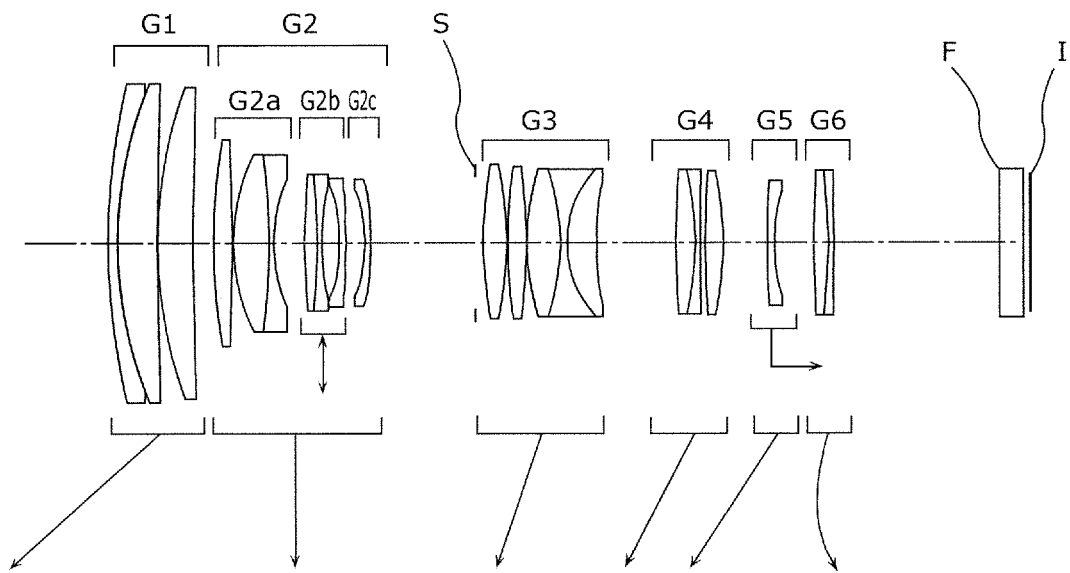
FIG. 51 illustrates the lens configuration of a zooming imaging optical system according to Implementation Example 6 of the present disclosure.
Figure 52:
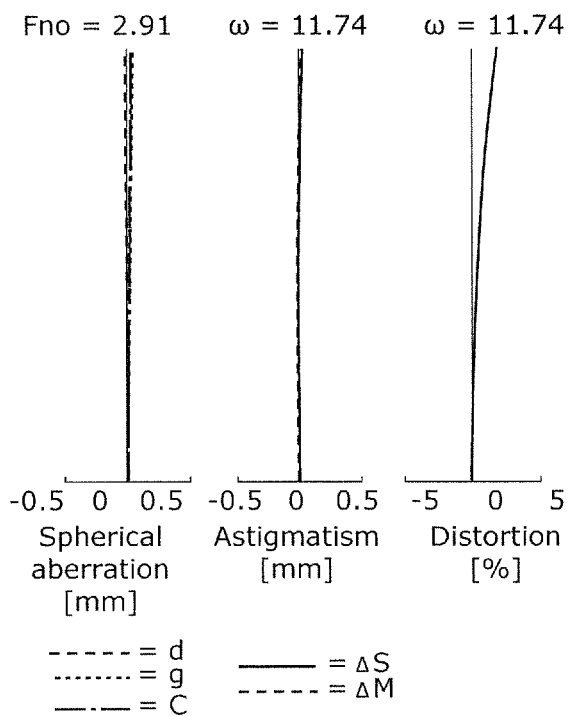
FIG. 52 illustrates longitudinal aberration during infinity focusing at the wide angle extremity of the zooming imaging optical system according to Implementation Example 6.
Figure 53:
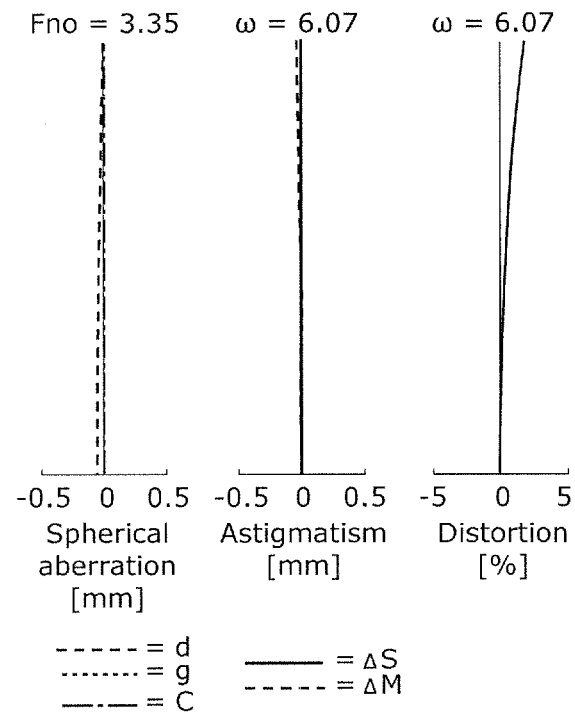
FIG. 53 illustrates longitudinal aberration during infinity focusing at the intermediate focal length of the zooming imaging optical system according to Implementation Example 6.
Figure 54:
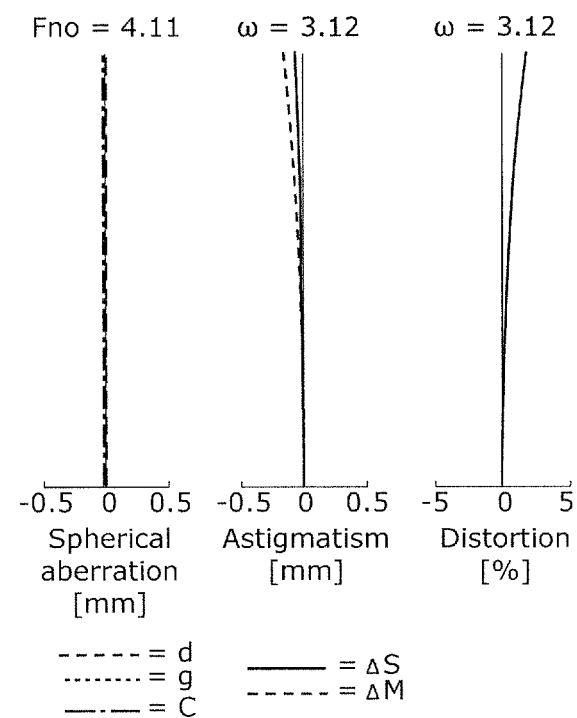
FIG. 54 illustrates longitudinal aberration during infinity focusing at the telephoto extremity of the zooming imaging optical system according to Implementation Example 6.
Figure 55:
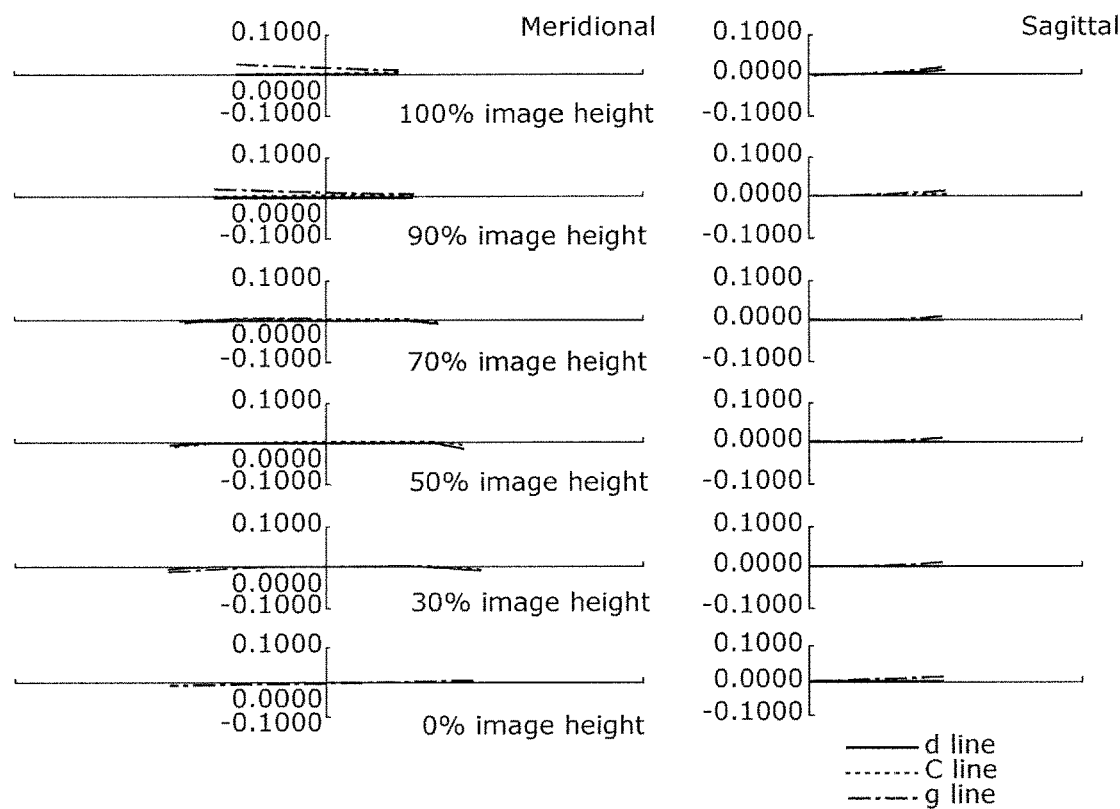
FIG. 55 illustrates lateral aberration during infinity focusing at the wide angle extremity of the zooming imaging optical system according to Implementation Example 6.
Figure 56:
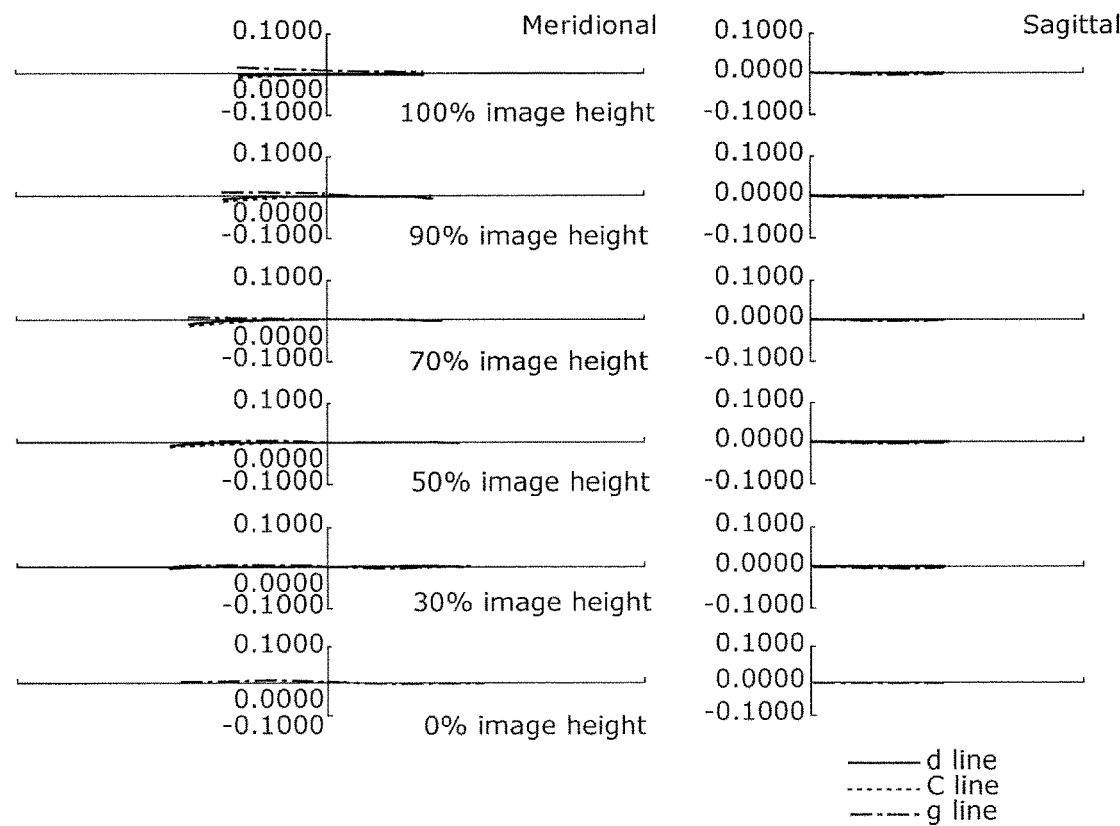
FIG. 56 illustrates lateral aberration during infinity focusing at the intermediate focal length of the zooming imaging optical system according to Implementation Example 6.
Figure 57:
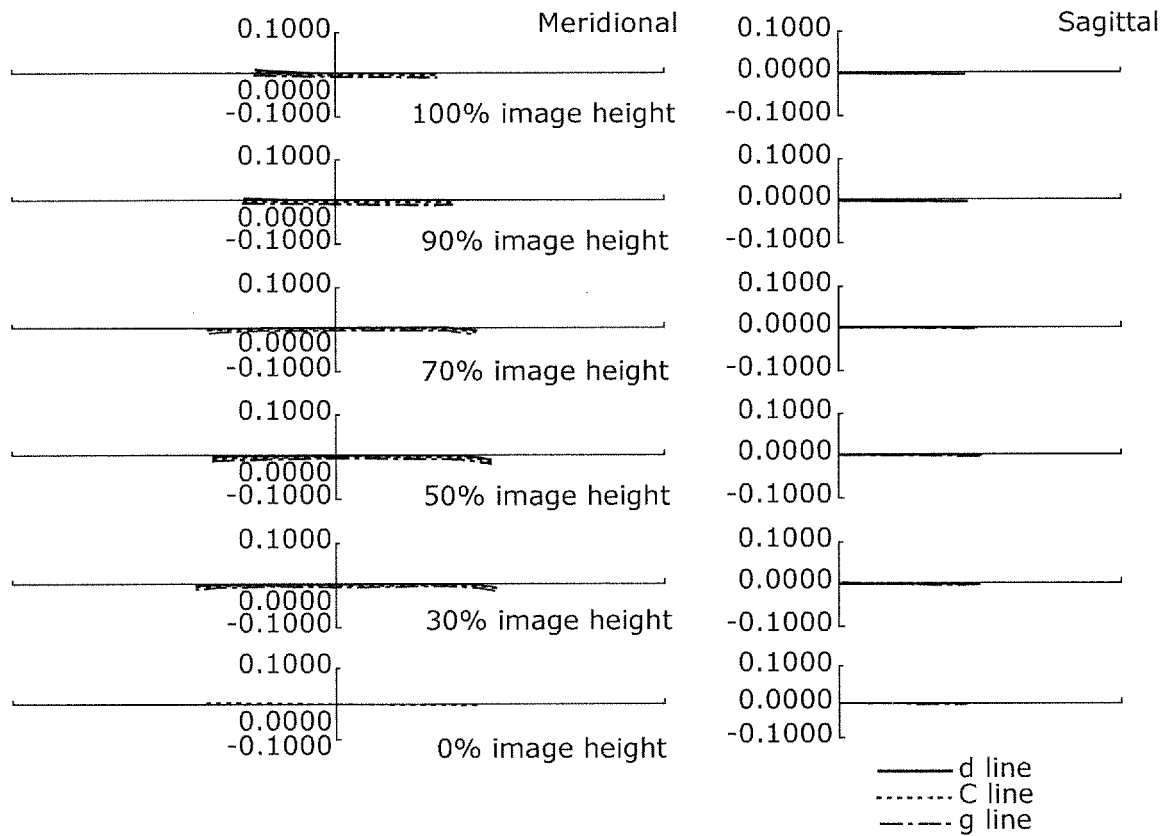
FIG. 57 illustrates lateral aberration during infinity focusing at the telephoto extremity of the zooming imaging optical system according to Implementation Example 6.
Figure 58:
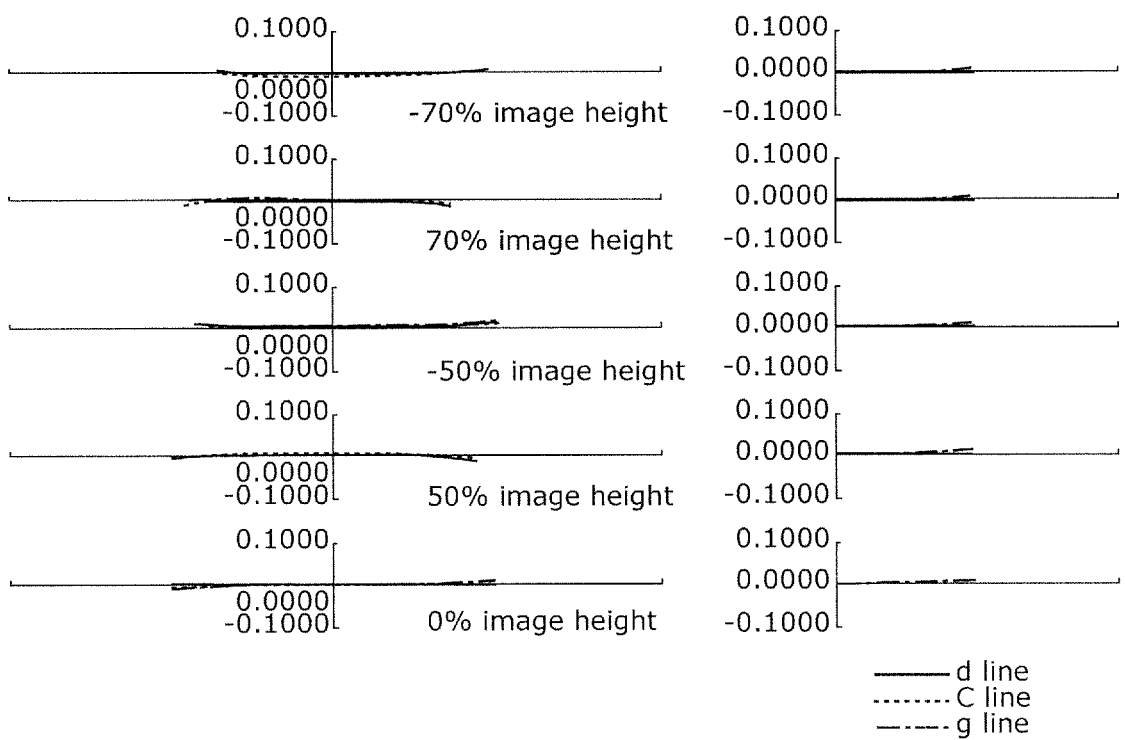
FIG. 58 illustrates lateral aberration during image stabilization with respect to a 0.4-degree vibration angle during infinity focusing at the wide angle extremity of the zooming imaging optical system according to Implementation Example 6.
Figure 59:
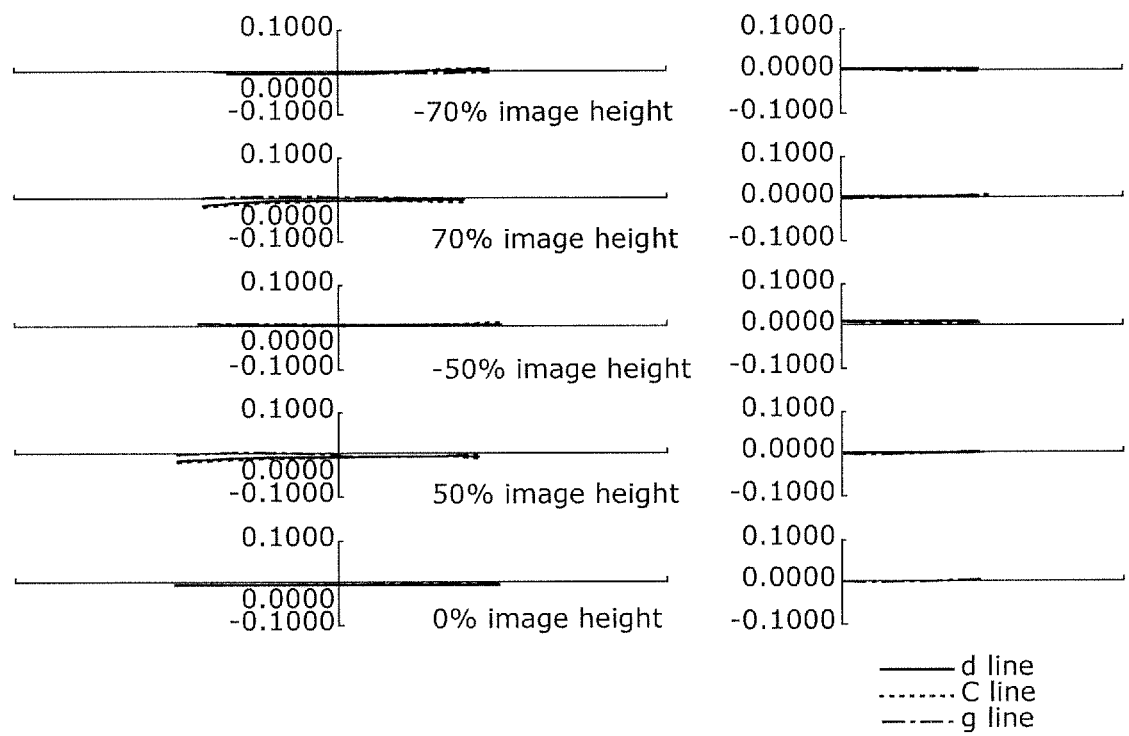
FIG. 59 illustrates lateral aberration during image stabilization with respect to a 0.4-degree vibration angle during infinity focusing at the intermediate focal length of the zooming imaging optical system according to Implementation Example 6.
Figure 60:
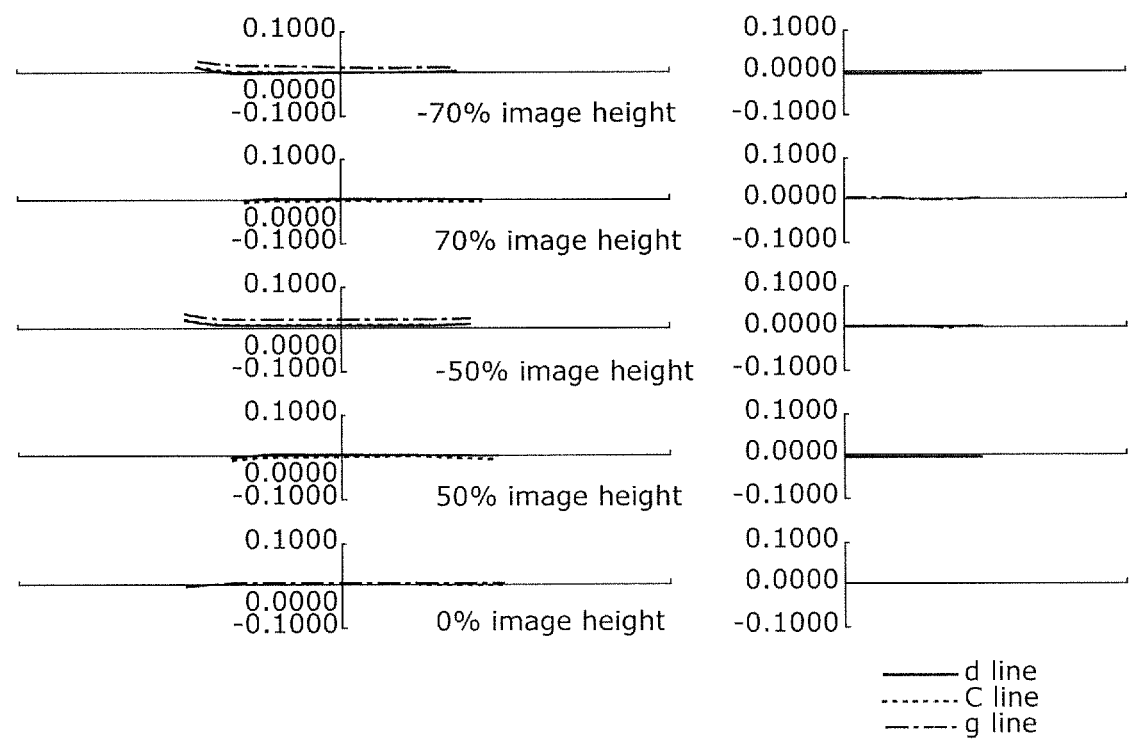
FIG. 60 illustrates lateral aberration during image stabilization with respect to a 0.4-degree vibration angle during infinity focusing at the telephoto extremity of the zooming imaging optical system according to Implementation Example 6.

FIG. 51 illustrates the lens configuration of a zooming imaging optical system according to Implementation Example 6 of the present disclosure.

The zooming imaging optical system includes, in order from the object side, first lens group G1 having positive refractive power, second lens group G2 having negative refractive power, third lens group G3 having positive refractive power, fourth lens group G4 having positive refractive power, fifth lens group G5 having negative refractive power, and sixth lens group G6 having positive refractive power. During zooming from wide angle extremity to telephoto extremity, first lens group G1 moves to the object side, second lens group G2 is fixed, third lens group G3 moves to the object side, fourth lens group G4 moves to the object side, fifth lens group G5 moves to the object side, and sixth lens group G6 moves. Furthermore, when focusing from an object at infinity to a close object, fifth lens group G5 moves along the optical axis to the imaging surface side.

First lens group G1 includes a cemented lens including negative meniscus lens L1 whose convex surface is on the object side and positive meniscus lens L2 whose convex surface is on the object side, and positive meniscus lens L3 whose convex surface is on the object side.

Second lens group G2 includes, in order from the object side, 2a-th lens group G2a having positive refractive power, 2b-th lens group G2b having negative refractive power, and 2c-th lens group G2c having negative refractive power, and image stabilization is performed by displacing 2b-th lens group G2b perpendicularly with respect to the optical axis. 2a-th lens group G2a includes biconvex L4 and a cemented lens including biconvex lens L5 and biconcave lens L6. 2b-th lens group G2b includes a cemented lens including biconcave L7 and biconvex lens L8, and biconvex lens L9. 2c-th lens group G2c includes negative meniscus lens L10 whose convex surface is on the object side.

An aperture diaphragm is provided on the object side of third lens group G3 and moves integrally with third lens group G3 during zooming.

Third lens group G3 includes biconvex lens L11, biconvex lens L12, and a cemented lens including the 3 lenses of biconvex lens L13, biconcave lens L14, and positive meniscus lens L15 whose convex surface is on the object side.

Fourth lens group G4 includes a cemented lens including biconvex lens L16 and negative meniscus lens L17 whose convex surface is on the image side, and biconvex lens L18. The object-side surface of biconvex lens L16 has a predetermined aspheric shape.

Fifth lens group G5 includes negative meniscus lens L19 whose convex surface is on the object side. The object-side surface of negative meniscus lens L19 has a predetermined aspheric shape.

Sixth lens group G6 includes a cemented lens including biconvex lens L20 and plano-convex lens L21 whose flat surface is on the image side.

Next, numerical implementation examples and values corresponding to the conditional expressions in the respective implementation examples of the zooming imaging optical system according to the present disclosure will be described.

In the [SURFACE DATA], surface number denotes the number of the lens surface or the aperture diaphragm counted in order from the object side, r denotes the radius of curvature of the lens surface, d denotes the distance between lens surfaces, nd denotes the refractive index relative to the d-line (wavelength: 587.56 nm), and vd denotes the Abbe number relative to the d-line (wavelength: 587.56 nm).

An "*" (asterisk) applied to a surface number indicates that the shape of the lens surface is an aspheric shape. Furthermore, "(diaphragm)" applied to a surface number indicates that an aperture diaphragm is disposed, and "∞" (infinity) is written in an r corresponding to a plane or aperture diaphragm.

In the [ASPHERIC SURFACE DATA], the values of respective coefficients for stipulating the aspheric surface shape of lens surfaces applied with "*" in [SURFACE DATA]. In the respective implementation examples, the aspheric surface shapes are expressed using the equation below. In the equation below, the displacement from the optical axis to a direction orthogonal to the optical axis is indicated by y, the displacement (sag amount) to the optical axis direction from the intersection of the aspheric surface shape and the optical axis is indicated by z, the radius of curvature of the reference spherical surface is indicated by r, and the conic coefficient is indicated by K. Furthermore, the 4th, 6th, 8th, and 10th order aspheric surface coefficient values are indicated by A4, A6, A8, and A10, respectively.

$$z = \frac{(1/r)y^2}{1+\sqrt{1-(1+K)(y/r)^2}} + A4y^4 + A6y^6 + A8y^8 + A10y^{10} \quad \text{[Math. 1]}$$

The [VARIOUS DATA] shows values such as the zoom ratio and the focal lengths in the respective focal length states are shown.

The [VARIABLE DISTANCE DATA] shows values of variable distance in the respective focal distance states and BF.

The [LENS GROUP DATA] shows the surface number of the lens surface closest to the object side included in each lens group and the focal distance of the entire lens group.

The [SECOND LENS GROUP SPECIFIC GRAVITY DATA] shows the lens number and specific gravity of each lens.

In each of the aberration diagrams in the respective implementation examples, d, g, and C represent the d-line, g-line, and C-line, respectively, and ΔS and ΔM represent the sagittal image surface and the meridional image surface, respectively.

It should be noted that, unless specially mentioned, millimeter (mm) is used for the units of focal length f, radius of curvature r, lens surface distance d, and other lengths in all data values but is not limited to such since equivalent optical performances can be obtained even during proportional extending and proportional shortening in the optical system.

Numerical Implementation Example 1

Unit: mm

[SURFACE DATA]

| SURFACE NUMBER | r | d | nd | vd |
|---|---|---|---|---|
| OBJECT SURFACE | ∞ | ∞ | | |
| 1 | 107.0113 | 1.5000 | 1.80610 | 33.27 |
| 2 | 63.0692 | 6.8637 | 1.49700 | 81.61 |
| 3 | 1469.2388 | 0.1500 | | |
| 4 | 64.7556 | 6.1677 | 1.43700 | 95.10 |
| 5 | 585.4111 | (d5) | | |
| 6 | 131.2115 | 2.7328 | 1.61340 | 44.27 |
| 7 | −180.3874 | 0.1500 | | |
| 8 | 30.8056 | 5.9735 | 1.67270 | 32.17 |
| 9 | −68.4988 | 0.9000 | 1.80420 | 46.50 |
| 10 | 22.1633 | 4.9758 | | |
| 11 | 200.0749 | 1.9284 | 1.80809 | 22.76 |
| 12 | −103.6542 | 0.7500 | 1.69680 | 55.46 |
| 13 | 54.3688 | 1.9823 | | |
| 14 | −38.4506 | 0.7500 | 1.59349 | 67.00 |
| 15 | 124.6837 | 3.8266 | | |
| 16 | −25.5983 | 0.9000 | 1.83481 | 42.72 |
| 17 | −50.1419 | (d17) | | |
| 18 (diaphragm) | ∞ | 1.5000 | | |
| 19 | 73.8147 | 3.7025 | 1.59282 | 68.62 |
| 20 | −55.1139 | 0.1500 | | |
| 21 | 75.2473 | 3.1167 | 1.59282 | 68.62 |
| 22 | −83.5091 | 0.1500 | | |
| 23 | 41.0108 | 5.3653 | 1.43700 | 95.10 |
| 24 | −34.6563 | 0.9000 | 1.90366 | 31.31 |
| 25 | 17.0000 | 4.8715 | 2.00100 | 29.13 |
| 26 | 56.7255 | (d26) | | |
| 27* | 100.0000 | 3.0263 | 1.55332 | 71.68 |
| 28 | −45.9847 | 0.9000 | 1.84666 | 23.78 |
| 29 | −353.9551 | 0.9180 | | |
| 30 | 343.8470 | 2.9746 | 1.90366 | 31.31 |
| 31 | −40.9182 | (d31) | | |
| 32* | 194.4252 | 1.0000 | 1.58913 | 61.25 |
| 33 | 27.5410 | (d33) | | |
| 34 | 191.3043 | 2.2506 | 1.80518 | 25.46 |
| 35 | −87.7804 | 0.9000 | 1.59349 | 67.00 |
| 36 | ∞ | (d36) | | |
| 37 | ∞ | 4.2000 | 1.51680 | 64.20 |
| 38 | ∞ | (BF) | | |
| IMAGING SURFACE | ∞ | | | |

[ASPHERIC SURFACE DATA]

| | 27-TH SURFACE | 32ND SURFACE |
|---|---|---|
| K | 0.0000 | 0.0000 |
| A4 | −1.37472E−05 | 1.27179E−06 |
| A6 | 8.47280E−11 | −4.30790E−09 |
| A8 | −1.12625E−11 | 3.36745E−11 |
| A10 | 0.00000E+00 | 0.00000E+00 |
| A12 | | |

[VARIOUS DATA]
ZOOM RATIO 3.80

| | WIDE ANGLE | INTER-MEDIATE | TELE-PHOTO |
|---|---|---|---|
| FOCAL LENGTH | 51.25 | 100.00 | 195.00 |
| F NUMBER | 2.91 | 3.35 | 4.11 |
| TOTAL ANGLE OF VIEW 2ω | 23.43 | 12.14 | 6.25 |
| IMAGE HEIGHT Y | 10.82 | 10.82 | 10.82 |
| TOTAL LENS LENGTH | 150.00 | 178.51 | 195.00 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 3.0000 | 31.5114 | 48.0000 |
| d17 | 15.8644 | 10.7059 | 1.0000 |
| d26 | 12.4659 | 4.6971 | 4.1611 |
| d31 | 8.5800 | 3.0000 | 2.5001 |
| d33 | 6.8133 | 17.7919 | 36.2699 |
| d36 | 26.8000 | 34.3288 | 26.5926 |
| BF | 1.0000 | 1.0000 | 1.0000 |

[LENS GROUP DATA]

| GROUP | FIRST SURFACE | FOCAL LENGTH |
|---|---|---|
| G1 | 1 | 121.24 |
| G2 | 6 | −22.31 |
| G3 | 19 | 39.84 |
| G4 | 27 | 38.66 |
| G5 | 32 | −54.58 |
| G6 | 34 | 151.34 |
| G2a | 6 | −276.74 |
| G2b | 11 | −35.66 |
| G2c | 16 | −63.71 |

[2b-TH LENS GROUP SPECIFIC GRAVITY DATA]

| LENS NUMBER | SPECIFIC GRAVITY |
|---|---|
| L7 | 3.32 |
| L8 | 3.67 |
| L9 | 3.14 |

Numerical Implementation Example 2

Unit: mm

[SURFACE DATA]

| SURFACE NUMBER | r | d | nd | vd |
|---|---|---|---|---|
| OBJECT SURFACE | ∞ | ∞ | | |
| 1 | 104.5976 | 1.5000 | 1.80610 | 33.27 |
| 2 | 66.7163 | 5.8826 | 1.49700 | 81.61 |
| 3 | 337.5775 | 0.1500 | | |
| 4 | 87.9608 | 5.4378 | 1.43700 | 95.10 |
| 5 | 585.4111 | (d5) | | |
| 6 | 50.7037 | 5.7327 | 1.51742 | 52.15 |
| 7 | −850.0990 | 3.7661 | | |
| 8 | 32.0810 | 5.9925 | 1.72825 | 28.32 |
| 9 | −101.9851 | 0.9002 | 1.87071 | 40.73 |
| 10 | 21.8094 | 4.2304 | | |
| 11 | 222.6479 | 1.9881 | 1.75211 | 25.05 |
| 12 | −91.8154 | 0.7500 | 1.69680 | 55.46 |
| 13 | 52.3327 | 1.9986 | | |
| 14 | −37.2128 | 0.7500 | 1.59349 | 67.00 |
| 15 | 196.9229 | 3.4870 | | |
| 16 | −29.0521 | 0.9000 | 1.83481 | 42.72 |
| 17 | −63.3382 | (d17) | | |
| 18 (diaphragm) | ∞ | 1.5000 | | |
| 19 | 56.2643 | 3.9204 | 1.55032 | 75.50 |
| 20 | −57.9181 | 0.1500 | | |
| 21 | 61.8804 | 2.9474 | 1.59282 | 68.62 |
| 22 | −132.3145 | 0.1500 | | |
| 23 | 37.4684 | 5.3615 | 1.43700 | 95.10 |
| 24 | −36.6936 | 0.9000 | 1.90366 | 31.31 |
| 25 | 17.0324 | 4.4341 | 2.00100 | 29.13 |
| 26 | 44.8015 | (d26) | | |
| 27* | 84.2745 | 2.8909 | 1.55332 | 71.68 |
| 28 | −53.8774 | 0.9000 | 1.84666 | 23.78 |
| 29 | ∞ | 0.9674 | | |
| 30 | 134.9657 | 3.3097 | 1.90366 | 31.31 |
| 31 | −41.4474 | (d31) | | |
| 32* | 186.3305 | 1.0000 | 1.58913 | 61.25 |
| 33 | 27.2703 | (d33) | | |
| 34 | 48.6673 | 2.4371 | 1.80518 | 25.46 |
| 35 | 472.8234 | 0.9000 | 1.77250 | 49.62 |
| 36 | 73.7309 | (d36) | | |
| 37 | ∞ | 4.2000 | 1.51680 | 64.20 |
| 38 | ∞ | (BF) | | |
| IMAGING SURFACE | ∞ | | | |

[ASPHERIC SURFACE DATA]

| | 27-TH SURFACE | 32ND SURFACE |
|---|---|---|
| K | 0.0000 | 0.0000 |
| A4 | −1.53673E−05 | 1.49963E−06 |
| A6 | 1.11946E−09 | −1.10845E−09 |
| A8 | −1.36882E−11 | 8.94352E−12 |
| A10 | 0.00000E+00 | 0.00000E+00 |
| A12 | | |

[VARIOUS DATA]
ZOOM RATIO 3.80

| | WIDE ANGLE | INTER-MEDIATE | TELE-PHOTO |
|---|---|---|---|
| FOCAL LENGTH | 51.25 | 100.00 | 195.00 |
| F NUMBER | 2.91 | 3.34 | 4.11 |
| TOTAL ANGLE OF VIEW 2ω | 23.50 | 12.17 | 6.27 |
| IMAGE HEIGHT Y | 10.82 | 10.82 | 10.82 |
| TOTAL LENS LENGTH | 152.00 | 179.00 | 202.91 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 2.0000 | 29.0000 | 52.9146 |
| d17 | 19.8067 | 10.2309 | 1.0000 |
| d26 | 11.2657 | 5.3038 | 3.5373 |
| d31 | 4.4360 | 3.0416 | 2.5000 |
| d33 | 6.6471 | 17.1613 | 35.8969 |
| d36 | 27.4101 | 33.8280 | 26.6315 |
| BF | 1.0000 | 1.0000 | 1.0000 |

[LENS GROUP DATA]

| GROUP | FIRST SURFACE | FOCAL LENGTH |
|---|---|---|
| G1 | 1 | 153.07 |
| G2 | 6 | −26.30 |
| G3 | 19 | 43.17 |
| G4 | 27 | 34.49 |
| G5 | 32 | −54.35 |
| G6 | 34 | 158.19 |
| G2a | 6 | −814.64 |
| G2b | 11 | −35.08 |
| G2c | 16 | −65.07 |

[2b-TH LENS GROUP SPECIFIC GRAVITY DATA]

| LENS NUMBER | SPECIFIC GRAVITY |
|---|---|
| L7 | 3.14 |
| L8 | 3.67 |
| L9 | 3.14 |

Numerical Implementation Example 3

Unit: mm

[SURFACE DATA]

| SURFACE NUMBER | r | d | nd | vd |
|---|---|---|---|---|
| OBJECT SURFACE | ∞ | ∞ | | |
| 1 | 90.4464 | 1.5000 | 1.80518 | 25.46 |
| 2 | 65.8065 | 5.9257 | 1.49700 | 81.61 |
| 3 | 592.3631 | 0.1500 | | |
| 4 | 92.2983 | 4.2567 | 1.43700 | 95.10 |
| 5 | 600.8308 | (d5) | | |
| 6 | 153.3653 | 2.7740 | 1.65844 | 50.85 |
| 7 | −173.3592 | 0.1500 | | |
| 8 | 34.1783 | 6.0374 | 1.71736 | 29.50 |
| 9 | −66.4092 | 1.7551 | 1.83481 | 42.72 |
| 10 | 23.9697 | 5.0406 | | |
| 11 | 517.3924 | 1.7330 | 1.89286 | 20.36 |
| 12 | −123.7127 | 0.7500 | 1.69680 | 55.46 |
| 13 | 84.4966 | 1.8261 | | |
| 14 | −45.8377 | 0.7500 | 1.61997 | 63.88 |
| 15 | 142.0037 | 4.1492 | | |
| 16 | −25.6327 | 0.9000 | 1.83481 | 42.72 |
| 17 | −67.0219 | (d17) | | |
| 18 (diaphragm) | ∞ | 1.5000 | | |
| 19 | 81.3414 | 4.0550 | 1.59282 | 68.62 |
| 20 | −54.7448 | 0.1500 | | |
| 21 | 70.0438 | 3.4249 | 1.59282 | 68.62 |
| 22 | −100.1844 | 0.1500 | | |
| 23 | 37.5761 | 6.1484 | 1.43700 | 95.10 |
| 24 | −38.6658 | 0.9000 | 1.90366 | 31.31 |
| 25 | 17.0000 | 5.6255 | 2.00100 | 29.13 |
| 26 | 53.0084 | (d26) | | |
| 27* | 96.3243 | 3.5704 | 1.55332 | 71.68 |
| 28 | −39.8259 | 0.9000 | 1.84666 | 23.78 |
| 29 | −156.6876 | 0.8117 | | |
| 30 | 814.1679 | 3.2268 | 1.90366 | 31.31 |
| 31 | −40.3973 | (d31) | | |
| 32* | 89.4561 | 1.0000 | 1.58913 | 61.25 |
| 33 | 27.8331 | (d33) | | |
| 34 | 537.1537 | 3.7132 | 1.71736 | 29.50 |
| 35 | −25.4245 | 0.9000 | 1.77250 | 49.62 |
| 36 | ∞ | (d36) | | |

-continued

Unit: mm

| | | | | |
|---|---|---|---|---|
| 37 | ∞ | 4.2000 | 1.51680 | 64.20 |
| 38 | ∞ | (BF) | | |
| IMAGING SURFACE | ∞ | | | |

[ASPHERIC SURFACE DATA]

| | 27-TH SURFACE | 32ND SURFACE |
|---|---|---|
| K | 0.0000 | 0.0000 |
| A4 | −1.52391E−05 | 8.89816E−07 |
| A6 | 1.90937E−09 | −6.76284E−09 |
| A8 | −2.62838E−11 | 4.24621E−11 |
| A10 | 0.00000E+00 | 0.00000E+00 |
| A12 | | |

[VARIOUS DATA]
ZOOM RATIO 3.80

| | WIDE ANGLE | INTER- MEDIATE | TELE- PHOTO |
|---|---|---|---|
| FOCAL LENGTH | 51.25 | 100.00 | 195.00 |
| F NUMBER | 2.91 | 3.35 | 4.11 |
| TOTAL ANGLE OF VIEW 2ω | 23.53 | 12.15 | 6.25 |
| IMAGE HEIGHT Y | 10.82 | 10.82 | 10.82 |
| TOTAL LENS LENGTH | 151.00 | 177.54 | 198.00 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 3.0000 | 29.5355 | 50.0000 |
| d17 | 18.3216 | 10.2184 | 1.0000 |
| d26 | 11.7418 | 5.3341 | 3.8782 |
| d31 | 5.2768 | 3.0000 | 2.5000 |
| d33 | 6.9863 | 14.9347 | 24.9289 |
| d36 | 26.8000 | 35.5393 | 36.7194 |
| BF | 1.0000 | 1.0000 | 1.0000 |

[LENS GROUP DATA]

| GROUP | FIRST SURFACE | FOCAL LENGTH |
|---|---|---|
| G1 | 1 | 135.86 |
| G2 | 6 | −23.34 |
| G3 | 19 | 38.53 |
| G4 | 27 | 37.40 |
| G5 | 32 | −69.00 |
| G6 | 34 | −1209.14 |
| G2a | 6 | −358.72 |
| G2b | 11 | −43.58 |
| G2c | 16 | −50.22 |

[2b-TH LENS GROUP SPECIFIC GRAVITY DATA]

| LENS NUMBER | SPECIFIC GRAVITY |
|---|---|
| L7 | 3.61 |
| L8 | 3.67 |
| L9 | 3.57 |

Numerical Implementation Example 4

Unit: mm

[SURFACE DATA]

| SURFACE NUMBER | r | d | nd | vd |
|---|---|---|---|---|
| OBJECT SURFACE | ∞ | ∞ | | |
| 1 | 100.9059 | 1.5000 | 1.75520 | 27.53 |
| 2 | 61.5189 | 6.5980 | 1.49700 | 81.61 |

-continued

Unit: mm

| | | | | |
|---|---|---|---|---|
| 3 | 1229.9248 | 0.1500 | | |
| 4 | 65.8993 | 5.6098 | 1.49700 | 81.61 |
| 5 | 483.7397 | (d5) | | |
| 6 | 430.6773 | 2.1300 | 1.84666 | 23.78 |
| 7 | −154.1336 | 0.1500 | | |
| 8 | 36.8662 | 5.1845 | 1.68893 | 31.16 |
| 9 | −59.5764 | 0.9000 | 1.87071 | 40.73 |
| 10 | 26.1508 | 3.5305 | | |
| 11 | 112.2216 | 1.6922 | 1.94595 | 17.98 |
| 12 | −1000.0000 | 0.7500 | 1.69680 | 55.46 |
| 13 | 55.2597 | 2.5788 | | |
| 14 | −44.5996 | 0.7500 | 1.59349 | 67.00 |
| 15 | 79.5163 | 4.3399 | | |
| 16 | −23.7211 | 0.9000 | 1.83481 | 42.72 |
| 17 | −45.6943 | 1.0000 | | |
| 18 (diaphragm) | ∞ | (d18) | | |
| 19 | 107.3370 | 3.7720 | 1.59282 | 68.62 |
| 20 | −49.5550 | 0.1500 | | |
| 21 | 69.0471 | 3.5284 | 1.59282 | 68.62 |
| 22 | −80.9060 | 0.1500 | | |
| 23 | 41.7479 | 5.6285 | 1.43700 | 95.10 |
| 24 | −37.6342 | 0.9000 | 1.90366 | 31.31 |
| 25 | 17.2801 | 5.2813 | 2.00100 | 29.13 |
| 26 | 56.7170 | (d26) | | |
| 27* | 100.0000 | 2.9186 | 1.55332 | 71.68 |
| 28 | −55.8448 | 0.9000 | 1.84666 | 23.78 |
| 29 | 156.2715 | 0.1559 | | |
| 30 | 86.8890 | 3.6288 | 1.90366 | 31.31 |
| 31 | −46.0423 | (d31) | | |
| 32* | 153.0382 | 1.0000 | 1.58913 | 61.25 |
| 33 | 27.9521 | (d33) | | |
| 34 | 186.0177 | 2.2701 | 1.84666 | 23.78 |
| 35 | −88.4993 | 0.9000 | 1.77250 | 49.62 |
| 36 | ∞ | (d36) | | |
| 37 | ∞ | 4.2000 | 1.51680 | 64.20 |
| 38 | ∞ | (BF) | | |
| IMAGING SURFACE | ∞ | | | |

[ASPHERIC SURFACE DATA]

| | 27-TH SURFACE | 32ND SURFACE |
|---|---|---|
| K | 0.0000 | 0.0000 |
| A4 | −1.15920E−05 | 1.28357E−06 |
| A6 | −7.08928E−11 | −1.20275E−08 |
| A8 | −1.89429E−11 | 1.69641E−10 |
| A10 | 7.85680E−15 | −8.06977E−13 |
| A12 | | |

[VARIOUS DATA]
ZOOM RATIO 3.80

| | WIDE ANGLE | INTER- MEDIATE | TELE- PHOTO |
|---|---|---|---|
| FOCAL LENGTH | 51.25 | 100.00 | 195.00 |
| F NUMBER | 2.91 | 3.35 | 4.11 |
| TOTAL ANGLE OF VIEW 2ω | 23.53 | 12.16 | 6.25 |
| IMAGE HEIGHT Y | 10.82 | 10.82 | 10.82 |
| TOTAL LENS LENGTH | 155.00 | 179.00 | 193.68 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 4.8854 | 28.8853 | 43.5608 |
| d18 | 16.3582 | 11.1396 | 1.5000 |
| d26 | 16.7338 | 7.2959 | 7.3963 |
| d31 | 9.1318 | 3.0000 | 2.5000 |
| d33 | 6.9380 | 19.2423 | 37.9197 |
| d36 | 26.8054 | 35.2894 | 26.6511 |
| BF | 1.0000 | 1.0000 | 1.0000 |

Unit: mm

[LENS GROUP DATA]

| GROUP | FIRST SURFACE | FOCAL LENGTH |
|---|---|---|
| G1 | 1 | 107.15 |
| G2 | 6 | −20.66 |
| G3 | 19 | 38.97 |
| G4 | 27 | 40.80 |
| G5 | 32 | −58.22 |
| G6 | 34 | 185.71 |
| G2a | 6 | −145.53 |
| G2b | 11 | −40.66 |
| G2c | 16 | −60.21 |

[2b-TH LENS GROUP SPECIFIC GRAVITY DATA]

| LENS NUMBER | SPECIFIC GRAVITY |
|---|---|
| L7 | 3.51 |
| L8 | 3.67 |
| L9 | 3.14 |

Numerical Implementation Example 5

Unit: mm

[SURFACE DATA]

| SURFACE NUMBER | r | d | nd | vd |
|---|---|---|---|---|
| OBJECT SURFACE | ∞ | ∞ | | |
| 1 | 108.7579 | 1.5000 | 1.75520 | 27.53 |
| 2 | 65.0319 | 6.4963 | 1.49700 | 81.61 |
| 3 | 1357.9862 | 0.1500 | | |
| 4 | 66.0814 | 5.5143 | 1.49700 | 81.61 |
| 5 | 349.1178 | (d5) | | |
| 6 | 201.9320 | 2.5492 | 1.58144 | 40.89 |
| 7 | −140.4557 | 0.1500 | | |
| 8 | 31.6210 | 6.2327 | 1.71736 | 29.50 |
| 9 | −58.3866 | 0.9000 | 1.83481 | 42.72 |
| 10 | 22.5351 | 4.6009 | | |
| 11 | 128.5535 | 1.6738 | 1.94595 | 17.98 |
| 12 | −390.8671 | 0.7500 | 1.72916 | 54.67 |
| 13 | 51.4603 | 2.4915 | | |
| 14 | −39.6332 | 0.7500 | 1.61997 | 63.88 |
| 15 | 118.0626 | 3.9970 | | |
| 16 | −24.0539 | 0.9000 | 1.80610 | 33.27 |
| 17 | −44.0818 | (d17) | | |
| 18 (diaphragm) | ∞ | 1.5000 | | |
| 19 | 79.0075 | 3.4931 | 1.49700 | 81.61 |
| 20 | −60.8838 | 0.1500 | | |
| 21 | 73.2113 | 3.4554 | 1.59282 | 68.62 |
| 22 | −68.2831 | 0.8270 | | |
| 23 | 43.5836 | 5.4518 | 1.43700 | 95.10 |
| 24 | −34.0228 | 0.9000 | 1.90366 | 31.31 |
| 25 | 18.1731 | 4.7958 | 2.00100 | 29.13 |
| 26 | 60.2374 | (d26) | | |
| 27* | 100.0000 | 4.0165 | 1.55332 | 71.68 |
| 28 | −38.7627 | 0.9000 | 1.84666 | 23.78 |
| 29 | −82.6958 | 1.4513 | | |
| 30 | 1000.0000 | 2.8908 | 1.90366 | 31.31 |
| 31 | −45.3463 | (d31) | | |
| 32* | 200.0000 | 1.0000 | 1.58913 | 61.25 |
| 33 | 25.9113 | (d33) | | |
| 34 | 44.9012 | 3.5711 | 1.67270 | 32.17 |
| 35 | −113.5566 | 0.9000 | 1.62299 | 58.12 |
| 36 | 291.8609 | (d36) | | |
| 37 | 79.9595 | 0.9000 | 1.71300 | 53.94 |
| 38 | 41.4450 | 25.8000 | | |
| 39 | ∞ | 4.2000 | 1.51680 | 64.20 |
| 40 | ∞ | (BF) | | |
| IMAGING SURFACE | ∞ | | | |

Unit: mm

[ASPHERIC SURFACE DATA]

| | 27-TH SURFACE | 32ND SURFACE |
|---|---|---|
| K | 0.0000 | 0.0000 |
| A4 | −1.19927E−05 | 1.95169E−06 |
| A6 | 1.01971E−09 | −1.00312E−08 |
| A8 | −5.22807E−12 | 1.60191E−10 |
| A10 | 0.00000E+00 | −8.47922E−13 |
| A12 | | |

[VARIOUS DATA]
ZOOM RATIO 3.80

| | WIDE ANGLE | INTER-MEDIATE | TELE-PHOTO |
|---|---|---|---|
| FOCAL LENGTH | 51.25 | 100.00 | 195.00 |
| F NUMBER | 2.91 | 3.35 | 4.11 |
| TOTAL ANGLE OF VIEW 2ω | 23.51 | 12.19 | 6.27 |
| IMAGE HEIGHT Y | 10.82 | 10.82 | 10.82 |
| TOTAL LENS LENGTH | 152.00 | 178.56 | 195.00 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 2.0000 | 28.5587 | 45.0000 |
| d17 | 15.8080 | 10.1206 | 1.0000 |
| d26 | 12.0741 | 4.7376 | 4.1990 |
| d31 | 8.7826 | 3.0000 | 2.5000 |
| d33 | 6.3885 | 18.8451 | 35.4424 |
| d36 | 1.0881 | 7.4381 | 1.0000 |
| BF | 1.0000 | 1.0000 | 1.0000 |

[LENS GROUP DATA]

| GROUP | FIRST SURFACE | FOCAL LENGTH |
|---|---|---|
| G1 | 1 | 115.34 |
| G2 | 6 | −22.38 |
| G3 | 19 | 45.39 |
| G4 | 27 | 35.45 |
| G5 | 32 | −50.64 |
| G6 | 34 | 74.86 |
| G7 | 37 | −121.86 |
| G2a | 6 | −218.20 |
| G2b | 11 | −36.79 |
| G2c | 16 | −67.02 |

[2b-TH LENS GROUP SPECIFIC GRAVITY DATA]

| LENS NUMBER | SPECIFIC GRAVITY |
|---|---|
| L7 | 3.51 |
| L8 | 4.05 |
| L9 | 3.57 |

Numerical Implementation Example 6

Unit: mm

[SURFACE DATA]

| SURFACE NUMBER | r | d | nd | vd |
|---|---|---|---|---|
| OBJECT SURFACE | ∞ | ∞ | | |
| 1 | 110.0676 | 1.5000 | 1.80610 | 33.27 |
| 2 | 67.2997 | 6.1953 | 1.49700 | 81.61 |
| 3 | 629.7192 | 0.1500 | | |
| 4 | 76.5701 | 5.7024 | 1.43700 | 95.10 |
| 5 | 1475.6847 | (d5) | | |

-continued

Unit: mm

| | | | | |
|---|---|---|---|---|
| 6 | 76.7157 | 3.3066 | 1.71700 | 47.98 |
| 7 | −349.4891 | 0.1500 | | |
| 8 | 31.3969 | 5.5521 | 1.67270 | 32.17 |
| 9 | −107.4632 | 0.9000 | 1.87071 | 40.73 |
| 10 | 25.1109 | 4.9704 | | |
| 11 | 403.4775 | 2.4827 | 1.80809 | 22.76 |
| 12 | −48.9707 | 0.7500 | 1.69680 | 55.46 |
| 13 | 36.1988 | 2.7058 | | |
| 14 | −28.8084 | 0.7500 | 1.59349 | 67.00 |
| 15 | 4072.0961 | 3.2473 | | |
| 16 | −33.1866 | 0.9000 | 1.87071 | 40.73 |
| 17 | −59.9116 | (d17) | | |
| 18 (diaphragm) | ∞ | 1.5000 | | |
| 19 | 67.5565 | 3.8887 | 1.55032 | 75.50 |
| 20 | −55.6928 | 0.1500 | | |
| 21 | 67.0156 | 3.1416 | 1.59282 | 68.62 |
| 22 | −105.0742 | 0.2188 | | |
| 23 | 38.3146 | 5.5784 | 1.43700 | 95.10 |
| 24 | −37.0966 | 0.9000 | 1.90366 | 31.31 |
| 25 | 17.2760 | 4.8684 | 2.00100 | 29.13 |
| 26 | 51.8875 | (d26) | | |
| 27* | 91.7980 | 3.2978 | 1.55332 | 71.68 |
| 28 | −42.3602 | 0.9000 | 1.84666 | 23.78 |
| 29 | −310.6655 | 0.5410 | | |
| 30 | 174.7248 | 3.2819 | 1.90366 | 31.31 |
| 31 | −41.5873 | (d31) | | |
| 32* | 200.0000 | 1.0000 | 1.58913 | 61.25 |
| 33 | 26.5596 | (d33) | | |
| 34 | 157.4186 | 2.5908 | 1.78472 | 25.72 |
| 35 | −64.2320 | 0.9000 | 1.77250 | 49.62 |
| 36 | ∞ | (d36) | | |
| 37 | ∞ | 4.2000 | 1.51680 | 64.20 |
| 38 | ∞ | (BF) | | |
| IMAGING SURFACE | ∞ | | | |

[ASPHERIC SURFACE DATA]

| | 27-TH SURFACE | 32ND SURFACE |
|---|---|---|
| K | 0.0000 | 0.0000 |
| A4 | −1.48485E−05 | 1.57802E−06 |
| A6 | 2.20223E−10 | −4.66078E−09 |
| A8 | −1.52114E−11 | 3.23026E−11 |
| A10 | 0.00000E+00 | 0.00000E+00 |
| A12 | | |

[VARIOUS DATA]
ZOOM RATIO 3.80

| | WIDE ANGLE | INTER-MEDIATE | TELE-PHOTO |
|---|---|---|---|
| FOCAL LENGTH | 51.25 | 100.00 | 195.00 |
| F NUMBER | 2.91 | 3.35 | 4.11 |
| TOTAL ANGLE OF VIEW 2ω | 23.47 | 12.14 | 6.25 |
| IMAGE HEIGHT Y | 10.82 | 10.82 | 10.82 |
| TOTAL LENS LENGTH | 150.00 | 179.00 | 200.00 |

[VARIABLE DISTANCE DATA]

| | WIDE ANGLE | INTERMEDIATE | TELEPHOTO |
|---|---|---|---|
| d0 | ∞ | ∞ | ∞ |
| d5 | 3.0000 | 32.0000 | 53.0001 |
| d17 | 16.8927 | 9.9644 | 1.0000 |
| d26 | 12.6348 | 5.1840 | 3.5478 |
| d31 | 6.9452 | 3.5675 | 2.5000 |
| d33 | 6.5072 | 16.5557 | 36.1808 |
| d36 | 26.8000 | 34.5084 | 26.5514 |
| BF | 1.0000 | 1.0000 | 1.0000 |

[LENS GROUP DATA]

| GROUP | FIRST SURFACE | FOCAL LENGTH |
|---|---|---|
| G1 | 1 | 136.86 |
| G2 | 6 | −24.33 |
| G3 | 19 | 41.14 |
| G4 | 27 | 35.51 |
| G5 | 32 | −52.10 |
| G6 | 34 | 193.28 |
| G2a | 6 | 997.22 |
| G2b | 11 | −27.49 |
| G2c | 16 | −86.81 |

[2b-TH LENS GROUP SPECIFIC GRAVITY DATA]

| LENS NUMBER | SPECIFIC GRAVITY |
|---|---|
| L7 | 3.32 |
| L8 | 3.67 |
| L9 | 3.14 |

[Values Corresponding to Conditional Expressions]
Conditional Expression/Implementation $f1/ft$ (1)

$hFno2bT/hFno2aT$ (2)

$f2b/f2$ (3)

$sg2bp^2/((nd2bp-1)\times(vd2bn-vd2bp))$ (4)

$sg2bn^2/((nd2bn-1)\times(vd2bn-vd2bp))$ (5)

$|(1-\beta2bT)\times\beta b2bT|$ (6)

| | ex1 | ex2 | ex3 | ex4 | ex5 | ex6 |
|---|---|---|---|---|---|---|
| (1) | 0.622 | 0.785 | 0.697 | 0.549 | 0.591 | 0.702 |
| (2) | 0.694 | 0.623 | 0.706 | 0.747 | 0.695 | 0.697 |
| (3) | 1.598 | 1.334 | 1.867 | 1.968 | 1.644 | 1.130 |
| (4) | 0.355 | 0.362 | 0.371 | 0.301 | 0.315 | 0.355 |
| (5) | 0.467 | 0.497 | 0.506 | 0.416 | 0.521 | 0.467 |
| (6) | 1.999 | 1.999 | 1.801 | 1.847 | 1.965 | 2.600 |

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The invention claimed is:

1. A zooming imaging optical system, comprising, in order from an object side to an image side, at least:
a first lens group having positive refractive power;
a second lens group having negative refractive power;
a third lens group having positive refractive power;
a fourth lens group having positive refractive power;
a fifth lens group having negative refractive power; and
a sixth lens group,
wherein, during zooming, a distance between adjacent lens groups changes,
during focusing from an object at infinity to a close object, the fifth lens group moves along an optical axis toward an imaging surface side,
the second lens group includes, in order from the object side to the image side, at least:
a 2a-th lens group; and
a 2b-th lens group having negative refractive power, image stabilization is performed by displacing the 2b-th lens group perpendicularly with respect to the optical axis, and the following conditional expression is satisfied:

$$0.52 < f1/ft < 1.00 \tag{1}$$

where:

f1 denotes a focal length of the first lens group; and ft denotes a focal length of an entirety of the zooming imaging optical system during infinity focusing at a telephoto extremity.

2. The zooming imaging optical system according to claim 1, wherein, during zooming, the second lens group is fixed relative to an imaging surface, and the following conditional expressions are satisfied:

$$0.50 < hFno2bT/hFno2aT < 0.85 \tag{2}$$

$$0.80 < f2b/f2 < 2.50 \tag{3}$$

where:

hFno2bT denotes a ray height of an F number light flux at a lens surface closest to the object side in the 2b-th lens group during infinity focusing at the telephoto extremity;

hFno2aT denotes a ray height of an F number light flux at a lens surface closest to the object side in the 2a-th lens group during the infinity focusing at the telephoto extremity;

f2b denotes a focal length of the 2b-th lens group; and f2 denotes a focal length of the second lens group.

3. The zooming imaging optical system according to claim 1, wherein the 2b-th lens group includes one positive lens and two negative lenses, and the following conditional expressions are satisfied:

$$sg2bp^2/((nd2bp-1) \times (vd2bn-vd2bp)) < 0.44 \tag{4}$$

$$sg2bn^2/((nd2bn-1) \times (vd2bn-vd2bp)) < 0.70 \tag{5}$$

where:

sg2bp denotes a specific gravity of the one positive lens included in the 2b-th lens group;

sg2bn denotes an average of specific gravities of the two negative lenses included in the 2b-th lens group;

nd2bp denotes a refractive index relative to a d line of the one positive lens included in the 2b-th lens group;

nd2bn denotes an average of refractive indices relative to the d line of the two negative lenses included in the 2b-th lens group;

vd2bp denotes an Abbe number relative to the d line of the one positive lens included in the 2b-th lens group; and vd2bn denotes an average of Abbe numbers relative to the d line of the two negative lenses included in the 2b-th lens group.

4. The zooming imaging optical system according to claim 1, wherein the second lens group includes, in order from the object side to the image side:

a 2a-th lens group;

a 2b-th lens group having negative refractive power; and a 2c-th lens group, the image stabilization is performed by displacing the 2b-th lens group perpendicularly with respect to the optical axis, and the following conditional expression is satisfied:

$$1.40 < |(1-\beta 2bT) \times \beta b2bT| < 2.90 \tag{6}$$

where:

$\beta 2bT$ denotes a lateral magnification of the 2b-th lens group during the infinity focusing at the telephoto extremity; and $\beta b2bT$ denotes a lateral magnification of a lens system located further on the image side than the 2b-th lens group during the infinity focusing at the telephoto extremity.

5. The zooming imaging optical system according to claim 1, wherein the third lens group includes a three-element cemented lens including, in order from the object side to the image side, a positive lens, a negative lens, and a positive lens.

6. The zooming imaging optical system according to claim 1, wherein the fifth lens group includes one negative lens.

* * * * *